United States Patent
Irrgang et al.

(10) Patent No.: US 10,665,114 B2
(45) Date of Patent: May 26, 2020

(54) AIRCRAFT FUEL OPTIMIZATION ANALYTICS

(71) Applicant: THE BOEING COMPANY, Chicago, IL (US)

(72) Inventors: Michael E. Irrgang, Black Diamond, WA (US); Charles E. Kaul, Prescott, AZ (US); Andrew E. Hall, Vancouver (CA); Andrea De Klerk, Vancouver (CA); Elham Boozarjomehri, Vancouver (CA)

(73) Assignee: THE BOEING COMPANY, Chicago, IL (US)

( * ) Notice: Subject to any disclaimer, the term of this patent is extended or adjusted under 35 U.S.C. 154(b) by 187 days.

(21) Appl. No.: 14/229,527

(22) Filed: Mar. 28, 2014

(65) Prior Publication Data
US 2015/0279218 A1 Oct. 1, 2015

(51) Int. Cl.
*G08G 5/00* (2006.01)
*G07C 5/08* (2006.01)
*G06Q 10/04* (2012.01)

(52) U.S. Cl.
CPC ......... *G08G 5/0039* (2013.01); *G06Q 10/047* (2013.01); *G07C 5/0816* (2013.01); *G08G 5/0056* (2013.01)

(58) Field of Classification Search
CPC .. G08G 5/0034; G08G 5/0039; G08G 5/0043; G08G 5/00; G07C 5/08; G01C 21/00; G01C 21/20; G01C 21/26; G01C 23/00; G01C 23/005; G06Q 10/025; G06Q 10/04; G06Q 10/047; G06Q 10/02; B64C 25/405; Y02T 50/823
USPC ..... 701/3, 14, 120, 425, 467, 528, 123, 124; 705/5; 702/179; 477/43; 340/572.1; 244/50, 189
See application file for complete search history.

(56) References Cited

U.S. PATENT DOCUMENTS

| | | | | |
|---|---|---|---|---|
| 4,642,775 A * | 2/1987 | Cline | ...................... | G01C 23/00 701/528 |
| 5,046,177 A * | 9/1991 | Vahabzadeh | .......... | B60W 10/06 477/43 |
| 7,272,491 B1 * | 9/2007 | Berard | ................. | G06Q 10/047 701/14 |
| 7,606,641 B2 | 10/2009 | Allen | | |
| 7,647,163 B2 | 1/2010 | Allen | | |
| 2002/0055816 A1 * | 5/2002 | H. Chamas | ............ | G01G 19/07 701/124 |
| 2005/0080551 A1 * | 4/2005 | Ledingham | .......... | G06Q 10/025 701/120 |
| 2005/0159878 A1 * | 7/2005 | Coggins | ................. | B67D 7/145 701/123 |

(Continued)

OTHER PUBLICATIONS

"Flight Management Systems" by Jim Sparks, May 9, 2006, 5 pages.*

*Primary Examiner* — Alexander G Kalinowski
*Assistant Examiner* — Sanjeev Malhotra
(74) *Attorney, Agent, or Firm* — Patterson + Sheridan, LLP

(57) ABSTRACT

Method and system for providing optimal, achievable flight plans for a flight of an aircraft and for providing accurate fuel load calculations. The method and system can check for and correct inaccurate assumptions in a flight plan. The method and system can also perform statistical analysis to recognize and account for real-world limitations on flight plans. The method and system can also perform statistical analysis to determine actual aircraft wear that can affect aircraft performance and account for such wear when calculating fuel load.

43 Claims, 33 Drawing Sheets

---

Taxi Out Time Buffer 160
• OOOI Data

Taxi In Time Buffer 162
• OOOI Data

Taxi In/Out Fuel Burn Rate Buffer 164
• OOOI Data
• Aircraft Sensor Data

Hold Time Buffer 166
• Aircraft Sensor Data

Hold Fuel Burn Rate Buffer 168
• Aircraft Sensor Data

Hold Fuel Burn Rate Buffer 168
• Aircraft Sensor Data

Cruise Speed Limitations
• Aircraft Sensor Data

Route, SIDs, and STARs Limitations
• Aircraft Sensor Data
• Route Tracking

Aircraft Performance Deterioration Factor 170
Engine Deterioration (TSFC Change)
• Aircraft Sensor Data
• Load Sheet Data
Airframe Drag (Thrust Required)
• Aircraft Sensor Data
• Load Sheet Data Zero Fuel Weight Buffer 172 &
Operating Empty Weight Buffer 174
Gross Weight
• Aircraft Sensor Data
• Load Sheet Data

(56) References Cited

U.S. PATENT DOCUMENTS

| | | | |
|---|---|---|---|
| 2005/0267673 A1* | 12/2005 | Blagg | G06Q 10/06 701/123 |
| 2006/0020496 A1* | 1/2006 | Azzarello | G06Q 10/02 705/5 |
| 2006/0085164 A1* | 4/2006 | Leyton | G01W 1/10 702/179 |
| 2006/0212320 A1* | 9/2006 | Sauser | G06Q 10/02 705/5 |
| 2007/0032941 A1* | 2/2007 | Allen | G01C 23/005 701/123 |
| 2007/0043481 A1* | 2/2007 | Metschan | G08G 5/0034 701/3 |
| 2007/0273514 A1* | 11/2007 | Winand | B64F 1/366 340/572.1 |
| 2008/0195442 A1* | 8/2008 | Blagg | G06Q 10/06 701/123 |
| 2008/0300737 A1* | 12/2008 | Sacle | G01C 21/00 701/3 |
| 2008/0300738 A1* | 12/2008 | Coulmeau | G01C 21/20 701/3 |
| 2009/0150012 A1* | 6/2009 | Agam | G01C 23/005 701/3 |
| 2009/0228202 A1* | 9/2009 | Wipplinger | G01C 21/00 701/467 |
| 2009/0234517 A1* | 9/2009 | Feuillebois | G06Q 50/28 701/3 |
| 2010/0198433 A1* | 8/2010 | Fortier | G05D 1/0005 701/14 |
| 2011/0155846 A1* | 6/2011 | Bulin | B64C 25/405 244/50 |
| 2011/0202205 A1* | 8/2011 | Pepitone | B64D 31/00 701/3 |
| 2012/0006935 A1* | 1/2012 | Bhargava | B64C 25/405 244/50 |
| 2012/0016575 A1* | 1/2012 | White | G08G 5/0026 701/123 |
| 2012/0061521 A1* | 3/2012 | Perry | B64F 1/227 244/189 |
| 2012/0265372 A1* | 10/2012 | Hedrick | H04L 67/36 701/3 |
| 2013/0046422 A1* | 2/2013 | Cabos | G08G 5/0034 701/3 |
| 2013/0261956 A1* | 10/2013 | Marks | G01C 21/3423 701/425 |
| 2014/0005861 A1* | 1/2014 | Mere | G08G 5/0039 701/3 |
| 2014/0188311 A1* | 7/2014 | Masson | B64D 43/00 701/3 |
| 2014/0278036 A1* | 9/2014 | Ince | G08G 5/0065 701/120 |
| 2015/0279217 A1* | 10/2015 | Chen | G08G 5/003 701/123 |
| 2015/0336676 A1* | 11/2015 | McCann | B64D 15/00 701/3 |

* cited by examiner

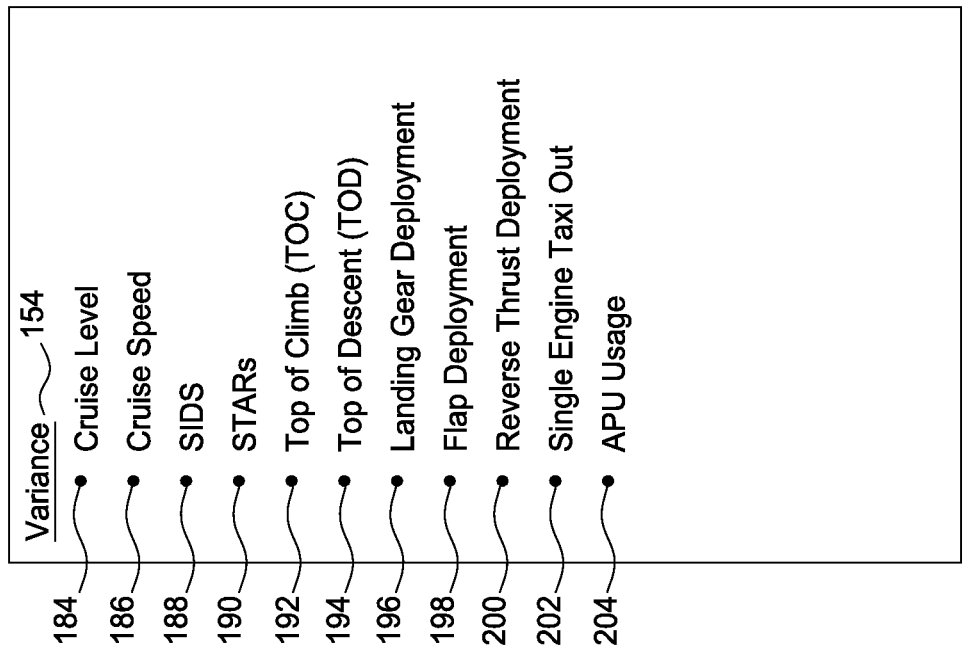
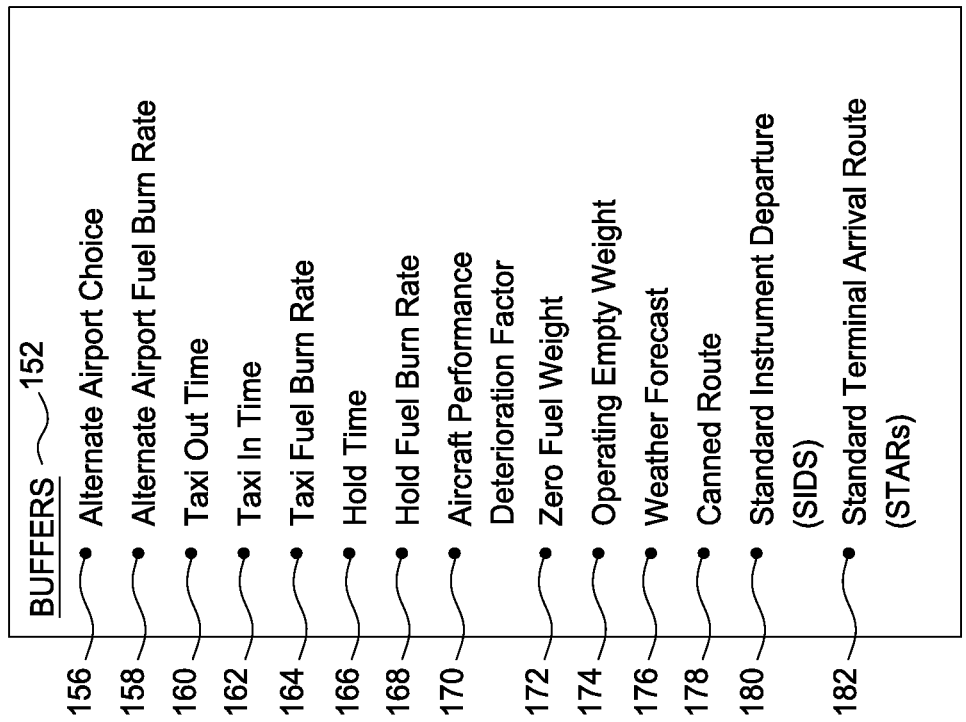
FIG. 4

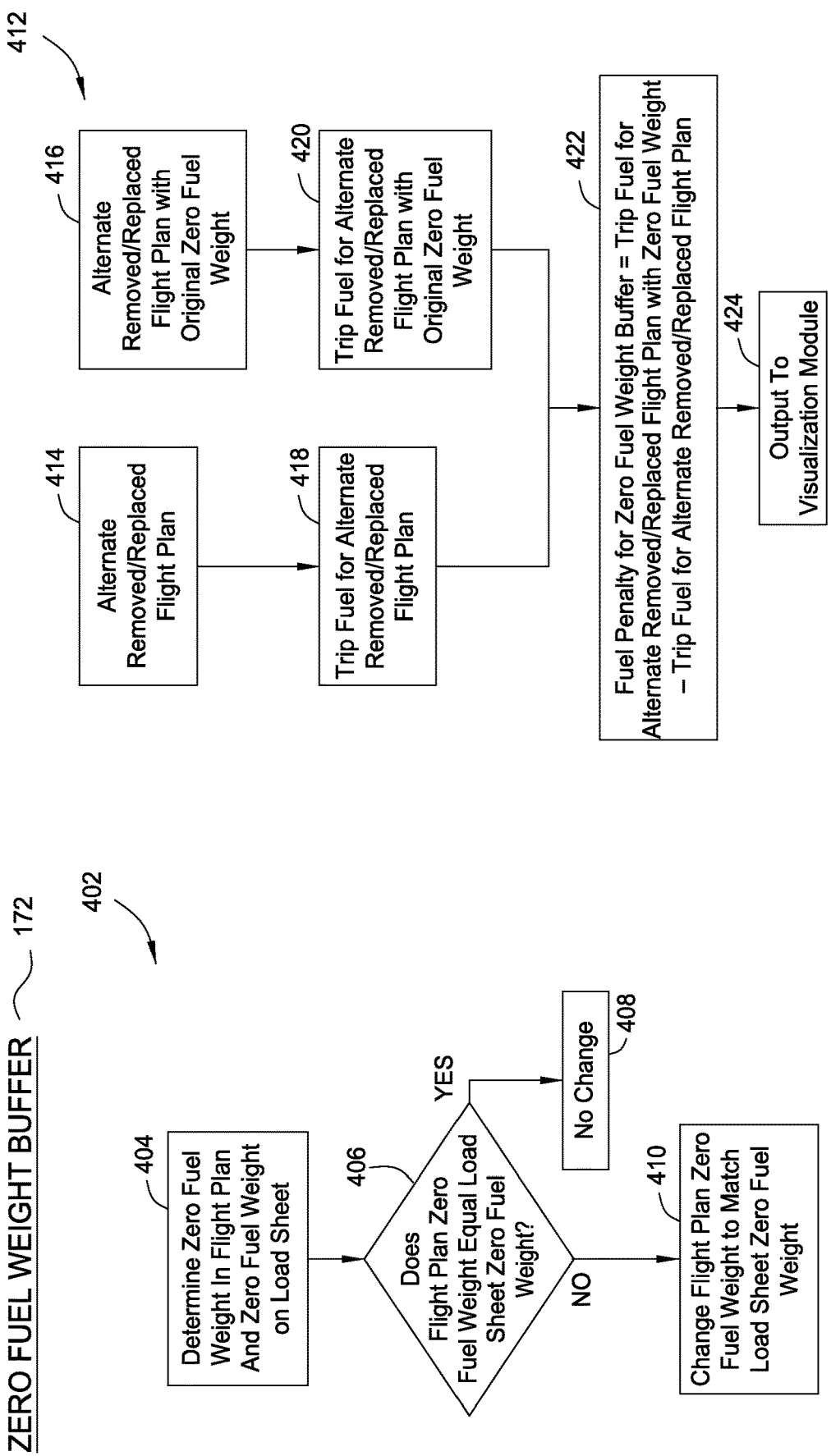

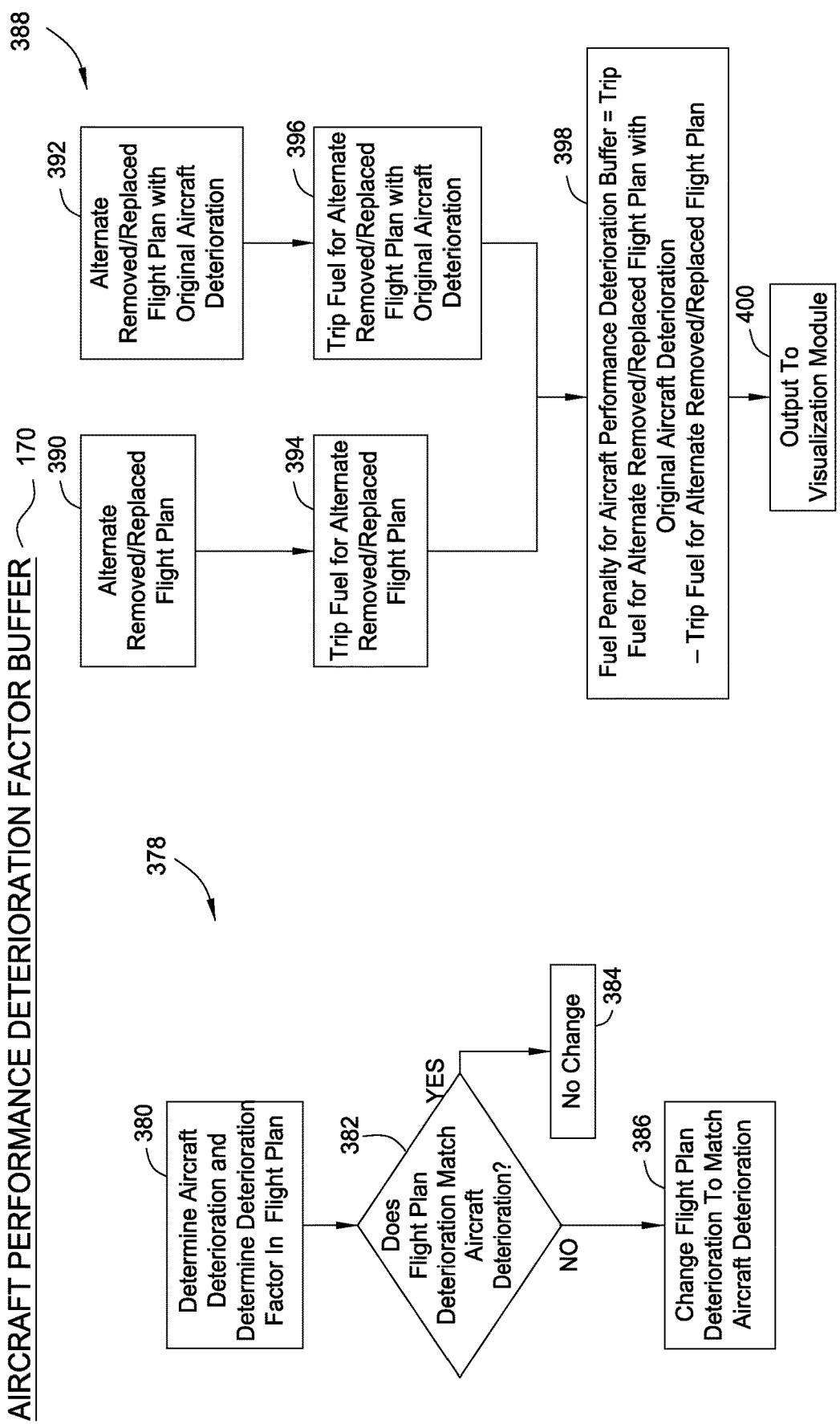

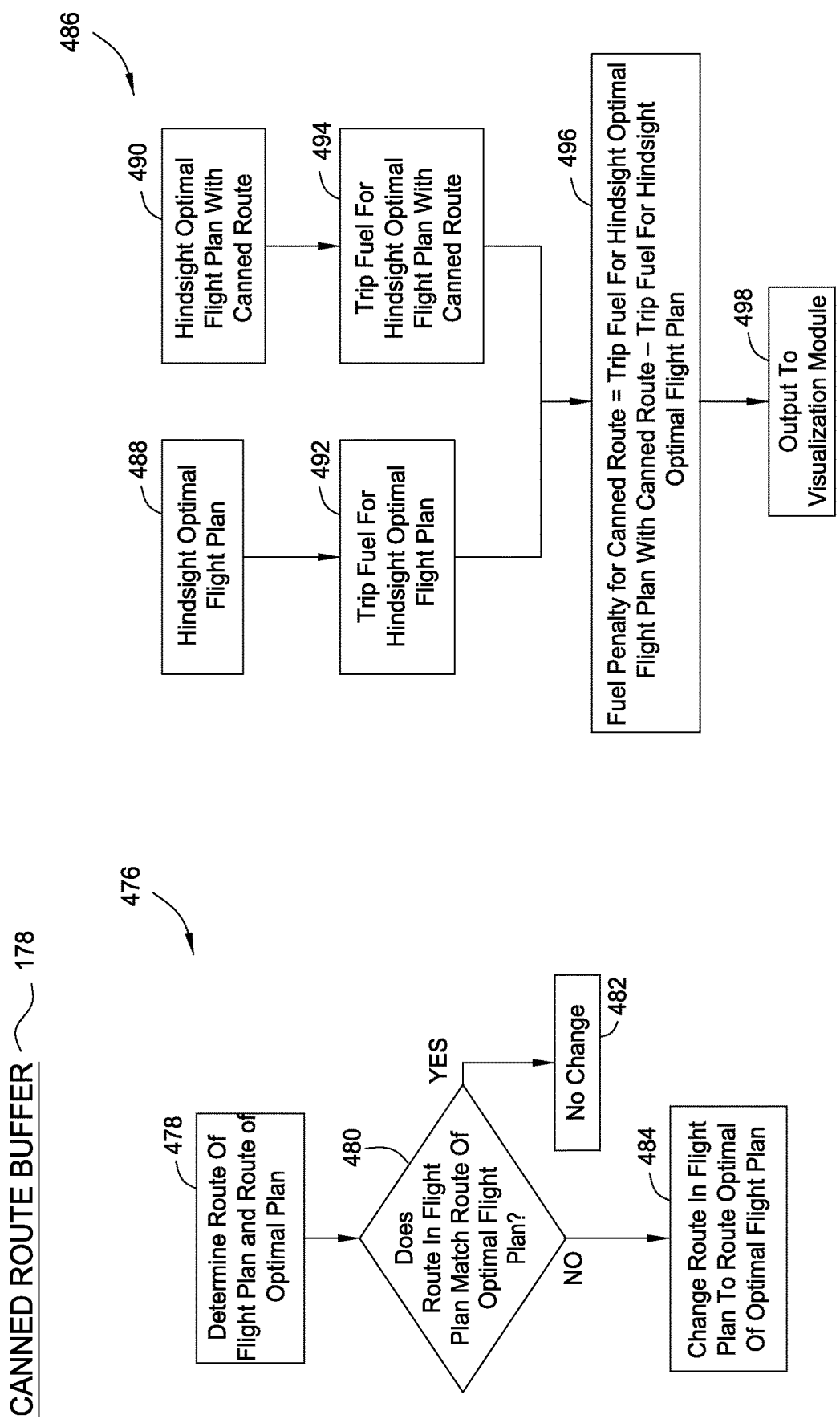

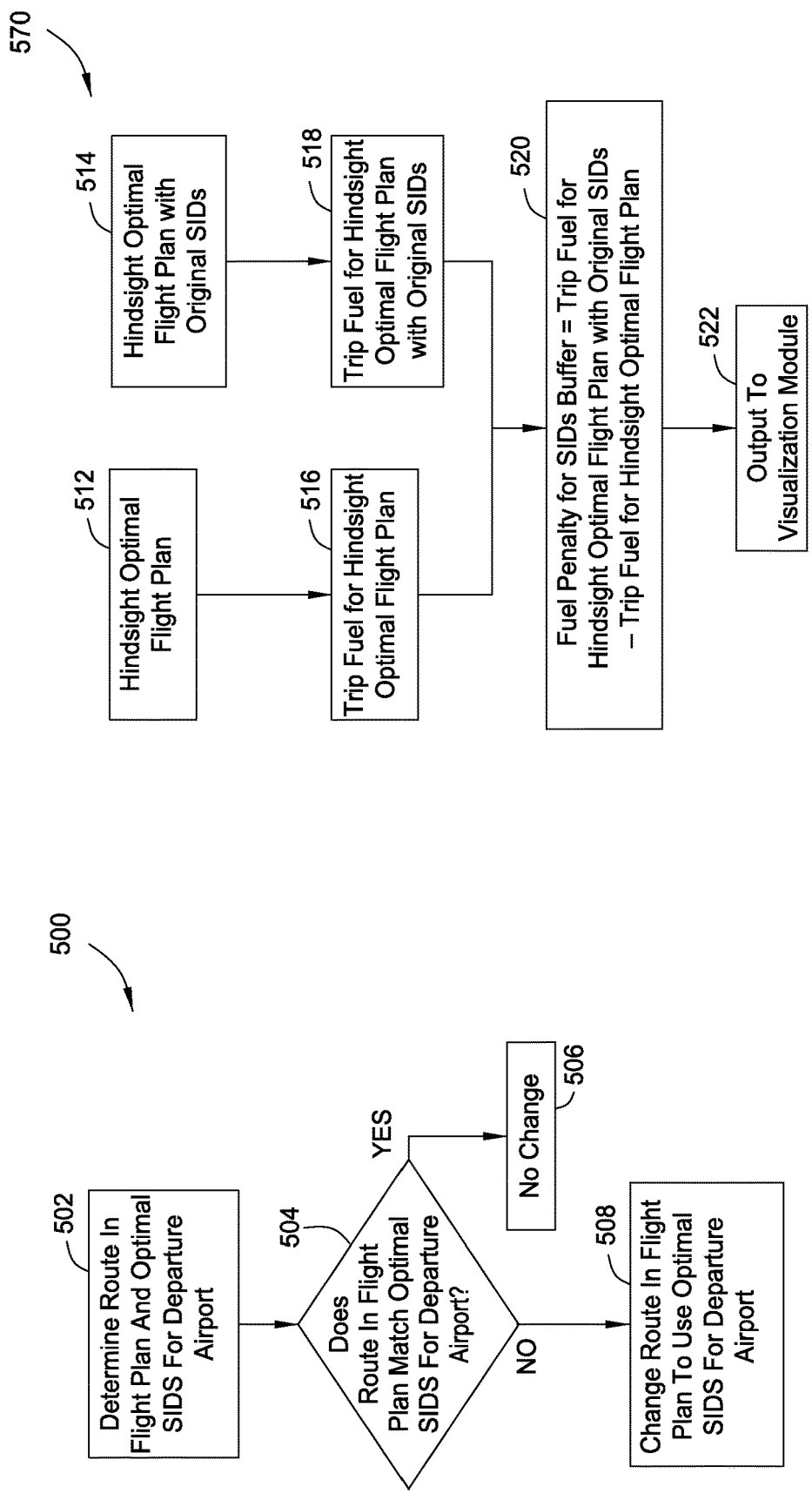

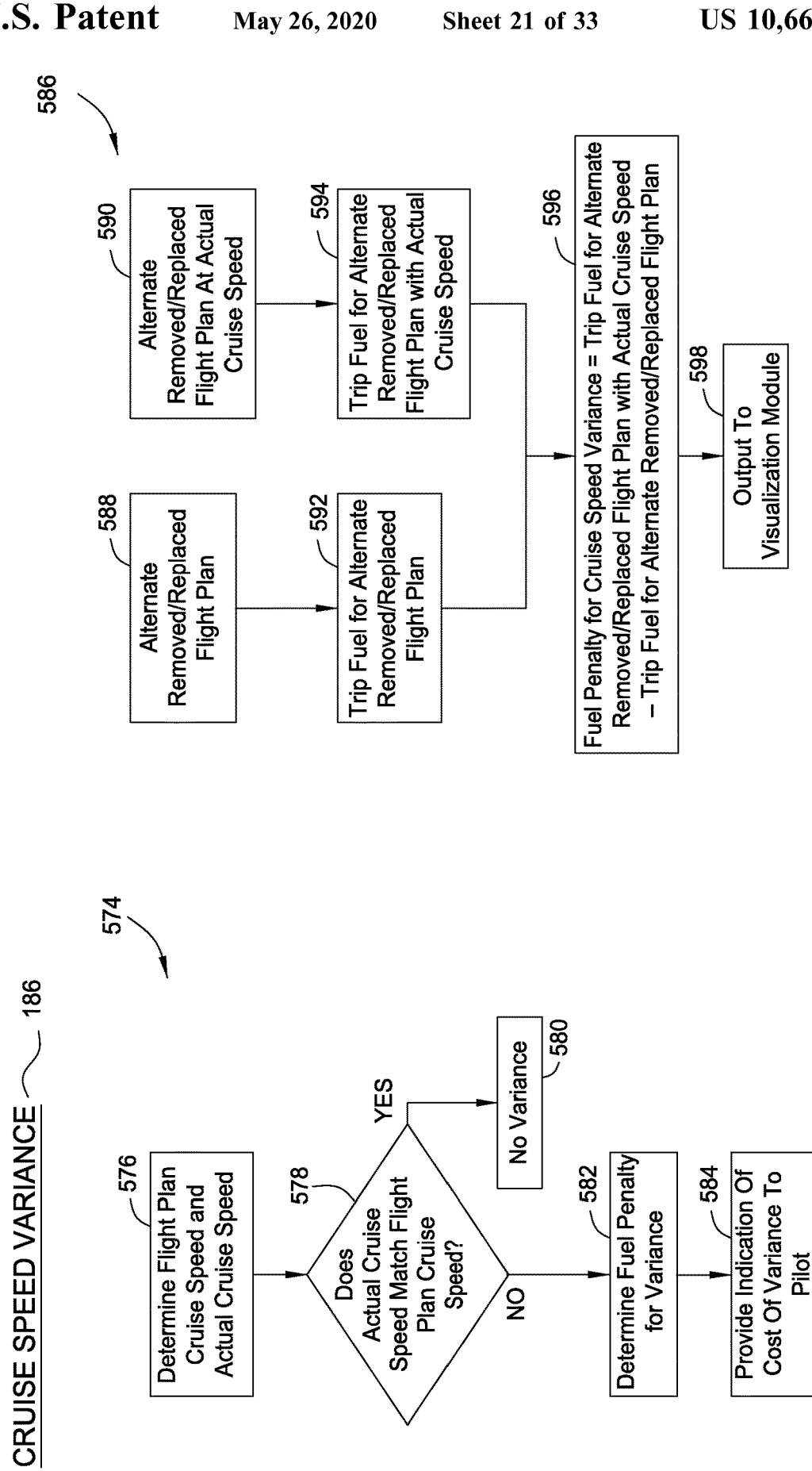

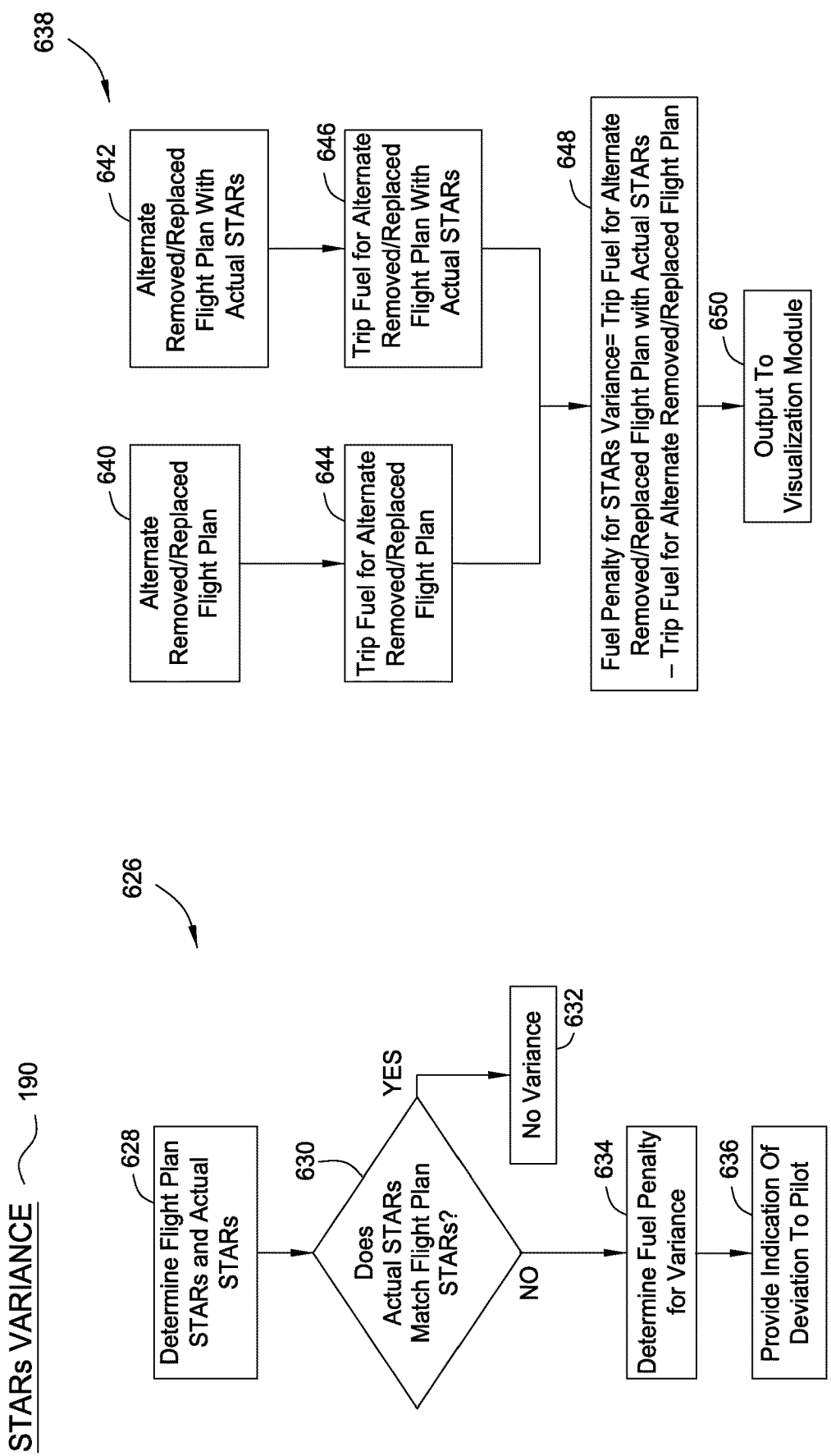

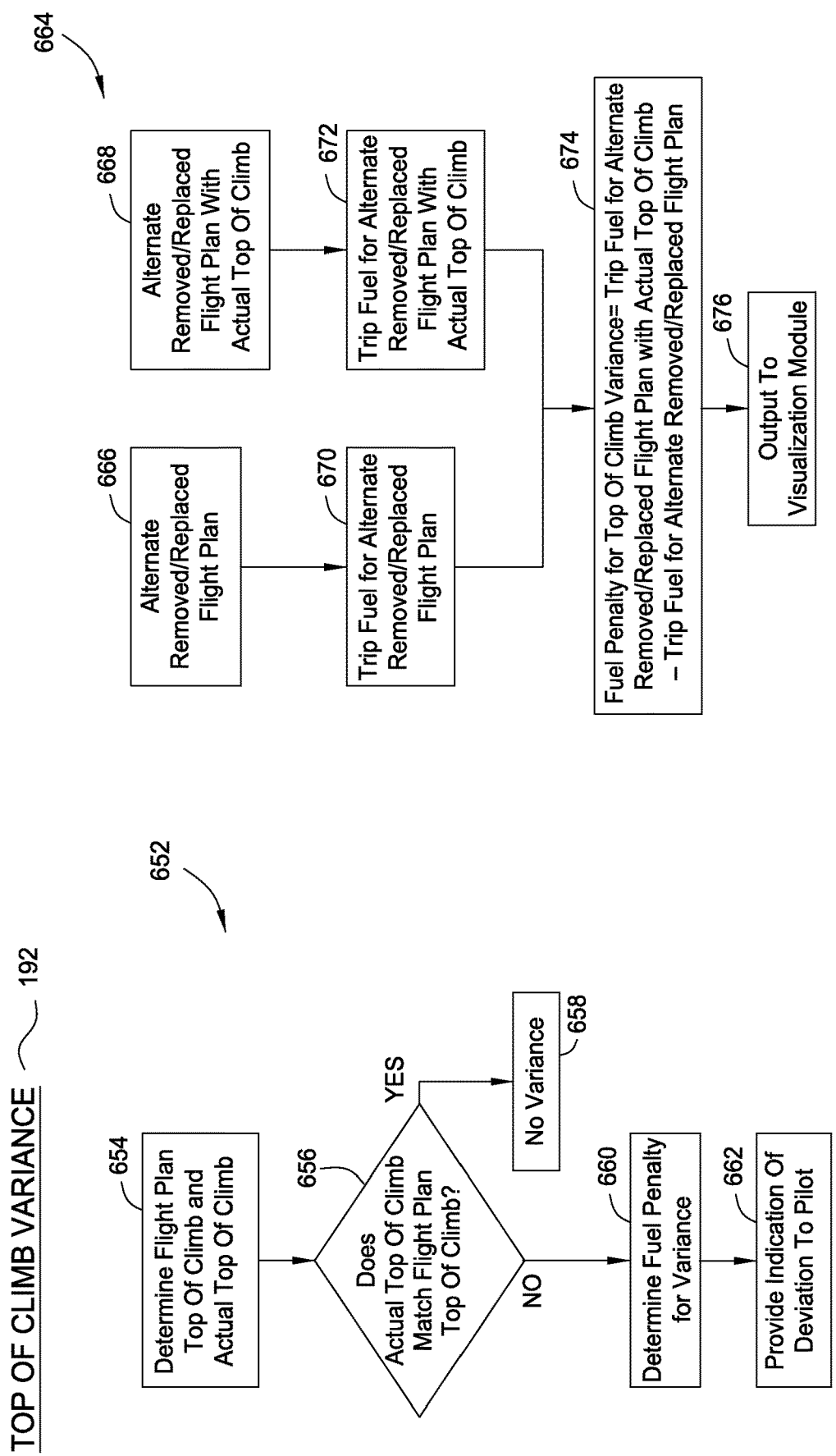

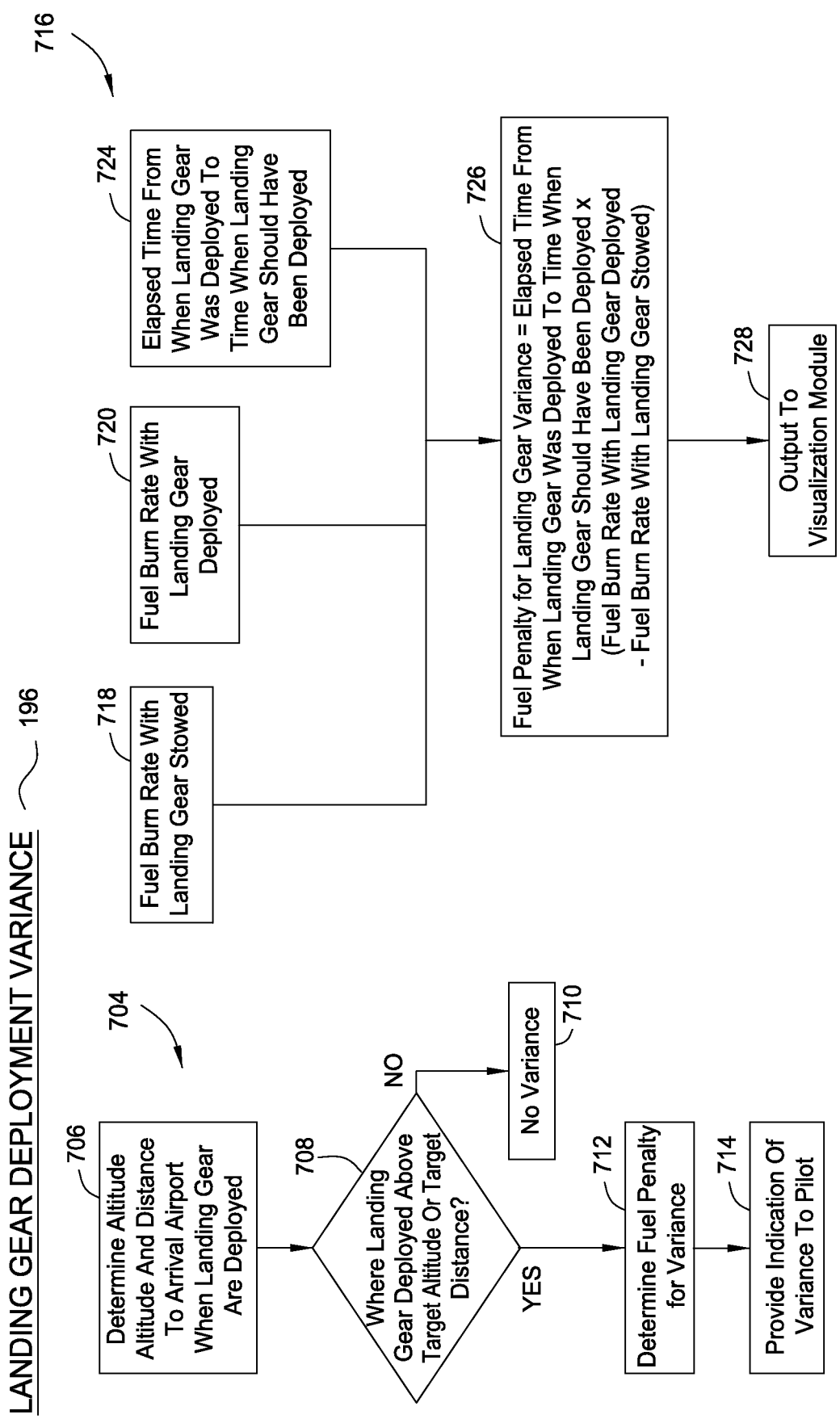

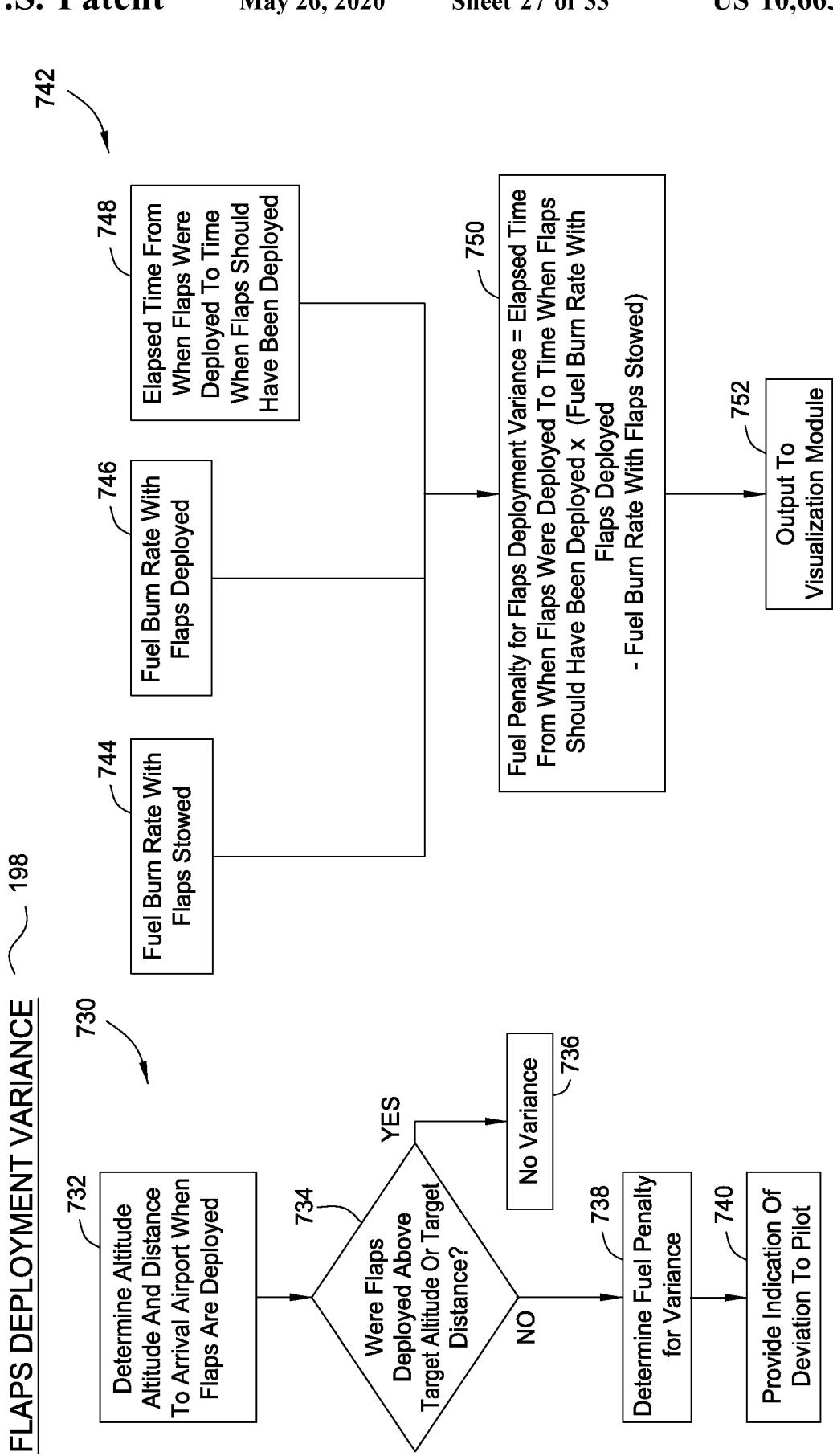

Output Variables
- Modeled Estimate of True Gross Weight
- Modeled Estimate of Thrust Specific Fuel Consumption (TSFC)
- Modeled Estimate of Thrust Required (Drag)
- Estimate of Real-Time Center of Gravity Possible Input Variables
- Altitude (from Aircraft Sensor Data)
- Mach Number (from Aircraft Sensor Data)
- Static Air Temperature (from Aircraft Sensor Data)
- Total Air Temperature (from Aircraft Sensor Data)
- Static Ambient Pressure (from Aircraft Sensor Data)
- Total Ambient Pressure (from Aircraft Sensor Data)
- Groundspeed (from Aircraft Sensor Data)
- Fuel Flow for Engine No. 1 (from Aircraft Sensor Data)
- Fuel Flow for Engine No. 2 (from Aircraft Sensor Data)
- Power Setting for Engine No. 1 (from Aircraft Sensor Data)
- Power Setting for Engine No. 2 (from Aircraft Sensor Data)
- Exhaust Gas Temperature for Engine No. 1 (from Aircraft Sensor Data)
- Exhaust Gas Temperature for Engine No. 2 (from Aircraft Sensor Data)
- Indicated Angle of Attack (AOA) (from Aircraft Sensor Data)
- Total Temperature Ratio (calculated)
- Density Altitude (from Aircraft Sensor Data)
- Calculated Density Altitude Normalization Factor
- Calculated True Airspeed
- Calibrated Airspeed
- Equivalent Airspeed
- Lift Coefficient for Given Flight Condition
- Fuel Mileage (calculated)
- Nominal Center of Gravity (from Load Sheet)
- Nominal Zero Fuel Weight (from Load Sheet)
- Nominal Gross Weight (Calculated)

FIG. 31

AIRCRAFT FUEL OPTIMIZATION ANALYTICS

BACKGROUND

An aircraft uses a certain amount of fuel to fly from a departure airport to a destination airport. The goal when planning a flight is to carry an amount of fuel that results in a minimum amount of fuel (dictated by safety and/or regulatory considerations) remaining at the destination airport. Carrying any additional fuel can be wasteful because the additional fuel increases the weight of the aircraft and thereby increases the fuel consumption and carbon emissions of the aircraft.

SUMMARY

As described above, inaccurate settings and/or inputs to current flight planning software may generate flight plans with inherent inaccuracies in the fuel calculations output by the software. For example, a particular flight plan (e.g., flight planning software model) may assume that every aircraft within an airline's fleet is worn by 2% (i.e., that each aircraft uses 2% more fuel across the board, then a brand-new aircraft). However, some aircraft in the fleet may be brand-new and have no wear. A pilot is unlikely to know the actual amount of wear in his aircraft or know how the flight planning software accounts for wear. As a result, the pilot might add extra fuel to his aircraft for a particular flight as a buffer.

Embodiments described herein provide a more-accurate flight planning model with buffers removed and, where applicable, actual aircraft factors applied. A buffer can be any overly-conservative factor applied to a flight plan that results in the flight carrying and using more fuel than necessary. The more-accurate flight planning model can enable an aircraft crew (e.g. pilot and copilot) to have greater confidence in the fuel load calculations output by the model. As a result, the flight crew may not add additional fuel to the flight plan. Additionally, in various embodiments, the flight crew can be provided with real-time feedback during the flight to show how any potential operational variances from the flight plan (e.g., cruising at a different altitude and/or speed) is affecting the cost of the flight as a function of fuel usage. Put differently, the pilots can be shown in real time how much a deviation from the flight plan is costing in terms of extra fuel used.

Embodiments described herein provide airlines or other aircraft operators with a flight planning model that more-accurately reflects a particular flight. For example, embodiments of the present invention can remove buffers built into an existing flight plan and optimize potential operational variances in plan execution for the flight to minimize fuel usage.

Embodiments described herein provide a system for analyzing a flight planning model to identify buffers contained therein and to remove them. As a result, the model can provide a more accurate estimate of the amount of fuel that will be used in a given flight. In various embodiments, the identification and removal of these buffers can include providing a cost analysis of what these buffers cost in terms of fuel load carried by the aircraft.

In various embodiments, a method for optimizing a flight plan for an aircraft from a departure airport to a destination airport can include comparing aspects of an operator flight plan to criteria. Each criterion can relate to an aspect of the operator flight plan. Upon determining that the operator flight plan deviates from at least one of the criteria, the method can amend aspects of the operator flight plan to minimize (e.g., eliminate) the deviation(s). The method can then output an amended flight plan that includes the amended aspects.

In various embodiments, a system for optimizing a flight plan for an aircraft from a departure airport to a destination airport can include a processor (e.g., a computer processor) and memory (e.g., computer memory). The memory can store an operator flight plan and a plurality of criteria. Each criterion can relate to an aspect of the operator flight plan. The memory can also store an application program configured to perform an operation in response to an execution of an algorithm on the processor. Running the operation, the processor can compare aspects of the flight plan to the criteria. Upon determining that the operator flight plan deviates from at least one of the criteria, the processor can amend aspects of the operator flight plan to minimize (e.g., eliminate) the deviation(s). The processor can then output an amended flight plan that includes the amended aspects.

In various embodiments, a computer program product for optimizing a flight plan for an aircraft from a departure airport to a destination airport can include a computer-readable storage medium with computer-readable code embodied therewith. The computer-readable code can include computer-readable code configured to compare aspects of an operator flight plan to criteria, wherein each criterion can relate to an aspect of the operator flight plan. The computer-readable code can also include computer-readable code configured to, upon determining that the operator flight plan deviates from at least one of the criteria, amend aspects of the operator flight plan to minimize (e.g., eliminate) the deviation(s). The computer-readable code can also include computer-readable code configured to output the amended flight plan that includes the amended aspects.

In various embodiments, a method for providing an indication of aircraft operation of an aircraft to a pilot of the aircraft can include monitoring a plurality of operating parameters of the aircraft during a flight. The method also includes determining that at least one of the operating parameters for the aircraft varies from a criterion associated with the parameter. The method includes providing an indication of the variance to the pilot(s).

In various embodiments, a system for providing an indication of aircraft operation of an aircraft to a pilot of the aircraft can include a processor and memory. The memory can store a flight plan for a flight of the aircraft and one or more criteria associated with operating parameters of the aircraft. The memory can also store an application program configured to perform an operation in response to an execution of an algorithm on the processor. Running the operation, the processor can monitor a plurality of operating parameters of the aircraft during flight operations. The processor can also determine that at least one of the operating parameters varies from a criterion associated with the parameter. The processor can then provide an indication of the variance to the pilot(s).

In various embodiments, a computer program product for providing an indication of aircraft operation of an aircraft to a pilot of the aircraft can include a computer-readable storage medium with computer-readable code embodied therewith. The computer-readable code can include computer-readable code configured to monitor a plurality of operating parameters of the aircraft during aircraft operations. The computer-readable code can also include computer-readable code configured to determine that at least one of the operating parameters varies from a criterion associated with the parameter. The computer-readable code can also include computer-readable code configured to provide an indication of the variance to the pilot(s).

In various embodiments, a method for calculating a weight of an aircraft can include receiving historical flight data for a plurality of flights for the aircraft. A statistical analysis of the historical data can determine a statistical model that can be used to determine a gross weight of the aircraft. The determined statistical model can be used with respect to data for a plurality of flights to calculate a gross weight of the aircraft for the plurality of flights. Variances between the calculated gross weights of the aircraft and gross weights from load sheets for the respective plurality of flights can then be determined.

In various embodiments, a system for calculating a weight of an aircraft can include a processor and a memory. The memory can store historical flight data for a plurality of flights for an aircraft. The memory can also store an application program configured to perform an operation in response to an execution of an algorithm, wherein the algorithm is configured to output a calculated weight for the aircraft. The processor can perform the operation to perform statistical analysis of the historical data can determine a statistical model that can be used to determine a gross weight of the aircraft. The processor can then operate the statistical model with respect to data for a plurality of flights to calculate a gross weight of the aircraft for the plurality of flights. The processor can then determine variances between the calculated gross weights of the aircraft and gross weights from load sheets for the respective plurality of flights.

In various embodiments, a computer program product for calculating a weight of an aircraft can include a computer-readable storage medium with computer-readable code embodied therewith. The computer-readable code can include computer-readable code configured to receive historical flight data for a plurality of flights of an aircraft. The computer-readable code can also include computer-readable code configured to perform a statistical analysis on the set of historical flight data to determine a statistical model for determining gross weight of the aircraft. The computer-readable code can also include computer-readable code configured to operate the statistical model using flight data for a plurality of flights of the aircraft to determine gross weights of the aircraft for the respective plurality of flights. The computer-readable code can also include computer-readable code configured to determine variances between the determined gross weights of the aircraft and gross weights of the aircraft from load sheets for the respective flights.

In various embodiments, a method for calculating a performance wear factor for an aircraft can include receiving historical flight data for a plurality of flights for the aircraft. A statistical analysis of the historical data can determine a statistical model that can be used to determine at least one of aircraft performance and engine performance. The determined statistical model can be used with respect to data for a plurality of flights to calculate aircraft performance and engine performance for the plurality of flights. Variances between the determined aircraft performance and engine performance of the aircraft and aircraft performance and engine performance from manufacturer-provided data can then be determined.

In various embodiments, a system for calculating a performance wear factor for an aircraft can include a processor and memory. The memory can store historical flight data for a plurality of flights for an aircraft. The memory can also store an application program configured to perform an operation in response to an execution of an algorithm, wherein the algorithm is configured to output a determined aircraft performance and engine performance. The processor can perform the operation to perform statistical analysis of the historical data can determine a statistical model that can be used to determine aircraft performance and engine performance. The processor can then operate the statistical model with respect to data for a plurality of flights to calculate an aircraft performance and engine performance for the plurality of flights. The processor can then determine variances between the determined aircraft performance and engine performance of the aircraft and aircraft performance and engine performance from manufacturer-provided data can then be determined.

In various embodiments, a computer program product for calculating an aircraft performance and engine performance can include a computer-readable storage medium with computer-readable code embodied therewith. The computer-readable code can include computer-readable code configured to receive historical flight data for a plurality of flights of an aircraft. The computer-readable code can also include computer-readable code configured to perform a statistical analysis on the set of historical flight data to determine a statistical model for determining aircraft performance and engine performance. The computer-readable code can also include computer-readable code configured to operate the statistical model with respect to data for a plurality of flights to calculate an aircraft performance and engine performance for the plurality of flights. The computer-readable code can also include computer-readable code configured to determine variances between the determined aircraft performance and engine performance of the aircraft and aircraft performance and engine performance from manufacturer-provided data can then be determined.

In various embodiments, a method for determining real-world limitations for preparing flight plans from a departure airport to a destination airport can include receiving historical flight data for a plurality of flights from the departure airport to the destination airport. A statistical analysis can be performed on the historical data to identify one or more real-world limitations on the flights. A flight plan for a future flight from the departure airport to the destination airport can be amended based on the identified one or more real-world limitations.

In various embodiments, a system for determining real-world limitations for preparing flight plans from a departure airport to a destination airport can include a processor and memory. The memory can store historical data for a plurality of flights from the departure airport to the destination airport. The memory can also store an application program configured to perform an operation in response to an execution of an algorithm, wherein the algorithm is configured to output an amended flight plan. The processor can perform the operation to perform a statistical analysis on the stored historical data to identify one or more real-world limitations on the flights from the departure airport to the destination airport. The processor can amend a flight plan for a future flight from the departure airport to the destination airport based on the identified one or more real-world limitations. The processor can then output the amended flight plan.

In various embodiments, a computer program product for determining real-world limitations for preparing flight plans from a departure airport to a destination airport can include a computer-readable storage medium with computer-readable code embodied therewith. The computer-readable code can include computer-readable code configured to receive historical flight data for a plurality of flights from the departure airport to the destination airport. The computer-readable code can also include computer-readable code configured to perform a statistical analysis on the historical data to identify one or more real-world limitations on the flight. The computer-readable code can also include computer-readable code configured to amend a flight plan for a future flight from the departure airport to the destination airport based on the identified one or more real-world limitations.

BRIEF DESCRIPTION OF THE SEVERAL VIEWS OF THE DRAWINGS

FIG. 4 illustrate an exemplary list of buffers that embodiments of an airline fuel profiler may identify and/or remove from the operator's flight plan and an exemplary list of potential operational variances that embodiments of an airline fuel profiler may analyze;

FIG. 5A illustrates an exemplary process that embodiments of an airline fuel profiler may use to determine whether a operator-provided flight plan includes a zero fuel weight buffer;

FIG. 5B illustrates an exemplary process that embodiments of an airline fuel profiler may use to determine the cost, in terms of trip fuel, for an identified zero fuel weight buffer in the operator-provided flight plan;

FIG. 12A illustrates an exemplary process that embodiments of an airline fuel profiler may use to determine whether a operator-provided flight plan includes aircraft performance wear factor buffer;

FIG. 12B illustrates an exemplary process that embodiments of an airline fuel profiler may use to determine the cost, in terms of trip fuel, for an identified aircraft performance wear factor buffer in the operator-provided flight plan;

FIG. 14A illustrates an exemplary process that embodiments of an airline fuel profiler may use to determine whether a operator-provided flight plan includes a canned route buffer;

FIG. 14B illustrates an exemplary process that embodiments of an airline fuel profiler may use to determine the cost, in terms of trip fuel, for an identified canned route buffer in the operator-provided flight plan;

FIG. 15A illustrates an exemplary process that embodiments of an airline fuel profiler may use to determine whether a operator-provided flight plan includes a Standard Instrument Departure (SIDs) buffer;

FIG. 15B illustrates an exemplary process that embodiments of an airline fuel profiler may use to determine the cost, in terms of trip fuel, for an identified SIDs buffer in the operator-provided flight plan;

FIG. 20A illustrates an exemplary process that embodiments of an airline fuel profiler may use to determine whether operation of an aircraft includes a cruise speed that varies from a cruise speed in a flight plan for the aircraft;

FIG. 20B illustrates an exemplary process that embodiments of an airline fuel profiler may use to determine a cost, in terms of trip fuel, for the cruise speed potential operational variance;

FIG. 22A illustrates an exemplary process that embodiments of an airline fuel profiler may use to determine whether operation of an aircraft includes a STARs that varies from a STARs in a flight plan for the aircraft;

FIG. 22B illustrates an exemplary process that embodiments of an airline fuel profiler may use to determine a cost, in terms of trip fuel, for the STARs potential operational variance;

FIG. 23A illustrates an exemplary process that embodiments of an airline fuel profiler may use to determine whether operation of an aircraft includes a Top of Climb (TOC) that varies from a TOC in a flight plan for the aircraft;

FIG. 23B illustrates an exemplary process that embodiments of an airline fuel profiler may use to determine a cost, in terms of trip fuel, for the TOC potential operational variance;

FIG. 25A illustrates an exemplary process that embodiments of an airline fuel profiler may use to determine whether operation of an aircraft includes a landing gear deployment position that varies from an optimal landing gear deployment position;

FIG. 25B illustrates an exemplary process that embodiments of an airline fuel profiler may use to determine a cost, in terms of trip fuel, for the landing gear deployment time potential operational variance;

FIG. 26A illustrates an exemplary process that embodiments of an airline fuel profiler may use to determine whether operation of an aircraft includes a flaps deployment time that varies from an optimal flaps deployment time;

FIG. 26B illustrates an exemplary process that embodiments of an airline fuel profiler may use to determine a cost, in terms of trip fuel, for the flaps deployment time potential operational variance;

FIG. 31 illustrates exemplary input variables that embodiments of an airline fuel profiler can use to statistically analyze and predict exemplary output variables.

DETAILED DESCRIPTION

Before flying from a departure airport to a destination airport, a flight plan is often prepared. Typically, operators (e.g., airlines) employ flight dispatchers who use a flight planning software program (i.e., a flight planning model) to prepare a flight plan for a particular flight. The flight planning software also can calculate a fuel load (i.e., trip fuel) used to execute the flight plan and have sufficient fuel upon landing to satisfy regulations and safety concerns. Generally, the flight planning software can calculate an amount of fuel used for each phase of flight and adds the different fuel amounts together to calculate the total amount of fuel to be used. Flight planning software can often make assumptions about the different phases of flight and about the aircraft's performance during the different phases to calculate the fuel load. For example, a flight planning program may always assume that taxi time from the departure gate to the runway will be thirty minutes, regardless of what airport the aircraft is departing from. These assumptions (i.e., buffers, factors, or criteria) can distort the fuel calculation when they differ from actual operating conditions. Continuing the example above, an aircraft may carry excess fuel if departing from an airport where the taxi time is only five minutes long. These assumptions are often not visible to the flight planners or pilots. As a result, pilots will often request extra fuel to their flights.

The flight planning programs also often include a simplified set of available routes and airport in the world. For example, a database for a flight planning program used by an airline may only include a subset of airports that the airline uses (i.e., "on-line" airports). As another example, a database may not include all of the different airways available for flight. Instead, flight dispatchers choose from "canned" routes that are used over and over. The databases for flight planning programs also may lack detailed information about each of the airports. For example, a database may not have altitude data for each airport and therefore assume that all runways are at sea level. The limited data may prevent the flight planning software and the airline's dispatcher from considering more efficient flight routes. The simplified airport databases can cause the flight planning program to miscalculate the amount of fuel used for a flight. For example, an aircraft will use less fuel to climb to 35,000 feet if it departs from Denver, Colo. (approximately one mile above sea level) instead of San Francisco, Calif. (approximately at sea level).

Overview

Figure 1:
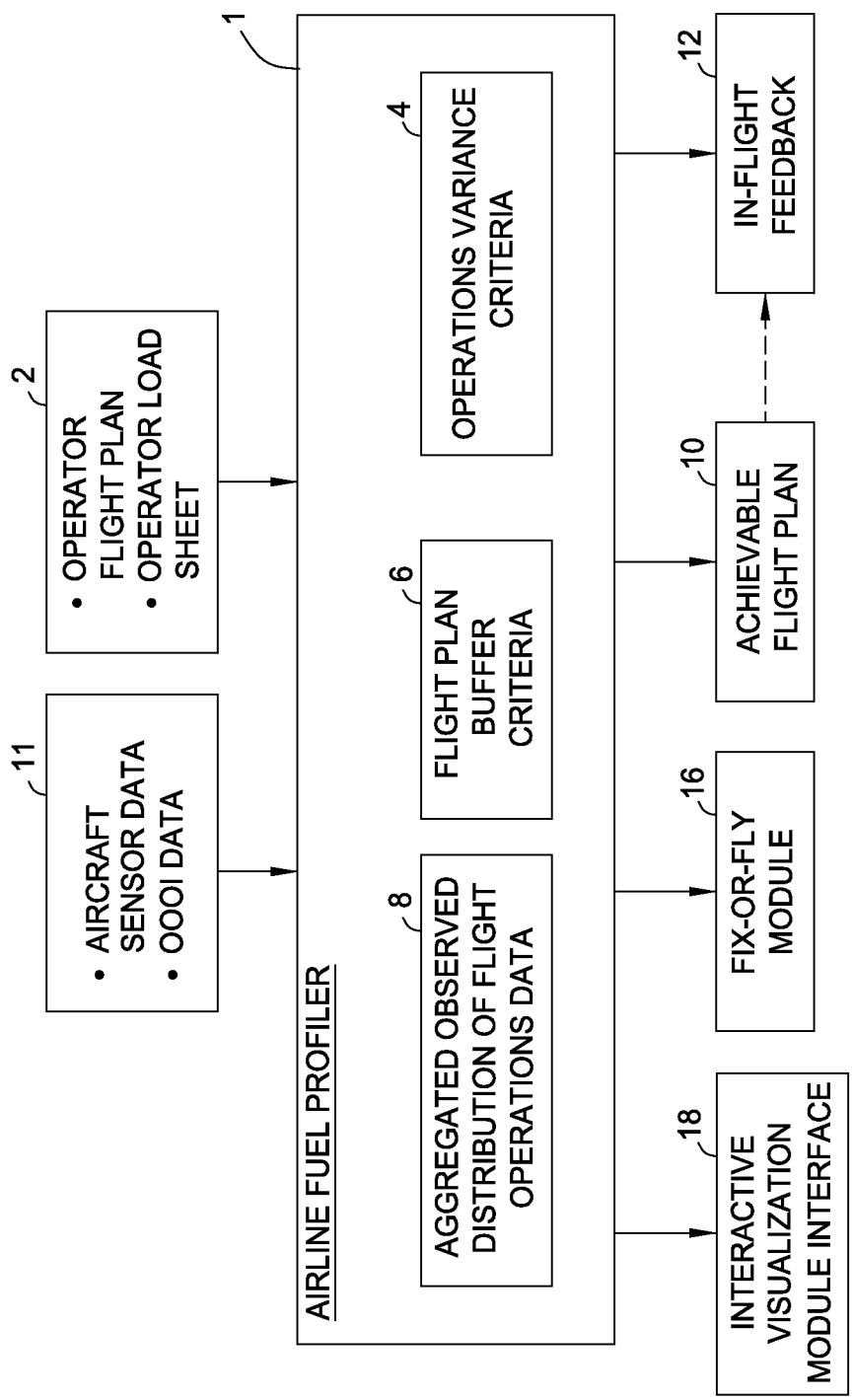
FIG. 1. is a block diagram of an embodiment of an airline fuel profiler application, showing various inputs to and outputs from the airline fuel profiler application.

With reference now to FIG. 1, embodiments of an airline fuel profiler 1 can receive an operator's flight plan 2 and can perform operations on the operator flight plan 2 to output an optimal, achievable flight plan 10 that results in a realistically minimal fuel load. In various embodiments, the airline fuel profiler 1 can import the operator's flight plan 2 into a more-sophisticated flight planning model that includes a larger and more accurate depiction of airports and air navigation routes than the operator's flight planning model. Using either the operator's flight plan 2 or a version of the operator's flight plan 2 after being imported into the more-sophisticated model, the airline fuel profiler 1 can compare the operator flight plan 2 to buffer criteria 6 to determine whether the flight plan includes any buffers. As described above and in greater detail below, buffers can include assumptions, factors, and/or the like about different phases of flight that are built into the flight planning process and may not reflect actual operating conditions. The buffers in a flight planning process can result in an aircraft carrying unnecessary fuel on a trip. As an initial step, the airline fuel profiler 1 can compare the operator flight plan 2 to predetermined limits. For example, continuing the example of taxi out time discussed above, the buffer criteria 6 in the airline fuel profiler 1 can include an initial taxi out time threshold value for flights departing from congested airports (e.g., O'Hare International Airport in Chicago, Ill.) for thirty minutes and an initial taxi out time threshold value for flights departing from uncongested airports (e.g., Piedmont Triad International Airport in Greensboro, N.C.) for five minutes. If the taxi out time in the operator's flight plan 2 exceeds the appropriate threshold time, then the operator flight plan 2 includes a buffer. The airline fuel profiler 1 can remove the buffer from the operator flight plan 2 and replace it with the appropriate threshold time. The airline fuel profiler 1 can compare the operator's flight plan 2 to a number of buffer criteria 6 to provide a flight plan with more-realistic assumptions used for fuel planning.

Embodiments of the airline fuel profiler 1 can also gather realistic operation data 8 from cumulative flights (i.e., aggregated observed distribution of flight operations data) and can analyze the data 8 to update the buffer criteria 6. Continuing the taxi out time example from above, the actual operation data 8 may reveal the flights departing from O'Hare International Airport typically taxi for forty five minutes. As a result, the airline fuel profiler 1 can update the buffer criteria 6 to set the taxi out threshold time for O'Hare to forty five minutes. The actual operation data 8 can also be used by the airline fuel profiler 1 to identify real-world limitations that may cause an aircraft to operate in a suboptimal manner that affects fuel usage. For example, an aircraft flying from Atlanta, Ga. to New York City may fly most efficiently at 35,000 feet. However, air traffic control may routinely limit such flights to 24,000 feet. As a result, the actual operation data 8 will show that most flights from Atlanta to New York City cruise at 24,000 feet. The airline fuel profiler 1 can analyze the actual operation data 8 and recognize this altitude limitation. Thereafter, the airline fuel profiler 1 can enforce a 24,000 foot ceiling for cruise in the operator's flight plan 2. Accordingly, the fuel load calculation can account for the less-efficient cruise altitude of 24,000 feet that is likely rather than a more-efficient cruise altitude of 35,000 feet that is unlikely to be achieved on the flight.

In various embodiments, after comparing the operator's flight plan 2 to the buffer criteria 6 and removing any buffers, the airline fuel profiler 1 can output an achievable flight plan 10. The achievable flight plan 10 includes an achievable routing for the aircraft that minimizes the amount of fuel used to get from the departure airport to the arrival airport. The achievable flight plan 10 includes a calculated fuel load for the aircraft.

The airline fuel profiler 1 can also output in-flight feedback 12 to the pilots during operation of the flight. The airline fuel profiler 1 can monitor aircraft performance during a flight and compare the performance of the aircraft against the achievable flight plan 10 and also against operational variance criteria 4. The airline fuel profiler 1 can flag potential operational variances from the achievable flight plan 10 and provide an indication of the potential operational variance to the pilots (e.g., through an electronic flight bag product on a personal tablet computer). The airline fuel profiler 1 can also flag potential operational variances from various operational variance criteria 4 and provide an indication to the pilots of such potential operational variances. For example, lowering the landing gear of an aircraft increases drag, requiring more thrust (and using more fuel) to maintain airspeed. If the pilots extend the gear earlier than necessary, then the pilots use more fuel than necessary. The airline fuel profiler 1 can monitor the time during flight when the pilots extend the landing gear and, if the landing gear is extended too early, provide an indication to the pilots that the landing gear was extended early. In various embodiments, the in-flight feedback 12 can include a cost indication to the pilots (e.g., the cost in extra fuel used due to the potential operational variances).

The airline fuel profiler 1 can also output various visualizations to provide airlines, flight dispatchers, and pilots with metrics to understand how the flight plans can be better prepared and how flight operations can be more-efficiently conducted. For example, the visualizations can include indications of detected buffers in flight plans, such as identifications of buffers found in flight plans and calculated costs of the buffers. The visualizations can also include information about real-world constraints on flight plans. Continuing the example above, visualizations can provide an indication that flights from Atlanta to New York City are being limited to 24,000 feet cruising altitude. The visualizations can also include indications of potential operational variances. For example, continuing the example above, the visualizations can include an indication of early landing gear deployment and a calculated cost of such early deployment.

The airline fuel profiler 1 can also analyze aircraft sensor data (e.g., high-sample-rate aircraft data retrieved from a Quick Access Recorder ("QAR")) from cumulative flights of an aircraft. The airline fuel profiler 1 can analyze portions of the Aircraft sensor data captured at steady-state cruise phases of flight. Through statistical analysis techniques, such as linear regression, non-linear regression, and/or machine learning, the airline fuel profiler 1 can provide an indication of whether fuel economy (nautical miles per hour divided by fuel flow (in pounds per hour)) is decreasing over time and how much of a decrease is due to engine wear, airframe drag, and/or weight variance (e.g., the passengers getting heavier). The engine wear, airframe drag, and/or weight variances can be fed back into the aggregated observed distribution of flight operations data 8 of the airline fuel profiler 1 to update the flight planning model for particular aircraft.

Figure 2A:
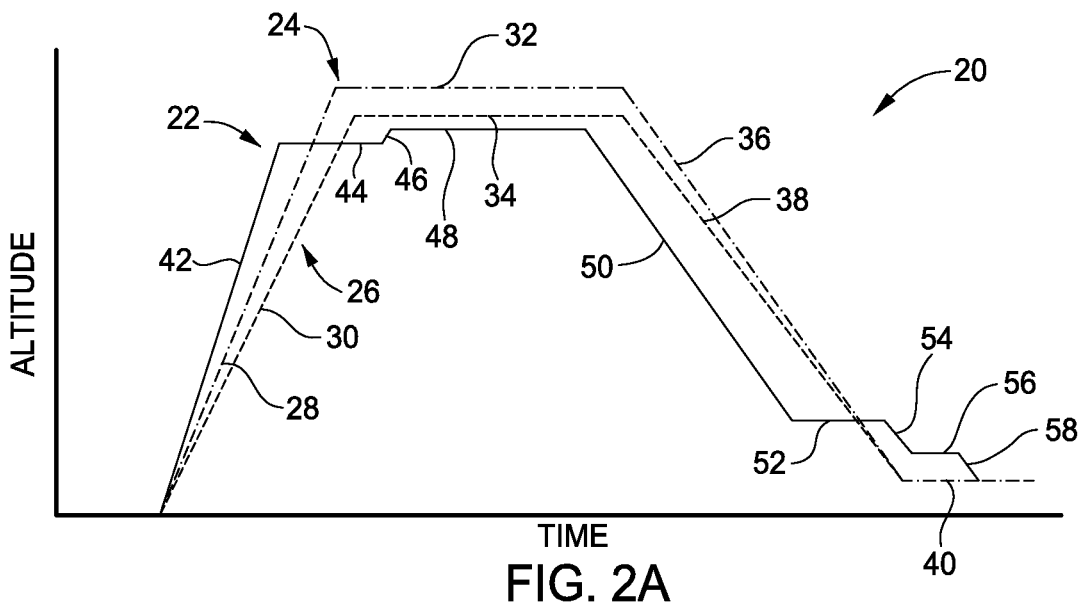
FIG. 2A is a graphical illustration of an altitude profile for a particular flight of an aircraft, an altitude profile for an original flight plan for the flight, and an altitude profile for an optimized flight plan for the flight.
Figure 2B:
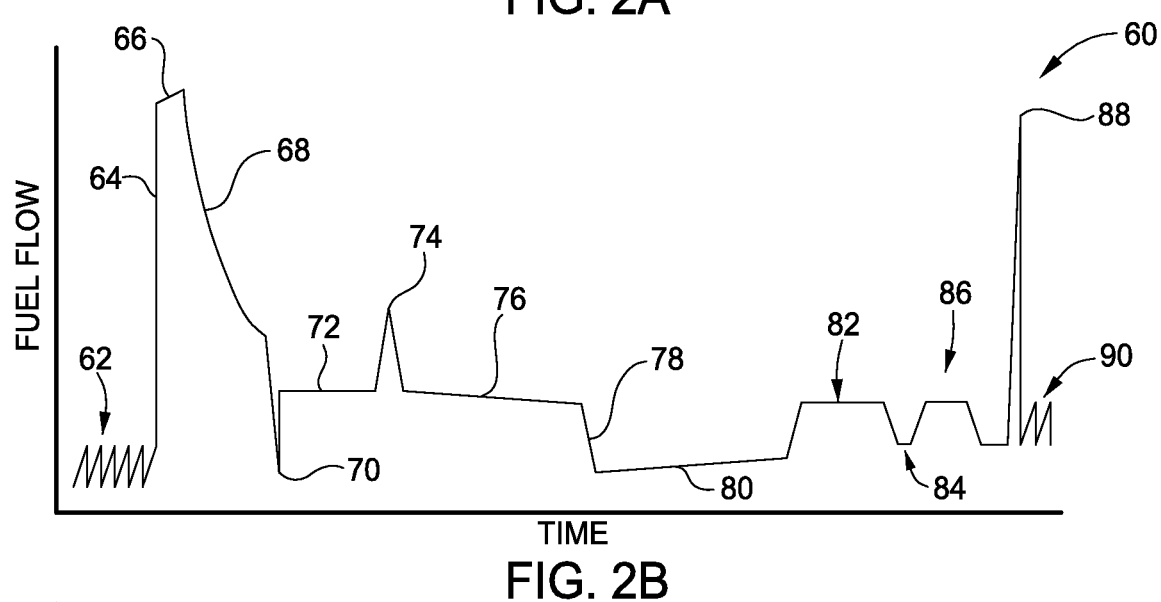
FIG. 2B is a graphical illustration of a fuel flow profile for the particular flight shown in FIG. 2A.
Figure 2C:
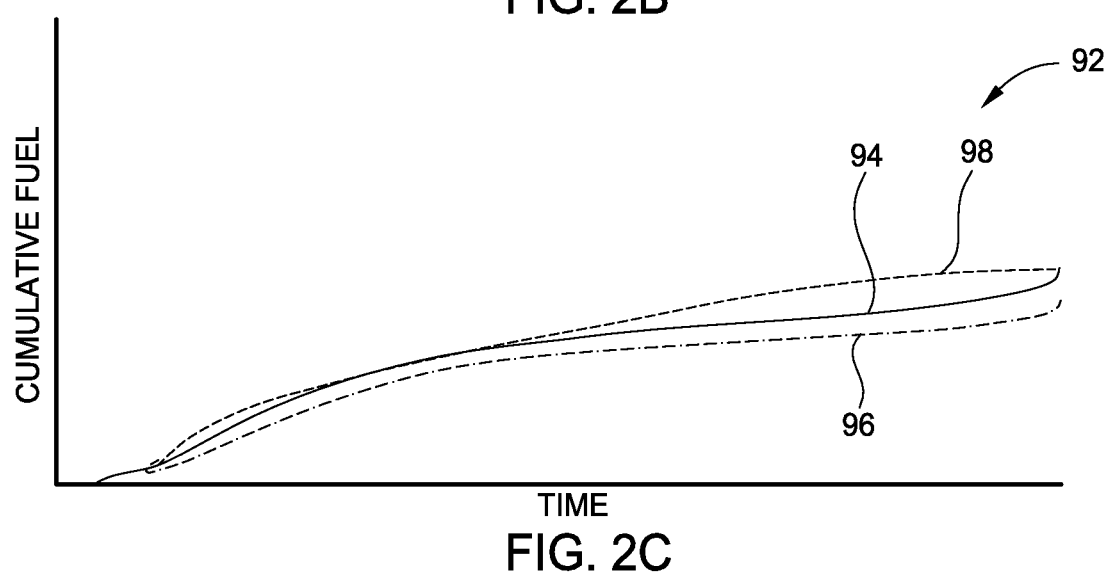
FIG. 2C is a graphical illustration of a cumulative fuel profile for the particular flight shown in FIG. 2A.

FIGS. 2A-2C show in chart form an example flight from a departure gate to an arrival gate. FIG. 2A illustrates altitude profiles 20 associated with the particular flight. A first profile 26 represents the operator's original flight plan. A second profile 24 represents an achievable flight plan. A third profile 22 represents the actual flight operation of the aircraft. In this exemplary flight, the actual flight 22 includes a steeper climb profile 42 than the original flight plan 30 or the achievable flight plan 28. However, the actual flight 22 levels off at a lower altitude than the achievable flight plan 32 or the original flight plan 34. The actual flight 22 levels off at a first cruise altitude 44 and then climbs at 46 to a second cruise altitude 48. The actual flight 22 then begins a descent 50 at an earlier point than the descent 36 for the achievable flight plan 24 or the descent 38 for the original flight plan 26. Both the original flight plan 26 and the achievable flight plan 24 call for the aircraft to maintain its descent rate all the way to a landing 40. However, the actual aircraft 22 levels off early 52 and then proceeds along a step down descent, as indicated by reference numbers 54, 56, and 58, before landing 40.

FIG. 2B illustrates a fuel flow profile 60 for the actual aircraft flight 22. Before takeoff, the fuel flow is variable during a taxi out phase 62 of the flight as the pilots vary the engine thrust to taxi to the runway. At reference numbers 64 and 66, fuel flow increases rapidly as the pilots apply takeoff thrust and the aircraft lifts off. As the aircraft climbs, fuel consumption will decrease as the aircraft flies into thinner air, as indicated by reference number 68. As indicated by reference number 70, the fuel flow will decrease when the pilots level off because less thrust is used to fly straight and level than to climb. As indicated by reference number 72, the fuel flow will level off and be substantially constant during level cruise flight 44. The fuel flow profile 60 indicates a brief fuel flow increase at reference number 74, which corresponds to the time when the aircraft climbs 46 to a second cruise altitude 48. Thereafter, the fuel flow profile 60 returns to a substantially constant amount, as indicated by reference number 76. The fuel flow curves represented by reference numbers 72 and 76 show that, over time, fuel flow gradually decreases. This fuel flow decrease is due to the aircraft burning fuel as it flies, getting lighter. As discussed above, a lighter aircraft will burn less fuel than a heavier aircraft. Continuing on, when the aircraft begins to descend 50, less thrust is used, so fuel flow decreases as indicated by reference number 78. However, as indicated by reference number 80, as the aircraft descends into thicker air, fuel flow will increase. When the aircraft levels off at 52, and again at 56, fuel flow will be increased accordingly, as indicated by reference numbers 82 and 86, respectively. When the aircraft steps down at 54, there is a corresponding decrease in fuel flow, as indicated by reference number 84. Upon landing 40, the aircraft uses reverse thrust to slow down, as indicated by the spike in fuel flow at reference number 88. Then, as the aircraft taxis to the gate, there are further fluctuations in fuel flow 90 as the pilots use engine thrust to control taxi speed.

FIG. 2C illustrates cumulative fuel flow profiles 92 for the actual flight 94, the original flight plan 98, and the achievable flight plan 96. As shown, the actual flight 94 is using less fuel throughout most of the trip than was predicted by the original flight plan 98. However, by the end of the flight, the aircraft has used just as much fuel as was predicted by the original flight plan 98. For example, the aircraft may have been performing better than the flight plan early in the flight because of more favorable tailwinds than expected. However, these fuel gains may have been offset by various inefficiencies (potential operational variances) caused by the pilots operating the aircraft in a less-than-optimal way. For example, the pilots may have extended the landing gear unnecessarily early, thereby increasing drag on the airframe and requiring additional engine power to maintain speed. Similarly, the pilots may have used the reverse thrust when it wasn't necessary. The early fuel savings in the flight may mask these inefficient flight operations because, overall, the aircraft used as much fuel as was expected by the original plan. As indicated in FIG. 2C, the achievable flight plan 24 (that can include optimal landing gear extension times and or reverse thrust usage, for example) uses less fuel at all phases of the flight than the actual aircraft used.

Figure 3A:
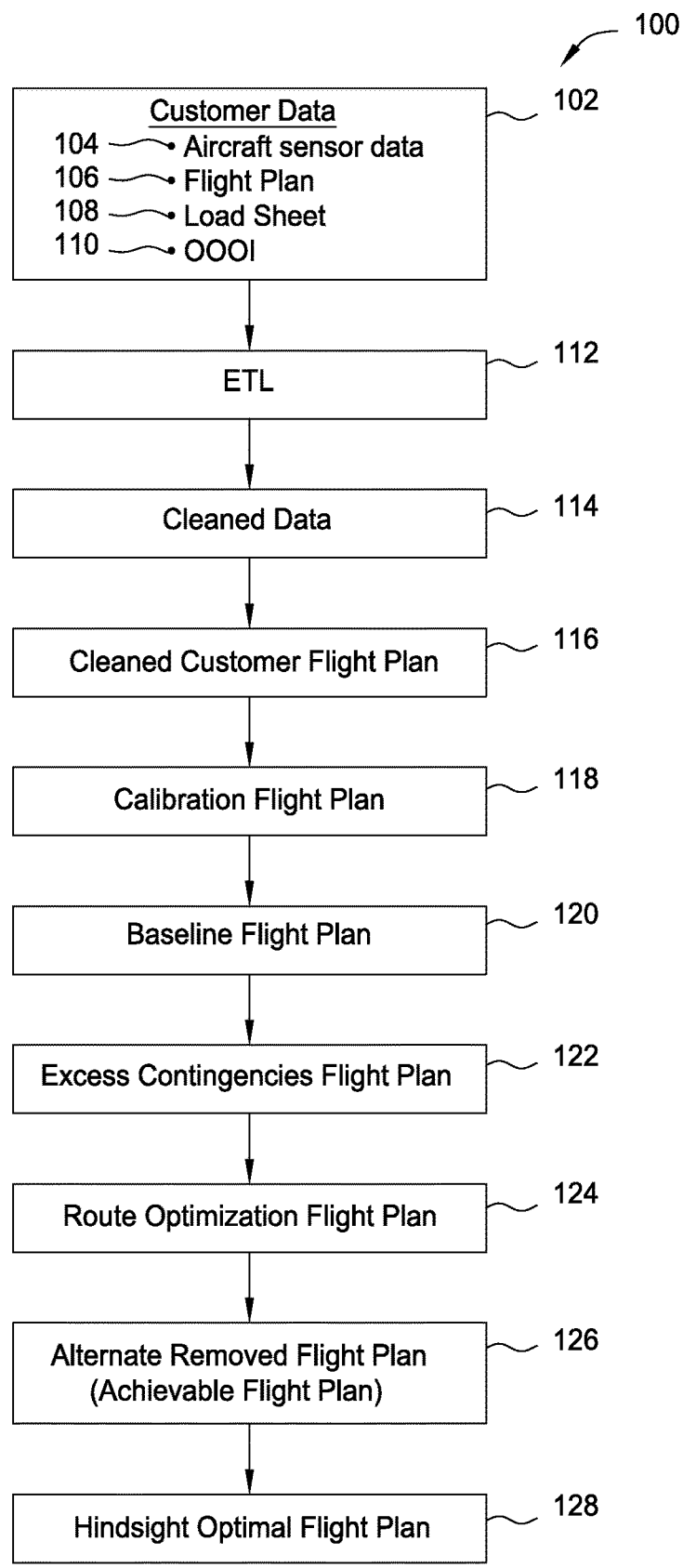
FIG. 3A is a flow chart illustrating a process by which an airline fuel profiler can receive operator flight plan data and convert the data into different versions of a flight plan for analysis.
Figure 3B:
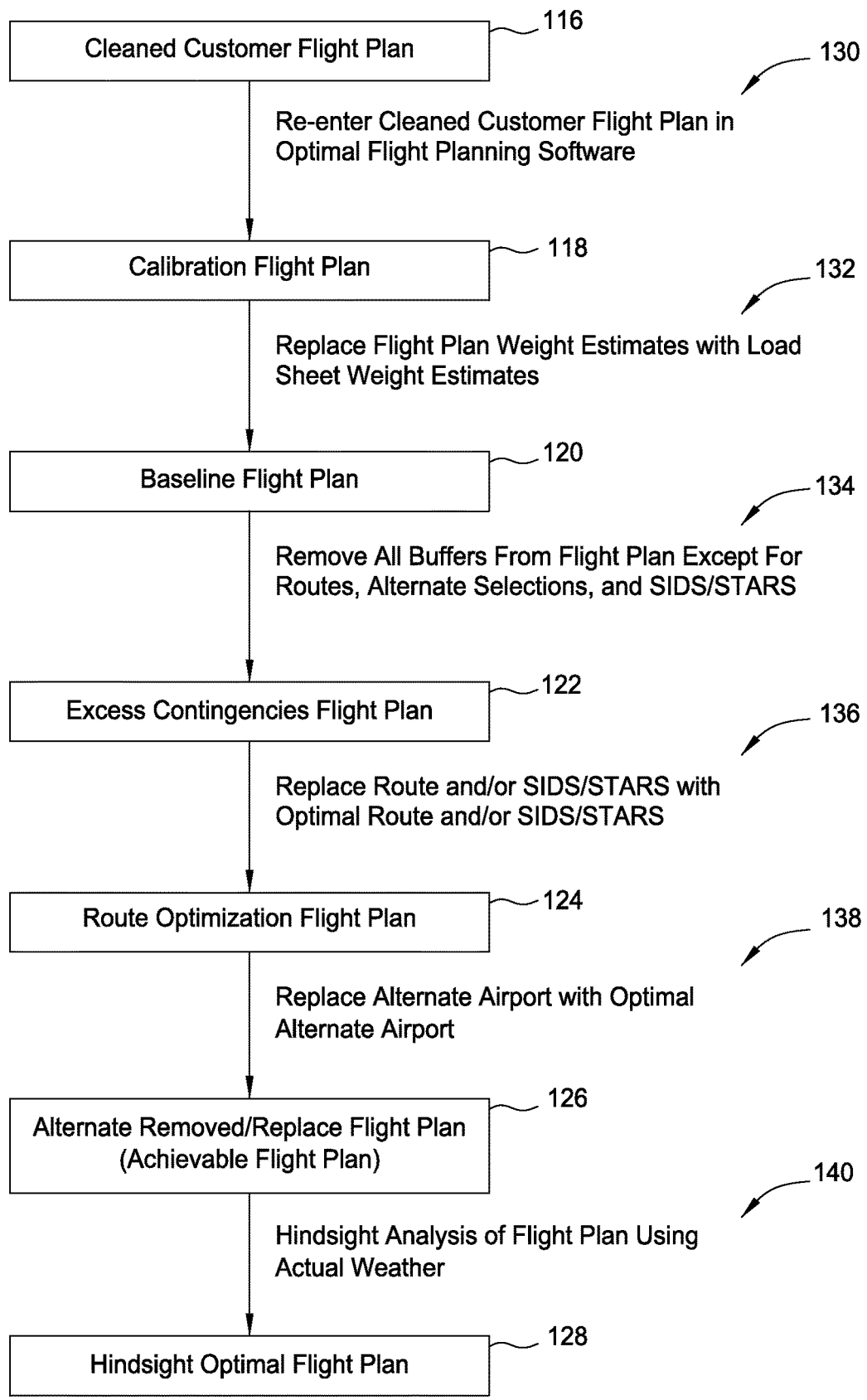
FIG. 3B is a detail flow chart illustrating steps taken to convert the operator's flight plan into the different versions of a flight plan for analysis.

Referring now to FIGS. 3A and 3B, embodiments of an airline fuel profiler 1 can transform a flight plan for a particular flight into an achievable flight plan that would reduce fuel cut consumption to a minimal level. FIG. 3A illustrates an embodiment of a process 100 by which a particular flight plan can be transformed into an achievable flight plan. In block 102 of the process 100, operator data for a particular flight is gathered. The operator data can include the original operator flight plan 2 (which can include a flight plan 106 and a load sheet 108). The operator data can also include aircraft sensor data and Out-Off-On-In (OOOI) data. The aircraft sensor data can include a collection of over 2,000 flight parameters received from a Flight Data Acquisition Unit (FDAU) high-frequency data gathered from an aircraft's flight recorder, which can include many parameters about a given flight, including altitude, cruise speed, attitude, engine thrust setting, and fuel flow, for example. The OOOI data (which stands for Out of the gate, Off of the ground, On the ground, and In the gate) can provide times at which the aircraft leaves the gate, takes off, lands, and returns to a gate. At block 112, the operator data can go through an extract, transform, and load (ETL) process to result in cleaned data at block 114. The ETL process can remove any bad or contradictory data (e.g., an erroneous sensor reading). In block 116, the cleaned data from block 114 is used to update the operator's flight plan in the operator's original flight plan model.

Starting with the cleaned operator flight plan, the airline fuel profiler 1 can provide up to six new versions of the flight plan. Still referring to FIGS. 3A and 3B, the airline fuel profiler 1 can import the cleaned operator flight plan 116 into an optimal flight planning software package, as indicated by reference number 130. As discussed above, an optimal flight planning model is one that accounts for as many variables of a particular flight as possible. For example, some flight plans do not account for airport altitude when planning a flight. A person having ordinary skill in the art will appreciate that an aircraft taking off from sea level will use more flight fuel to climb to 35,000 feet than the aircraft taking will use if taking off from an airport at 5,000 feet, for example. As another example, some flight planning software does not include all available airports and/or airways for planning a flight route, and aspects of a flight, such as alternate landing airports. Ideally, the operator flight plan 116 would be re-entered into a more-sophisticated flight planning software package that accounts for these types of variables in a flight. As an example, the JetPlanner® flight planning software by Jeppesen® is a more-sophisticated flight planning model that can account for these types of variables. Entering the operator flight plan data into an optimal flight planning software package and recalculating the fuel load results in a calibration flight plan 118.

After the airline fuel profiler 1 has created the calibration flight plan 118, the airline fuel profiler 1 can replace the weight estimates in the calibration flight plan 118 with load sheet weight calculations at block 132, resulting in a baseline flight plan 120. The differences between the flight plan weight estimates and load sheet weight estimates are discussed in greater detail below. At block 134, the airline fuel profiler 1, can remove all buffers from the baseline flight plan, except for buffers related to routes, alternate selections and SIDs/STARs, resulting in an excess contingencies flight plan 122. At block 136, the airline fuel profiler 1 can remove the route, SIDs, and/or STARs from the excess contingencies flight plan 122 and insert an optimal route, SIDs, and/or STARs, resulting in a route optimization flight plan 124. At block 138, the airline fuel profiler 1 can replace any alternate airport selection in the route optimization flight plan 124 with an optimal alternate airport, resulting in an alternate removed/replaced flight plan 126. At block 140, after a flight has taken place, the airline fuel profiler 1 can apply hindsight analysis to the alternate removed/replaced flight plan 126, using actual weather data to determine a hindsight optimal flight plan 128. As discussed in more detail below, the various fuel loads for each of the flight plans can be compared to calculate a cost (in fuel load) for the buffers eliminated between successive flight plans. For example, a difference between the calculated fuel load for the calibration flight plan 118 and the calculated fuel load for the baseline flight plan 120 provides a fuel penalty (i.e., cost) for buffers associated with weight estimates. As another example, a difference between the calculated fuel load for the baseline flight plan 120 and the calculated fuel load for the excess contingencies flight plan 122 provides a fuel penalty for all buffers except those associated with routes, alternates, and SIDs/STARs. As another example, a difference between the calculated fuel load for the excess contingencies flight plan 122 and the route optimization flight plan 124 provides a fuel penalty for buffers associated with routes and SIDs/STARs. As another example, a difference between the calculated fuel load for the route optimization flight plan 124 and the alternate removed/replaced flight plan 126 can provide a fuel penalty for buffers associated with alternate airports. As another example, a difference between the calculated fuel for the alternate removed/replaced flight plan 126 and the calculated fuel for the hindsight optimal flight plan 128 provides a fuel penalty for not having the actual weather at the time of flight planning.

Referring now to FIG. 4, as discussed above, flight plans can include buffers, which are error factors built into the flight plan to account for uncertainties and or unknowns. In many instances, the buffers installed in various flight planning models are unknown and of arbitrary value. FIG. 4 illustrates an exemplary list of buffers 152 that can significantly impact the calculated fuel load for an aircraft when the buffers are not removed from a flight plan. FIG. 4 also illustrates an exemplary list of potential operational variances 154. Potential operational variances are deviations in the operation of an aircraft from the flight plan and/or from most efficient operating practices of the aircraft. These operational variances are referred to herein as "potential" because various government regulations or in circumstances not identified in the data (e.g., air traffic control routing) may cause variances outside of the pilots' control. Often times, potential operational variances negatively affect fuel usage (i.e., they cause more fuel to be used than the flight plan calculated). However, operational variances can sometimes positively affect fuel usage. For example, in certain circumstances, a pilot may fly at a different cruise altitude than indicated by the flight plan to take advantage of more favorable tailwinds, which can result in reduced fuel consumption.

As discussed above, the airline fuel profiler 1 can examine the operator flight plan (starting with the calibration flight plan 118) to identify and remove any buffers 152 that may be present in the calibration flight plan 118. For each buffer, the airline fuel profiler 1 can compare the flight plan to a criterion. If the flight plan includes a parameter associated with the criterion that exceeds and/or differs from the criterion, then the airline fuel profiler 1 can determine that the flight plan includes the buffer and modify the flight plan to remove the buffer.

Identifying and Removing Hidden Buffers in a Flight Plan

Referring now to FIG. 5A, the airline fuel profiler 1 can implement a process 402 to determine whether the calibration flight plan 118 includes a zero fuel weight buffer 172. The zero fuel weight of an aircraft is the total weight of the airplane and all of its contents, minus the total weight of the usable fuel on board. In block 404 of the process 402, the airline fuel profiler 1 can determine the estimated zero fuel weight from the calibration flight plan 118 and can also determine the calculated zero fuel weight from the load sheet 108 prepared for the flight. In this instance, the buffer criterion is the zero fuel weight from the load sheet. In block 406, the airline fuel profiler 1 can compare the two zero fuel weights. If the two numbers are equal (or within a tolerance band of each other), then the airline fuel profiler 1 does not make any changes to the calibration flight plan 118, as indicated in block 408. However, if the zero fuel weight in the flight plan differs from the zero fuel weight on the load sheet 108, then the airline fuel profiler 1 can change the zero fuel weight in the flight plan to match the zero fuel weight on the load sheet, as indicated in block 410.

In various embodiments, the zero fuel weight from the load sheet can be based in part on actual measured weights and in part on estimated weights. For example, cargo and checked passenger luggage may be weighed before being loaded into the aircraft. Other weights, such as the weights of passengers and their carry-on bags are not weighed. Instead, the weight of passengers and their carry-on bags are estimated by assuming an average weight per passenger (e.g., two hundred pounds for a passenger with carry-on bags) and multiplying by the number of passengers on the flight. As described in greater detail below, the airline fuel profiler 1 can perform a statistical analysis on data from multiple flights of the same aircraft to calculate the actual weight of an aircraft and, when appropriate, adjust the average weight of passengers and their carry-on bags to match reality. The airline fuel profiler 1 can use the adjusted average weight to update the passenger weight on the load sheet and, in turn, the zero fuel weight in the flight plan. Other weights on board an aircraft may be estimated, but done so in an inaccurate manner. For example, an aircraft may carry fewer consumables (e.g., cans of beverages and potable water for the lavatories) for short flights than for longer flights. For example, an aircraft may carry one hundred cans of soda for a one hour flight and carry three hundred cans of soda for a three hour flight. However, the load sheet calculations may be simplified by always assuming that the aircraft is carrying three hundred cans of soda. For shorter flights, this assumption can result in the load sheet zero fuel weight being higher than the actual weight of the aircraft. Embodiments of the airline fuel profiler 1 can replace such assumptions in the operator-prepared load sheet with more accurate calculations of consumables. As a result, the weight calculations used in the flight plan can be more accurate.

Figure 6B:
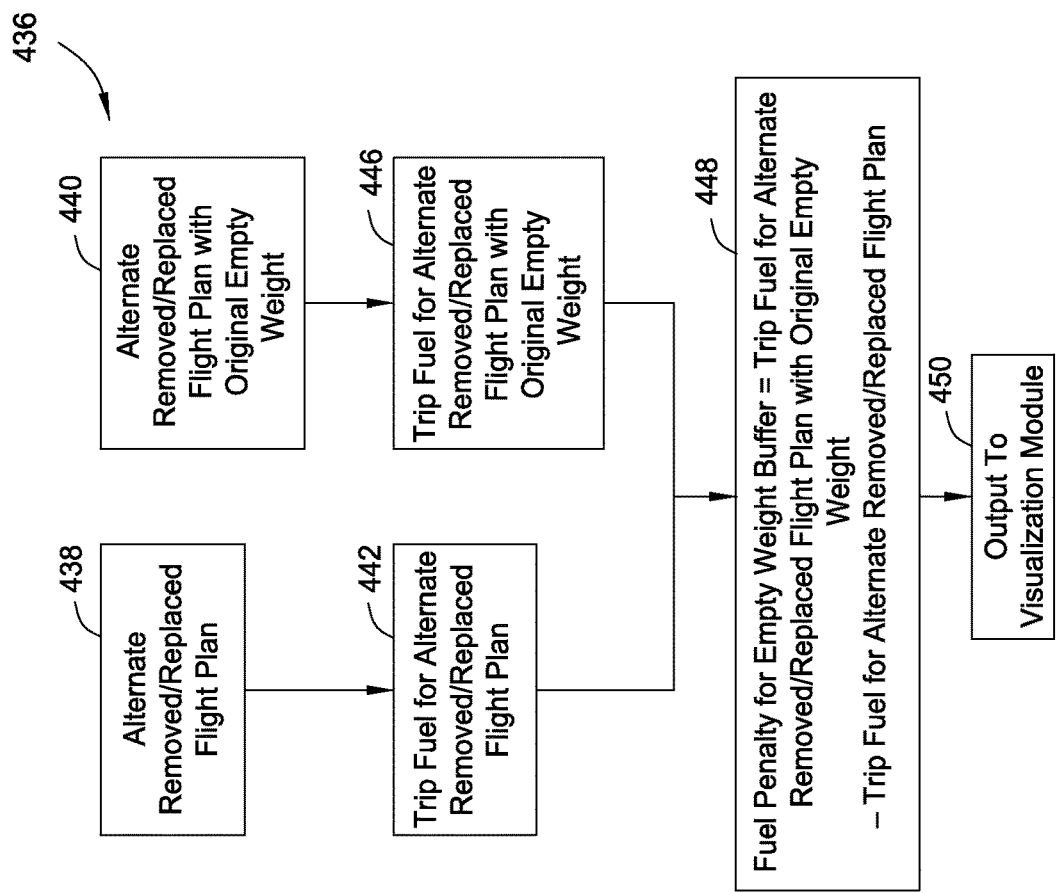
FIG. 6B illustrates an exemplary process that embodiments of an airline fuel profiler may use to determine the cost, in terms of trip fuel, for an identified operating empty weight buffer in the operator-provided flight plan.
Figure 6A:
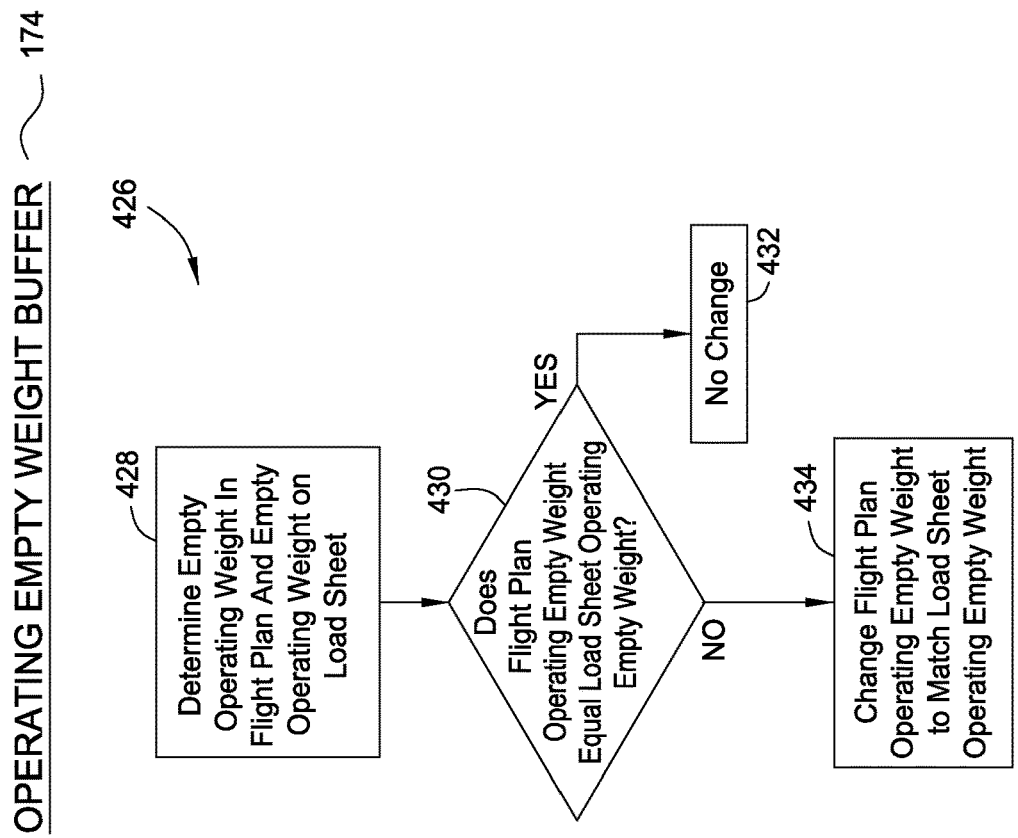
FIG. 6A illustrates an exemplary process that embodiments of an airline fuel profiler may use to determine whether a operator-provided flight plan includes an operating empty weight buffer.

Referring now to FIG. 6A, the airline fuel profiler 1 can implement a process 426 to determine whether the calibration flight plan 118 includes an operating empty weight buffer 174. The operating empty weight of an aircraft is the weight of the aircraft, including the crew, all fluids used for operation (e.g., oil, engine coolant, water, and unusable fuel), and all operator items and equipment for flight, but excluding usable fuel and the payload. In block 428, the airline fuel profiler 1 can determine the operating empty weight in the flight plan and the operating empty weight on the load sheet 108. The operating empty weight on the load sheet can be the flight plan buffer criterion. In block 430, the airline fuel profiler 1 can compare the two operating empty weights. If the two weights are equal (or within a tolerance band of each other), then the airline fuel profiler 1 does not change the operating empty weight in the calibration flight plan 118, as indicated by block 432. If the two weights are not the same, then the airline fuel profiler 1 can change the operating empty weight in the calibration flight plan 118 to the operating empty weight listed on the load sheet 108, as indicated in block 434.

Over time, aircraft generally get heavier. For example, insulation in an aircraft can absorb water from condensation, potentially adding several hundred pounds to the airframe. As described in greater detail below, the airline fuel profiler 1 can perform statistical analysis on cumulative flight data (e.g., aircraft sensor data) from multiple flights of an aircraft and calculate increases in the aircraft weight. The airline fuel profiler 1 can update load sheets for flights of the aircraft (and, in turn, the operating empty weight on flight plans) based on the calculated increase in weight.

As described above, changes made by the airline fuel profiler 1 to the zero fuel weight 172 and operating empty weight 174 in the calibration flight plan 118 results in the baseline flight plan 120.

Figures 7A, 7B:
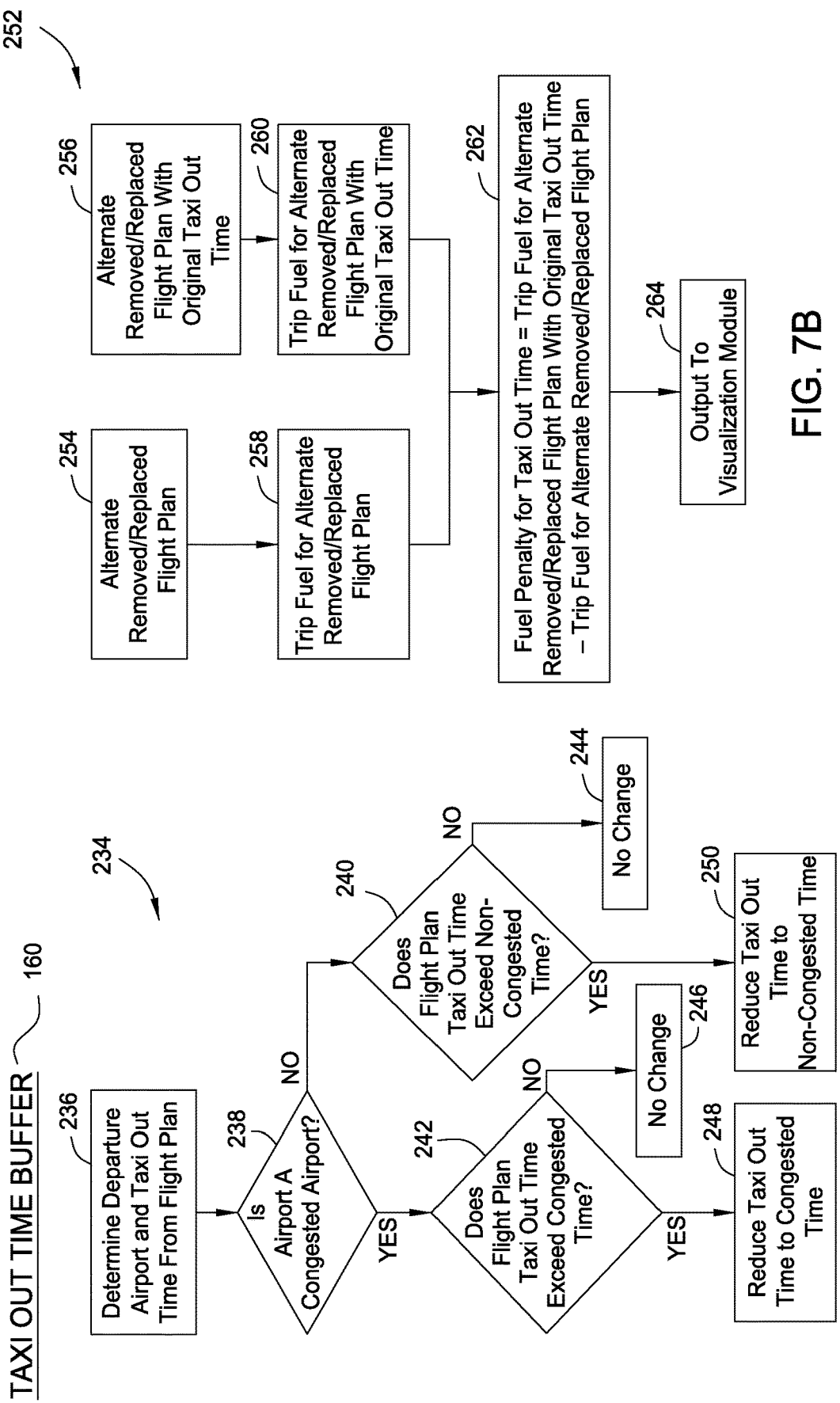
FIG. 7A illustrates an exemplary process that embodiments of an airline fuel profiler may use to determine whether a operator-provided flight plan includes taxi out time buffer.
FIG. 7B illustrates an exemplary process that embodiments of an airline fuel profiler may use to determine the cost, in terms of trip fuel, for an identified taxi out time buffer in the operator-provided flight plan.

Referring now to FIG. 7A, the airline fuel profiler 1 can implement a process 234 to determine whether the baseline flight plan 120 includes a taxi out time buffer 160. At certain airports, such as O'Hare Airport in Chicago, Ill., an aircraft may have to wait in a long queue of aircraft before it can takeoff. At other airports, such as Greensboro, N.C., an aircraft may be able to taxi and take off without any waiting. Other airports may enable aircraft to taxi and takeoff with only a short delay. The baseline flight plan 120 may include a buffer for taxi out time, meaning that the flight plan assumes a taxi out time that exceeds the likely taxi out time at the departure airport. In block 236 of the process 234, the airline fuel profiler 1 can determine the departure airport from the flight plan and also the taxi out time in the flight plan. In block 238, the airline fuel profiler 1 can determine whether the airport is a congested airport. For example, the airline fuel profiler 1 can perform a table lookup, wherein the table includes a list of congested airports. Referring to block 240, if the airport is not determined to be a congested airport, then the airline fuel profiler 1 compares the taxi out time from the baseline flight plan 122 a non-congested threshold time. For example, the non-congested threshold time may be set for a time between 0 minutes and 15 minutes. As another example, the non-congested threshold time may be set for a time between 5 minutes in 10 minutes. As yet another example, the non-congested threshold time may be set for 7 minutes. At block 240, if the taxi out time from the baseline flight plan 120 does not exceed the non-congested threshold time, then the airline fuel profiler 1 does not change the taxi out time in the baseline flight plan 120, as indicated in block 244. However, if the taxi out time from the baseline flight plan 120 does exceed the non-congested threshold time, then the airline fuel profiler 1 changes the taxi out time in the baseline flight plan 120 to match the non-congested threshold time, as indicated in block 250. Returning to block 238, if the airline fuel profiler 1 determines at the airport is a congested airport, then, in block 242, the airline fuel profiler 1 compares the taxi out time from the baseline flight plan 120 to a congested threshold time. For example, the congested threshold time may be set for a time between 15 minutes and one hour. As another example, the non-congested threshold time may be set for a time between 30 minutes and 45 minutes. As yet another example, the non-congested threshold time may be set for 40 minutes. At block 242, if the taxi out time from the baseline flight plan 120 does not exceed the congested threshold time, then the airline fuel profiler 1 does not change the taxi out time in the baseline flight plan 120, as indicated in block 246. However, if the taxi out time from the baseline flight plan 120 does exceed the congested threshold time, then the airline fuel profiler 1 changes the taxi out time of the baseline flight plan 120 to match the congested threshold time, as indicated in block 248. In this process 234, the buffer criteria include the congested and non-congested taxi out threshold times.

The taxi out threshold times associated with congested airports and non-congested airports can be changed over time. As described in greater detail below, as the airline fuel profiler 1 accumulates additional statistical data about flights departing from a particular airport, the airline fuel profiler 1 can adjust the threshold times. For example, the airline fuel profiler 1 may set an initial congested threshold time for O'Hare International Airport of 30 minutes. If, over time, the statistical data reveals that the taxi out time is 35 minutes on average, then the airline fuel profiler 1 may adjust the congested threshold time to 35 minutes for O'Hare International Airport. In various embodiments, the airline fuel profiler 1 can adjust the congested threshold time for the class of congested airports to the worst-case amongst the congested airports. In various other embodiments, the airline fuel profiler 1 can adjust the threshold times for each airport to a threshold time that is representative of analyzed data for the particular airport. As a result, the process 234 can look up the departure airport and its threshold time, and compare the threshold time to the taxi out time in the flight plan to determine whether the flight plan includes a taxi out time buffer.

Figures 8A, 8B:
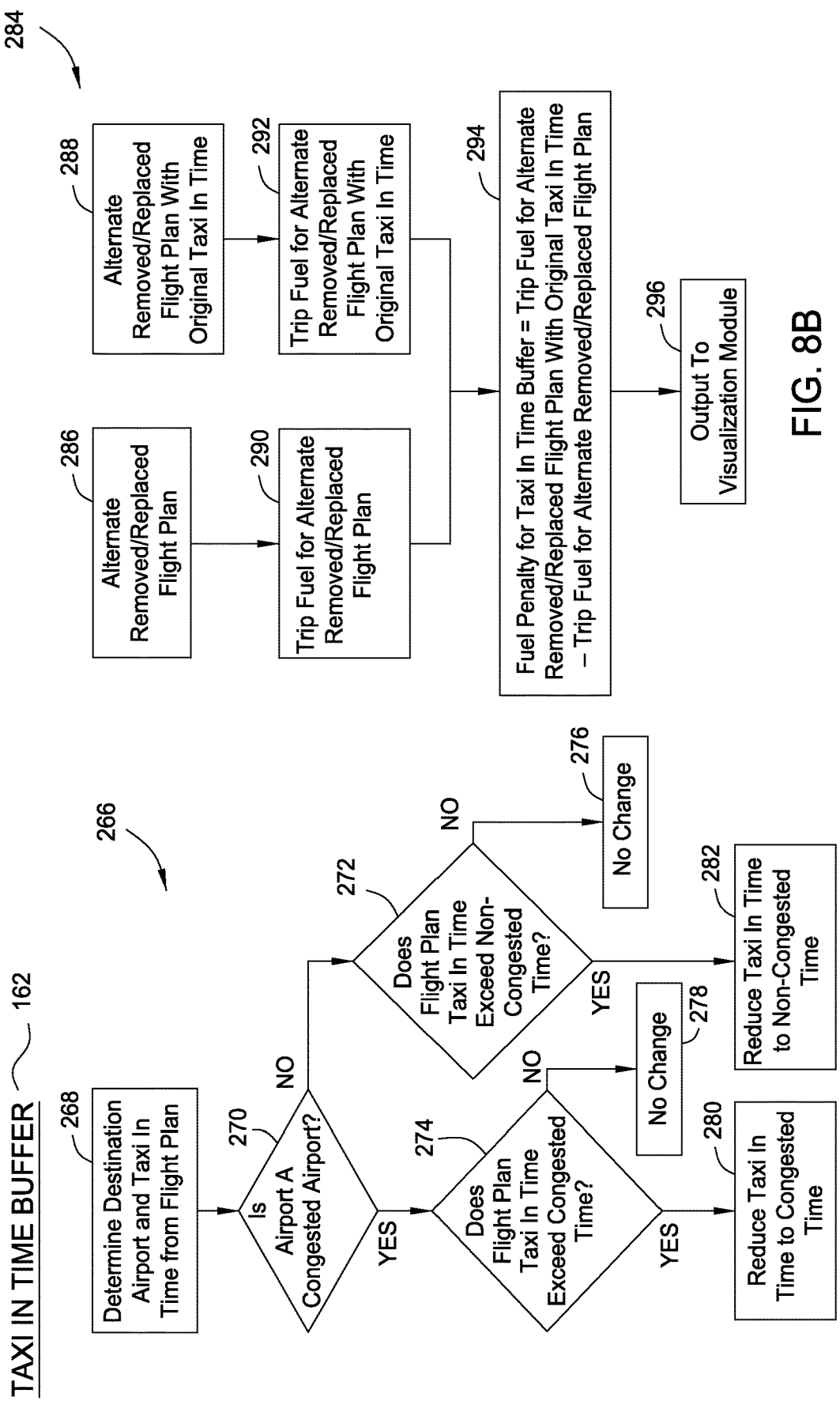
FIG. 8A illustrates an exemplary process that embodiments of an airline fuel profiler may use to determine whether a operator-provided flight plan includes a taxi in time buffer.
FIG. 8B illustrates an exemplary process that embodiments of an airline fuel profiler may use to determine the cost, in terms of trip fuel, for an identified taxi in time buffer in the operator-provided flight plan.

Referring now to FIG. 8A, the airline fuel profiler 1 can implement a process 266 to determine whether the baseline flight plan 120 includes a taxi in time buffer 162. Similar to the example described above with reference to FIG. 7A, the amount of time it takes for an aircraft to taxi from the runway after landing to a gate can vary depending on the airport. Again, it may take an aircraft longer to taxi at a congested airport like O'Hare Airport in Chicago, Ill., then an uncongested airport like Greensboro, N.C. However, flight planning software often does not differentiate between different types of airports and assumes the same taxi in time for all airports. In block 268 of the process 266, the airline fuel profiler 1 can determine the destination airport and taxi in time in the baseline flight plan 120. In block 270, the airline fuel profiler 1 can determine whether the destination airport is a congested airport. Again, the airline fuel profiler 1 may perform a table lookup, wherein the table includes a list of airports that are considered to be congested, for example. Referring to block 272, if the destination airport is not a congested airport, then the airline fuel profiler 1 can compare the taxi in time in the baseline flight plan 120 to a non-congested taxi in threshold time. For example, the non-congested threshold time may be set for a time between 0 minutes and 10 minutes. As another example, the non-congested threshold time may be set for a time between 3 minutes in 7 minutes. As yet another example, the non-congested threshold time may be set for 5 minutes. If the taxi in time from the baseline flight plan 120 does not exceed the non-congested threshold time, then the airline fuel profiler 1 does not change the taxi and time in the baseline flight plan 120, as indicated in block 276. If the taxi in time from the baseline flight plan 120 does exceed the non-congested threshold time, then the airline fuel profiler 1 can change the taxi in time in the baseline flight plan 120 to the non-congested threshold time. Referring again to block 270, if the airline fuel profiler 1 determines that the destination airport is a congested airport, then the airline fuel profiler 1 can compare the taxi in time in the baseline flight plan 120 to a congested taxi in threshold time. For example, the congested threshold time may be set free time between 30 minutes and 45 minutes. As another example, the congested threshold time may be set for a time between 35 minutes and 40 minutes. As another example, the congested threshold time may be set for 37 minutes. If the taxi in time from the baseline flight plan 120 does not exceed the congested taxi in threshold time, then the airline fuel profiler 1 does not change the taxi in time in the baseline flight plan 120, as indicated in block 278. If the taxi in time from the baseline flight plan 120 does exceed the congested threshold time, then the airline fuel profiler 1 can change the taxi in time in the baseline flight plan 120 to the congested taxi in threshold time. In this process 266, the buffer criteria include the congested and non-congested taxi in threshold times.

The taxi in threshold times for a congested airport and a non-congested airport can be changed over time. As described in greater detail below, as the airline fuel profiler 1 gains additional statistical data about subsequent flights along a particular route, the airline fuel profiler 1 can adjust the taxi in threshold times. For example, the airline fuel profiler 1 may set an initial congested taxi in threshold time for O'Hare International Airport at 35 minutes. If over time, the taxi in time is on average 40 minutes, then the airline fuel profiler 1 may adjust the congested threshold time to 40 minutes for O'Hare International Airport. In certain embodiments, the airline fuel profiler 1 can adjust the congested taxi in threshold time for the class of congested airports to the worst-case amongst the congested airports.

Figures 9A, 9B:
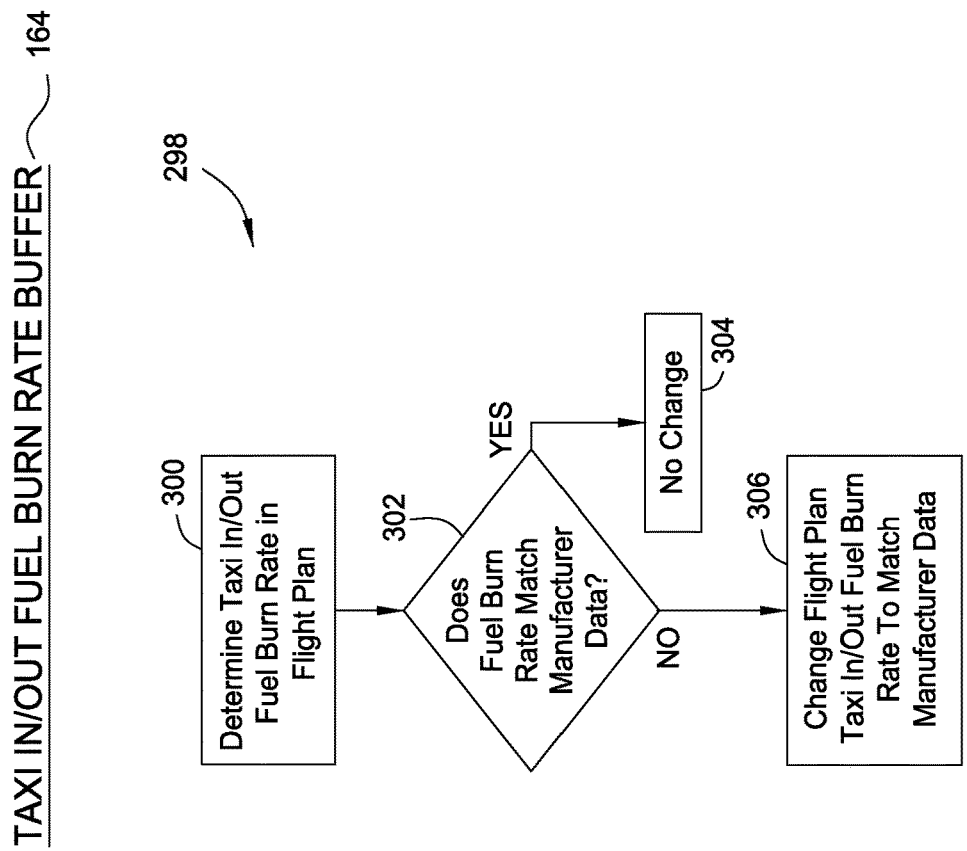
FIG. 9A illustrates an exemplary process that embodiments of an airline fuel profiler may use to determine whether a operator-provided flight plan includes a taxi in/out fuel burn rate buffer.
FIG. 9B illustrates an exemplary process that embodiments of an airline fuel profiler may use to determine the cost, in terms of trip fuel, for an identified taxi in/out fuel burn rate buffer in the operator-provided flight plan.

Referring now to FIG. 9A, the airline fuel profiler 1 can implement a process 298 to determine whether the baseline flight plan 120 includes a taxi in/out fuel burn rate buffer 164. Airline flight planners can include an assumed fuel burn rate (e.g., pounds of fuel per minute) during taxi operations from the gate to the runway upon departure and from the runway to the gate upon arrival. In some instances, flight planning software may use the same fuel burn rate for every aircraft regardless of type and/or actual wear. For example, flight planning software may use the same taxi fuel burn rate for two aircraft types even though these two aircraft types burn fuel at very different rates. Similarly, different aircraft of the same type may burn fuel at different rates depending on the wear level of the engines. For example, a brand-new engine will likely burn fuel at a slower rate than an engine with wear and/or an engine at a different point in its maintenance cycle. In block 300 of the process 298, the airline fuel profiler 1 can determine the taxi in/out fuel burn rate in the flight plan. In block 302, the airline fuel profiler 1 can compare the fuel burn rate to manufacturer data. Referring to block 304, if the fuel burn rates in the flight plan for taxi in/out operations matches the manufacturer data, then no changes are made to the flight plan. However, if the fuel burn rate in the flight plan for taxi in/out operations does not match manufacturer data, then, in block 306, the taxi in/out fuel burn rate is changed to match manufacturer data. In this process 298, the buffer criteria can include a manufacturer-provided taxi fuel burn rate.

In various embodiments, the manufacturer data, referred to in blocks 302 and 306 above, can include different fuel burn rates for an aircraft engine based on levels of wear. In such instances, the airline fuel profiler 1 can reference fuel burn rates and select a fuel burn rate for taxi in/out operations that matches a determined level of wear for an engine. Over time, as the airline fuel profiler 1 accumulates data about specific airframes, the taxi in/out fuel burn rate can be updated to account for real-world fuel burn rates experienced by a particular aircraft. In various other embodiments, the manufacturer data can include a taxi fuel burn rate for a brand new engine and the airline fuel profiler 1 can use this fuel burn rate in the flight plan. The airline fuel profiler 1 can account for any loss in taxi fuel burn rate via a general wear factor applied to the flight plan.

Figures 10A, 10B:
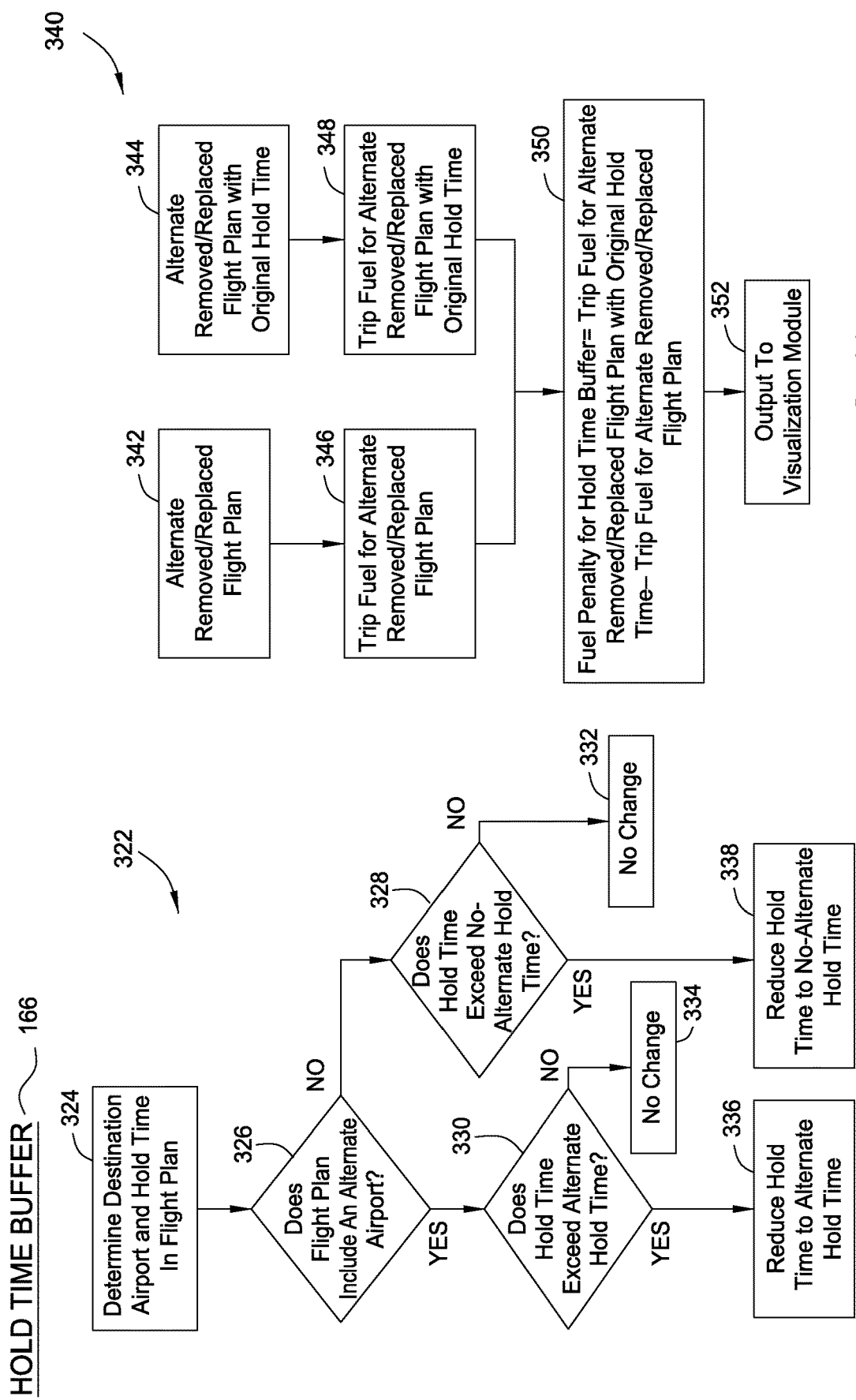
FIG. 10A illustrates an exemplary process that embodiments of an airline fuel profiler may use to determine whether a operator-provided flight plan includes a hold time buffer.
FIG. 10B illustrates an exemplary process that embodiments of an airline fuel profiler may use to determine the cost, in terms of trip fuel, for an identified hold time buffer in the operator-provided flight plan.

Referring now to FIG. 10A, the airline fuel profiler 1 can implement a process 322 to determine whether the baseline flight plan 120 includes a hold time buffer 166. Aircraft flight plans are often required to include enough fuel to enable the aircraft to fly in a traffic pattern above the arrival airport for a certain period of time before landing. For example, regulations may require that an aircraft be able to fly a holding pattern at the arrival airport for forty five minutes before landing. Furthermore, in instances where weather may be a factor, a flight plan can also include an alternate airport destination, wherein the aircraft will fly to the alternate if weather (or other factors) prevents the aircraft from landing at the intended destination airport. In instances where the flight plan includes an alternate airport, the hold time in the flight plan may be reduced (e.g., to thirty minutes) because the aircraft has the opportunity (e.g., the fuel on board, as discussed below) to fly to a different airport and land. In block 324 of the process 322, the airline fuel profiler 1 can determine the destination airport and the hold time in the flight plan. Referring to block 326, the airline fuel profiler 1 can determine whether the flight plan includes an alternate airport. Referring to block 330, if the flight plan does include an alternate airport, then the airline fuel profiler 1 compares the hold time in the flight plan to an alternate hold threshold time. If the hold time in the flight plan does not exceed the alternate hold threshold time, then no change is made to the flight plan, as indicated in block 334. However, if the hold time in the flight plan does exceed the alternate hold threshold time, then the flight plan is updated to change the hold time to the alternate hold threshold time. Referring again to block 326, if the flight plan does not include an alternate, then, at block 328, the airline fuel profiler 1 compares the hold time in the flight plan to a no-alternate hold threshold time. If the hold time in the flight plan does not exceed the no-alternate hold threshold time, then the airline fuel profiler 1 does not change the flight plan, as indicated in block 332. However, if the hold time in the flight plan does exceed the no-alternate hold threshold time, then the airline fuel profiler 1 updates the flight plan to change the hold time to the no-alternate hold threshold time. In this process 322, the buffer criteria can include at least one of the alternate hold threshold time and the no-alternate hold threshold time.

As described above, the alternate hold threshold time and the no-alternate hold threshold time can be set to constant values, such as 30 minutes and 45 minutes, respectively. A person having ordinary skill in the art will understand that different time values can be set as well. As described below, as the airline fuel profiler 1 accumulates information about multiple flights along the same route, the alternate hold threshold time and no-alternate hold threshold time can be updated to reflect real-world experiences with hold times at various airports. For example, an initial hold threshold time for O'Hare airport in Chicago, Ill. may be set for thirty minutes. If aircraft data collected over multiple flights indicates that the real-world hold time at O'Hare airport is forty five minutes, then the airline fuel profiler 1 may update the no alternate hold threshold time to one hour.

Figure 11B:
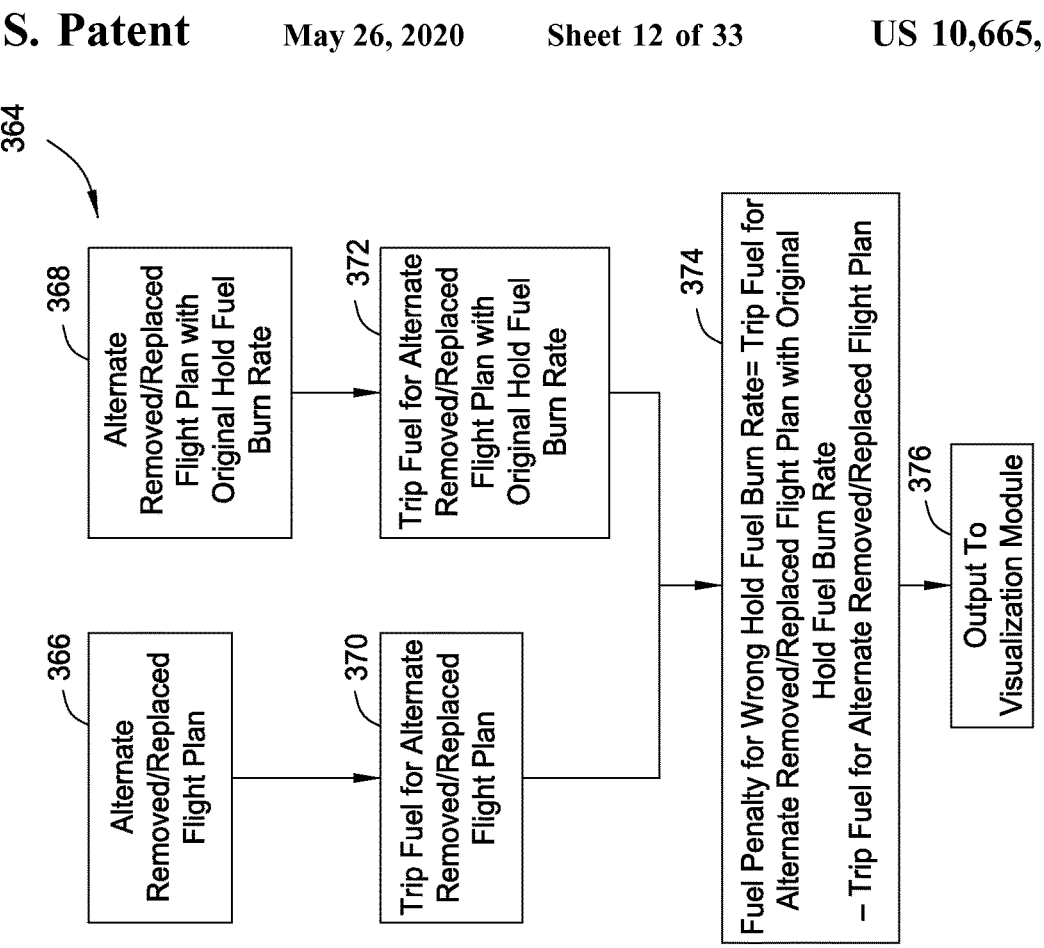
FIG. 11B illustrates an exemplary process that embodiments of an airline fuel profiler may use to determine the cost, in terms of trip fuel, for an identified hold fuel burn rate buffer in the operator-provided flight plan.
Figure 11A:
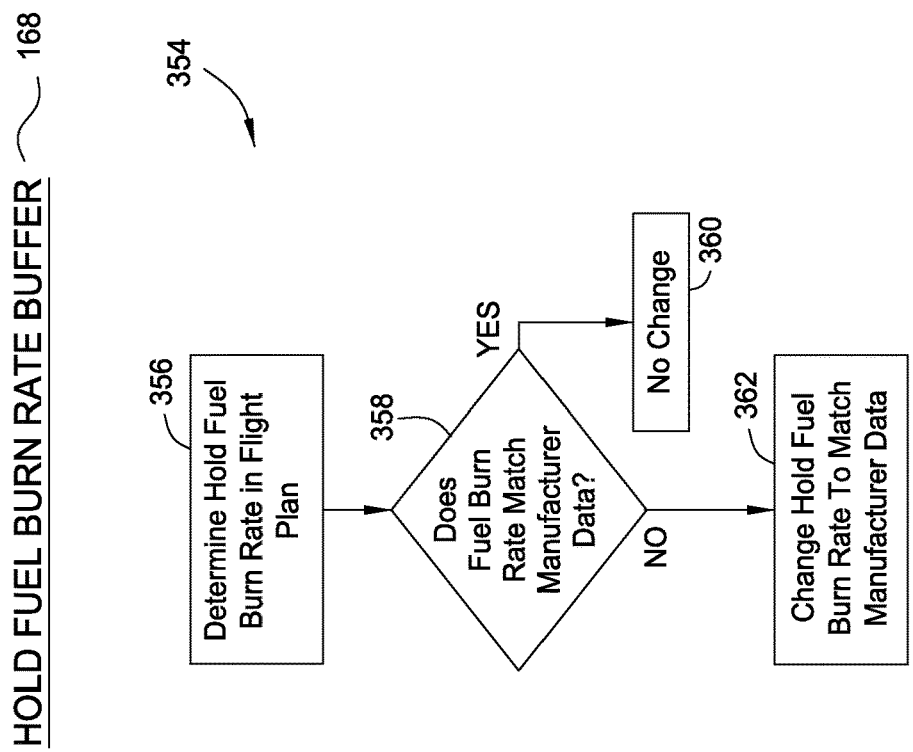
FIG. 11A illustrates an exemplary process that embodiments of an airline fuel profiler may use to determine whether a operator-provided flight plan includes a hold fuel burn rate buffer.

Referring now to FIG. 11A, the airline fuel profiler 1 can implement a process 354 to determine whether the baseline flight plan 120 includes a hold fuel burn rate buffer 168. As described above, aircraft are often required to carry enough fuel to fly a holding pattern at the arrival airport for a certain period of time (e.g., 30 minutes). The amount of fuel that an aircraft needs to carry to perform the holding maneuvers can be calculated by multiplying the hold time by the fuel burn rate while flying the holding pattern. The holding pattern is often flown at a substantially constant altitude. However, the fuel burn rate may be different than the fuel burn rate during other phases of flight, such as cruise, because the holding pattern is often flown at a lower altitude than cruise. In block 356 of the process 354, the airline fuel profiler 1 can determine the hold fuel burn rate in the flight plan. In block 358, the airline fuel profiler 1 can compare the fuel burn rate for holding in the flight plan to manufacturer data for hold fuel burn rate. If the hold fuel burn rate in the flight plan matches the hold fuel burn rate in the manufacturing data, then no change is made to the flight plan, as indicated in block 360. However, if the hold fuel burn rate in the flight plan exceeds the hold fuel burn rates in the manufacturing data, then the airline fuel profiler 1 changes the hold fuel burn rate in the flight plan to match the hold fuel burn rates in the manufacturer data. In this process 322, the buffer criteria can include a manufacturer-provided holding fuel burn rate.

As discussed in greater detail below, in various embodiments, as aircraft data is collected over multiple flights, the airline fuel profiler 1 may be able to develop a more accurate hold fuel burn rate for each aircraft. In such embodiments, the hold fuel burn rate can be updated to match the real-world assessments.

Referring now to FIG. 12A, the airline fuel profiler 1 can implement a process 378 to determine whether the baseline flight plan 120 includes an aircraft performance wear factor buffer 170. Flight planning software may include an aircraft performance wear factor, in which a flight dispatcher can enter a wear for the aircraft (e.g., as a percentage of new aircraft performance). Over time, aircraft performance lessens due to multiple factors. For example, aircraft tend to get heavier as they age (e.g., as insulation in the aircraft absorbs moisture). Also, aircraft drag increases over time (e.g., due to part misalignments, airframe dings, etc.). Furthermore, the engines on an aircraft tend to become less efficient as they accumulate flight hours. A flight plan can include a wear factor to account for the cumulative effects of these various factors. However, many flight planning software packages use a common wear factor for all aircraft, regardless of actual wear level. For example, some flight planning software has been set up to assume a 2% wear level regardless of the age of the aircraft and/or the engines. Such an assumption can result in a new aircraft (i.e., not worn) carrying extra fuel and an old aircraft (i.e., worn by more than 2%) not carrying enough fuel, for example. In block 380 of the process 378, the airline fuel profiler 1 can determine an aircraft wear factor in the flight plan and also a determined wear factor for a particular aircraft. In this process 378, the buffer criteria can include the determined wear factor for the particular aircraft. The airline fuel profiler 1 may determine a wear factor for the aircraft in several ways. For example, the airline fuel profiler 1 may refer to manufacturer data, which may specify a wear factor based on factors such as aircraft age, hours flown, and/or nautical miles flown, for example. As another example, the airline fuel profiler 1 may assume that an aircraft that is between 0 and 3 years old has no wear. The airline fuel profiler 1 can add 0.5% wear for each year of aircraft age beyond 3 years. Thus, according to this example a four-year-old aircraft would be determined to have a 0.5% wear factor and a five-year-old aircraft would be determined to have a 1% wear factor. In block 382, the airline fuel profiler 1 can compare the aircraft wear in the flight plan to the determined aircraft wear. If the wear in the flight plan matches the determined aircraft wear, then no change is made to the flight plan, as indicated in block 384. However, if the wear in the flight plan does not match the determined aircraft wear, then the airline fuel profiler 1 changes the wear in the flight plan to match the determined aircraft wear, as indicated in block 386.

As discussed in greater detail below, the airline fuel profiler 1 can receive data about successive flights of a particular aircraft. Through various statistical techniques, embodiments of the airline fuel profiler 1 can determine a more precise aircraft wear level for the particular aircraft. In such instances, the airline fuel profiler 1 can replace the determined aircraft wear factor, discussed above, with the statistically determined aircraft wear factor.

Figure 13B:
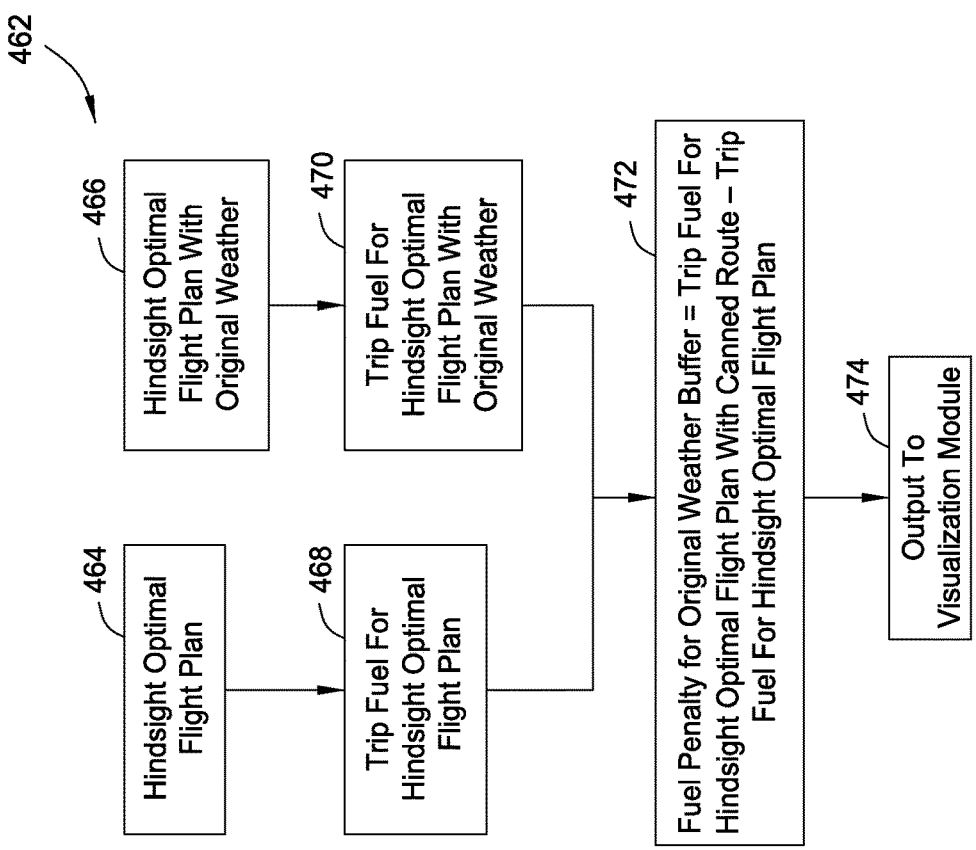
FIG. 13B illustrates an exemplary process that embodiments of an airline fuel profiler may use to determine the cost, in terms of trip fuel, for an identified weather buffer in the operator-provided flight plan.
Figure 13A:
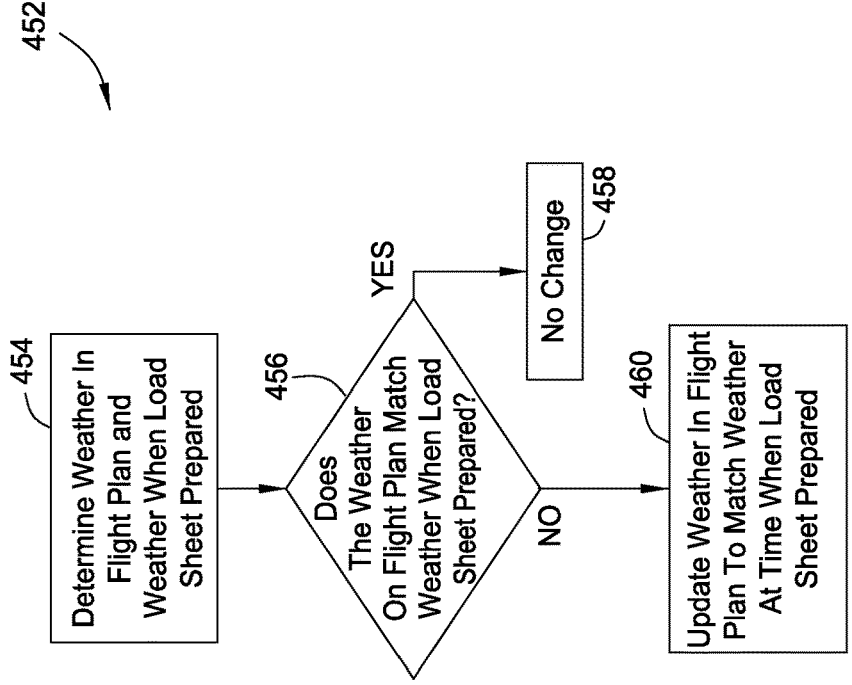
FIG. 13A illustrates an exemplary process that embodiments of an airline fuel profiler may use to determine whether a operator-provided flight plan includes a weather buffer.

Referring now to FIG. 13A, the airline fuel profiler 1 can implement a process 452 to determine whether the baseline flight plan 120 includes a weather buffer 176. Flight plans are usually created several hours before a flight occurs. For example, flight dispatchers often generate flight plans four hours before a flight is scheduled takeoff. However, the weather forecast can change substantially in the four hours between generation of the flight plan and take off. For example, the direction and strength of winds can change substantially in that time period. As a result, a route planned by a flight dispatcher four hours before a flight takes off may be less optimal at takeoff due to changing wind patterns. Thus, it can be advantageous for a flight plan to be reevaluated and possibly recalculated at a time that is closer to take off. For example, a flight plan can be reevaluated and/or recalculated when weights from the load sheet 108 are entered into the flight plan. The load sheet is generally not available until after flight close-out (e.g., thirty to forty five minutes before departure) because it reflects the actual number of passengers onboard the aircraft and accurately reflects weights of cargo as well. In block 454 of the process 452, the airline fuel profiler 1 can determine the weather in the flight plan and the weather information available when the load sheet is prepared. In block 456, the airline fuel profiler 1 can compare the weather forecast on the flight plan to the weather forecast available when the load sheet is prepared. If the weather forecast information is unchanged, then no changes made to the flight plan, as indicated in block 458. However, if the weather forecast information has changed, then the airline fuel profiler 1 updates the weather in the flight plan to match the weather available when the load sheet is created and recalculates the flight plan accordingly, as indicated in block 460. For example, new weather information may indicate that a different route and/or cruise altitude will provide more favorable tailwinds than the originally chosen route and/or cruise altitude. In this process 452, the buffer criteria can include the weather forecast information available when the load sheet is prepared.

Referring again to FIG. 3B, the any buffers described above in FIGS. 7A, 8A, 9A, 10A, 11A, 12A, and 13A can be removed from the baseline flight plan 122 to create the excess contingencies flight plan 122. As described in greater detail below, the airline fuel profiler 1 can examine the route in the excess contingencies flight plan, as well as SIDs and/or STARs in the flight plan and replaces them with optimal routes and SIDs/STARs to form a route optimization flight plan 124.

Referring now to FIG. 14A, the airline fuel profiler 1 can implement a process 476 to determine whether the excess contingencies flight plan 122 includes a canned route buffer 178. An airline will often choose a route for a flight from a relatively small subset of possible routes between a departure airport and an arrival airport (i.e., "canned routes"). However, such an approach may ignore more efficient routes (e.g., routes that may provide more favorable tailwinds or routes that cover fewer miles). Furthermore, the flight planning software being used by airlines may not be updated to include route options that they may be more favorable than the chosen routes. In block 478 of the process 476, the airline fuel profiler 1 can determine the route in the flight plan and also can determine an optimal route. In this process 476, the buffer criteria can include the determined optimal route. In block 480, the airline fuel profiler 1 compares the route in the flight plan to the determined optimal route. If the flight plan route and the determined optimal route are the same, then the airline fuel profiler 1 does not change the flight plan, as indicated in block 482. However, if the route in the flight plan differs from the optimal route, then the airline fuel profiler 1 changes the route in the flight plan to match the optimal route, as indicated in block 484.

As described in greater detail below, the airline fuel profiler 1 can accumulate data about multiple instances of the same flight along a route. Through statistical analysis of this accumulated data, the airline fuel profiler 1 may recognize real-world limitations on particular routes that may prevent the use of an optimal route. As a result, the airline fuel profiler 1 can substitute real-world limitations on a route in place of otherwise optimal routing. As a hypothetical example, a flight plan may determine that the optimal cruise altitude for a flight from Atlanta, Ga. to New York City is 35,000 feet. However, air traffic control (ATC) may typically limit flights from Atlanta to New York City to altitudes of 24,000 feet. Statistical analysis by the airline fuel profiler 1 may determine from the accumulated data that a cruise altitude of 24,000 feet is the most likely outcome for a particular flight. As a result, the airline fuel profiler 1 may force the flight plan to use a 24,000 feet cruise altitude, even through a 35,000 feet cruise altitude would be more fuel efficient. As another example, a particular route (e.g., comprising airways and intersections) through the sky from Atlanta to New York City may be determined to be the most optimal route to fly. However, statistical analysis may reveal that air traffic control usually requires aircraft flying from Atlanta to New York City to follow a particular route that is less optimal. Again, the airline fuel profiler 1 may substitute the ATC designated route for the optimal routes in the flight plan. As a result of these changes to suboptimal routes, the airline fuel profiler 1 can provide a realistic, achievable flight plan that carries a correct load of fuel.

Referring now to FIG. 15A, the airline fuel profiler 1 can implement a process 500 to determine whether the excess contingencies flight plan 122 includes a Standard Instrument Departure (SIDs) buffer 180. A SIDs is a predefined flight path an aircraft can follow after takeoff from certain airports. By commanding an aircraft to follow a particular SIDs, an air traffic controller can reduce the number of verbal instructions that are provided to a flight crew after takeoff. Often, an airport will have multiple SIDs for each runway, wherein the SIDs used can depend on wind direction, the general direction in which a particular aircraft is heading after takeoff, etc. Flight plans can include a selected SIDs. However, flight planning software may not incorporate the most optimal SIDs in the flight plan. In block 502 of the process 500, the airline fuel profiler 1 can determine the SIDs in the flight plan and also an optimal SIDs for the flight plan. In block 502, the airline fuel profiler 1 can compare the SIDs in the flight plan to the optimal SIDs. If the SIDs in the flight plan matches the optimal SIDs, then the airline fuel profiler 1 does not make any changes to the flight plan, as indicated in block 506. However, if the SIDs in the flight plan does not match the optimal SIDs, then the airline fuel profiler 1 changes the SIDs in the flight plan to the optimal SIDs. In this process 500, the buffer criteria can include the optimal SIDs.

As discussed in greater detail below, the airline fuel profiler 1 can accumulate data about multiple flights from a departure airport to an arrival airport. The airline fuel profiler 1 may statistically determine that a particular SIDs is most likely to be used by ATC, even if that particular SIDs is not the most optimal. In such instances, the airline fuel profiler 1 can substitute the most-likely-to-be-used SIDs for the determined optimal SIDs when determining whether a SIDs buffer 180 exists in the flight plan.

Figures 16A, 16B:
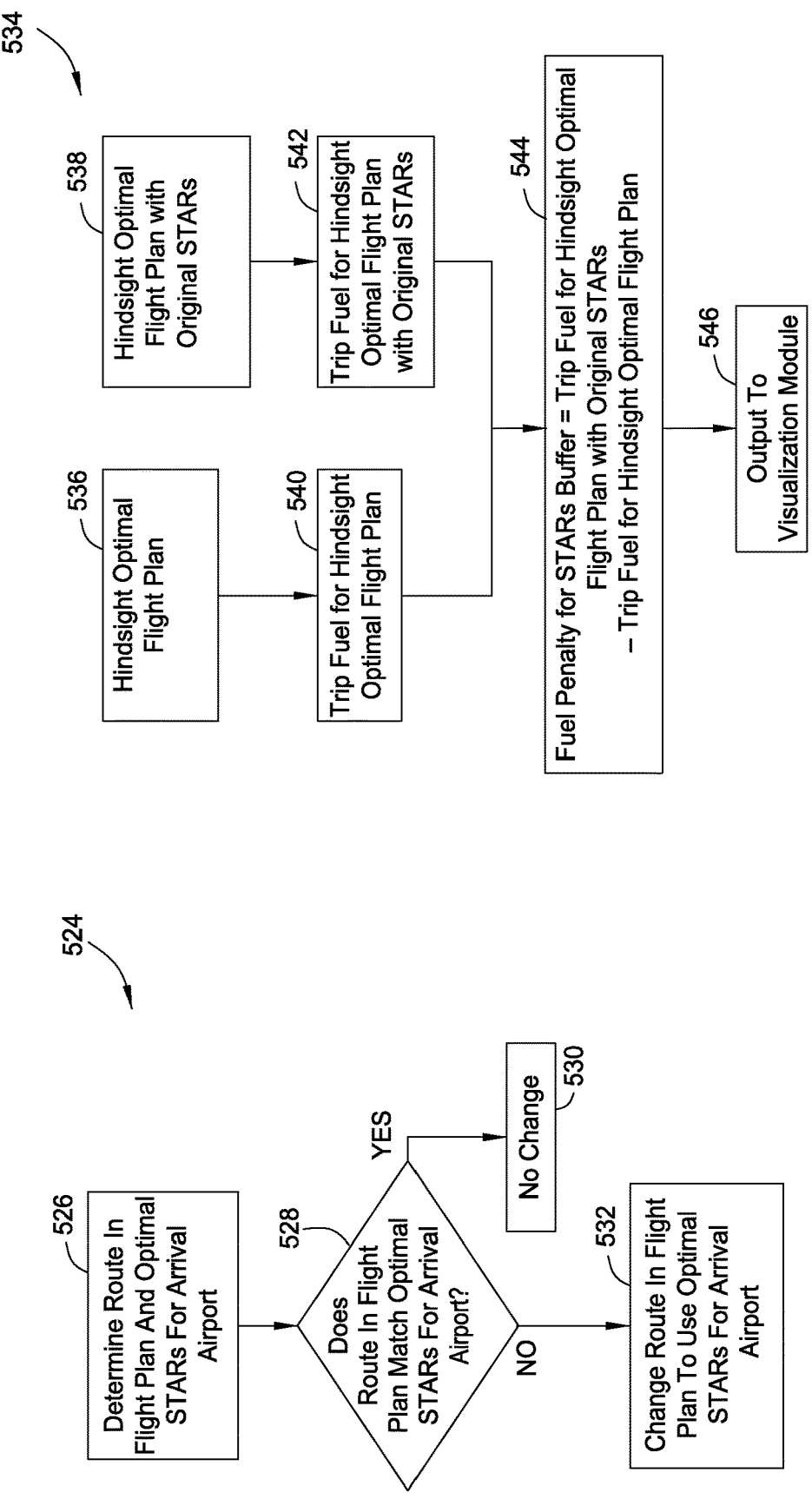
FIG. 16A illustrates an exemplary process that embodiments of an airline fuel profiler may use to determine whether a operator-provided flight plan includes a Standard Terminal Arrival Route (STARs) buffer.
FIG. 16B illustrates an exemplary process that embodiments of an airline fuel profiler may use to determine the cost, in terms of trip fuel, for an identified STARs buffer in the operator-provided flight plan.

Referring now to FIG. 16A, the airline fuel profiler 1 can implement a process 524 to determine whether the excess contingencies flight plan 122 includes a Standard Terminal Arrival Route (STARs) buffer 182. Similar to SIDs, STARs are predefined paths leading to runways at certain airports. By commanding an aircraft to follow a particular STARs, air traffic controllers may reduce the number of instructions, they communicate to a per particular flight crew. Often, an airport will have multiple STARs for each runway, wherein the STARs used can depend on wind direction, the general direction from which a particular aircraft is arriving, etc. Flight plans can include a STARs for approach to the arrival airport. However, flight planning software may not incorporate the most optimal STARs in the flight plan. In block 526 of the process 524, the airline fuel profiler 1 can determine the STARs in the flight plan and also an optimal STARs. In block 528, the airline fuel profiler 1 compares the STARs in the flight plan to the determined optimal STARs. If the STARs in the flight plan matches the determined optimal STARs, then the airline fuel profiler 1 does not make any changes to the flight plan, as indicated in block 530. If the STARS in the flight plan does not match the determined optimal STARs, then the airline fuel profiler 1 can change the STARs in the flight plan to match the optimal STARs, as indicated in block 532. In this process 524, the buffer criteria can include the determined optimal STARs.

As discussed in greater detail below, the airline fuel profiler 1 can accumulate data about multiple flights from a departure airport to an arrival airport. The airline fuel profiler 1 may statistically determine from the data that a particular STARs is most likely to be used by ATC, even if that particular STARs is not the most optimal. In such instances, the airline fuel profiler 1 substitute the most-likely-to-be-used STARs for the determined optimal STARs.

Referring again to FIG. 3B, the airline fuel profiler 1 can start from the excess contingencies flight plan 122 and determine whether the route, SIDs, and or STARs in the excess contingencies flight plan are optimal. As described above with reference to FIGS. 14A, 15A, and 16A, sub-optimal routes, SIDs, and/or STARs are replaced with optimal routes, SIDs, and/or STARs to create the route optimization flight plan 124. As discussed below, the airline fuel profiler 1 can replace the alternate airport in the flight plan with an optimal alternate airport to transform the route optimization flight plan 124 into an alternate removed/replaced flight plan 126.

Figures 17A, 17B:
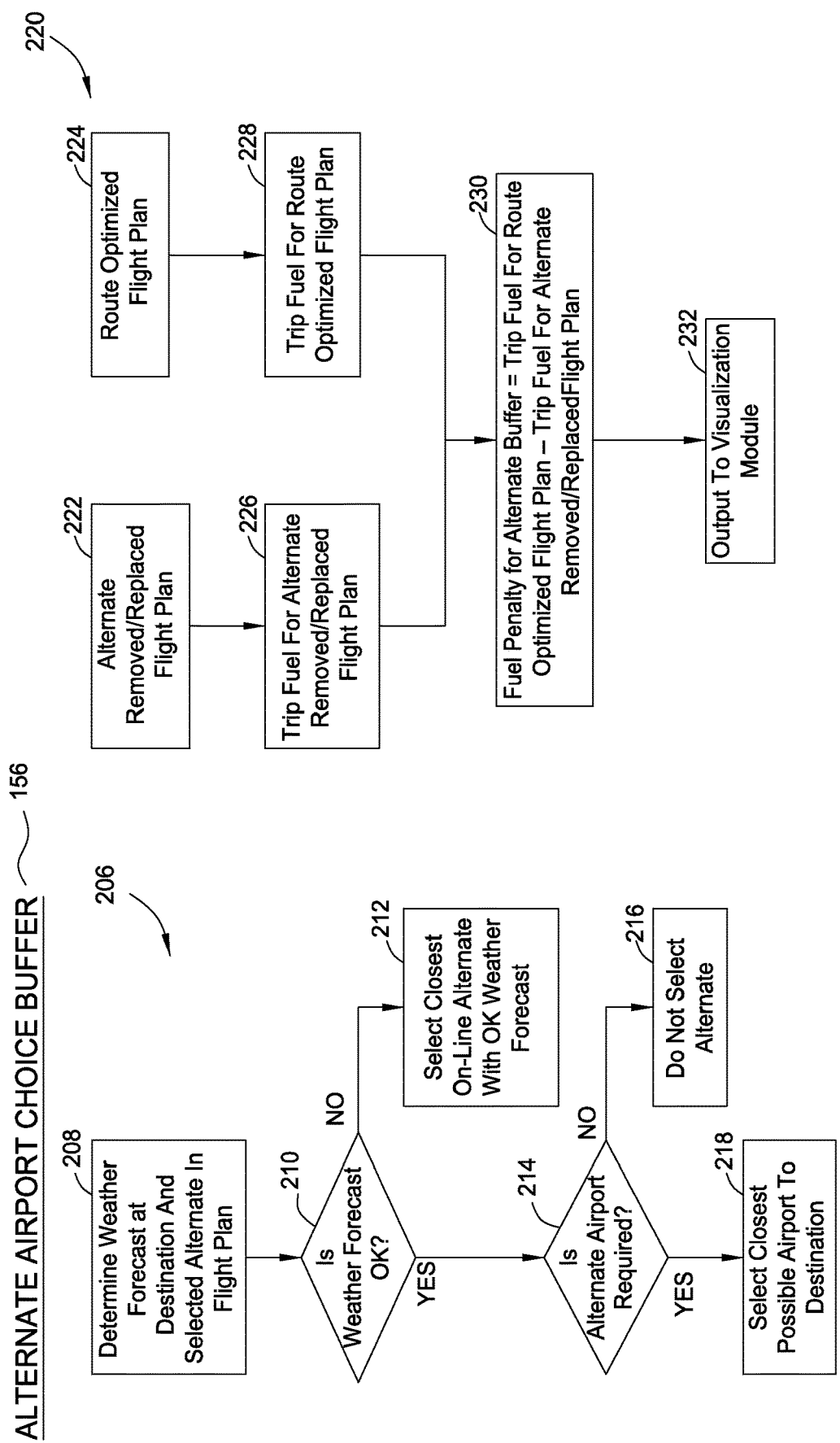
FIG. 17A illustrates an exemplary process that embodiments of an airline fuel profiler may use to determine whether a operator-provided flight plan includes an alternate airport choice buffer.
FIG. 17B illustrates an exemplary process that embodiments of an airline fuel profiler may use to determine the cost, in terms of trip fuel, for an identified alternate airport choice buffer in the operator-provided flight plan.

Referring now to FIG. 17A, the airline fuel profiler 1 can implement a process 206 to determine whether the route optimization flight plan 124 includes an alternate airport choice buffer 156. In certain countries, such as the United States, a flight plan is only required to include an alternate airport location when bad weather is forecast for the arrival airport at the time of landing. For example, a flight plan in the United States may not require an alternate airport if the weather at the time of arrival is forecast to have a cloud ceiling above 5,000 feet, visibility of at least 6 statute miles, and no significant precipitation and/or fog (i.e., Ceiling and Visibility are OK ("CAVOK") conditions). If conditions are forecast to be worse than CAVOK, then the flight plan must include an alternate. By contrast, Europe requires all flight plans to include an alternate regardless of weather conditions. Many flight plans in the US include an alternate airport designation even when no such alternate is required. Furthermore, the alternate selected is often sub-optimal. For example, an airline will often choose an alternate airport that is "on line" (an airport that the airline flies to). That way, if the alternate airport is used, the airline will be able to use its own facilities to service the aircraft at the alternate location, thereby avoiding complications and expenses that may result from landing at an airport where the airline does not have such services. Landing at an airport that is not equipped to handle the airline's aircraft can be more expensive (e.g., landing at a military base may be possible, but the military base may not have facilities for offloading passengers and/or for paying for refueling, thereby complicating any landing at that military base). However, when weather conditions are good, the chances of using the alternate airport are small. Consequently, when weather conditions are good, the chosen alternate may be the closest possible airport to the destination, regardless of whether the airline has services at the alternate airport. Similarly, if regulations do not require an alternate to be selected in good weather conditions, such as the United States, then no alternate may be selected. Referring to block 208 of the process 206, the airline fuel profiler 1 can determine the weather forecast of the destination airport at the estimated arrival time and determine whether an alternate airport is selected in the flight plan. In block 210, the airline fuel profiler 1 can determine whether the weather forecast is okay for the destination airport (e.g. conditions are CAVOK). If weather conditions are not okay, then the airline fuel profiler 1 selects the closest "on-line" airport as the alternate airport, as indicated in block 212. If the weather forecast is okay, then the process moves to block 214 to determine whether an alternate airport is required. As indicated above, if the flight is occurring within the United States (or other jurisdictions with "no alternate in CAVOK conditions" regulations), then no alternate airport is required, and the airline fuel profiler 1 does not select an alternate, as indicated in block 216. However, if the flight is occurring in Europe (or other jurisdictions with similar regulations regarding alternate airport selection), then the airline fuel profiler 1 selects the closest possible airport to the destination airport as alternate, as indicated in block 218. In this process 206, the buffer criteria can include an alternate required criterion and a closest possible airport criterion.

Figures 18A, 18B:
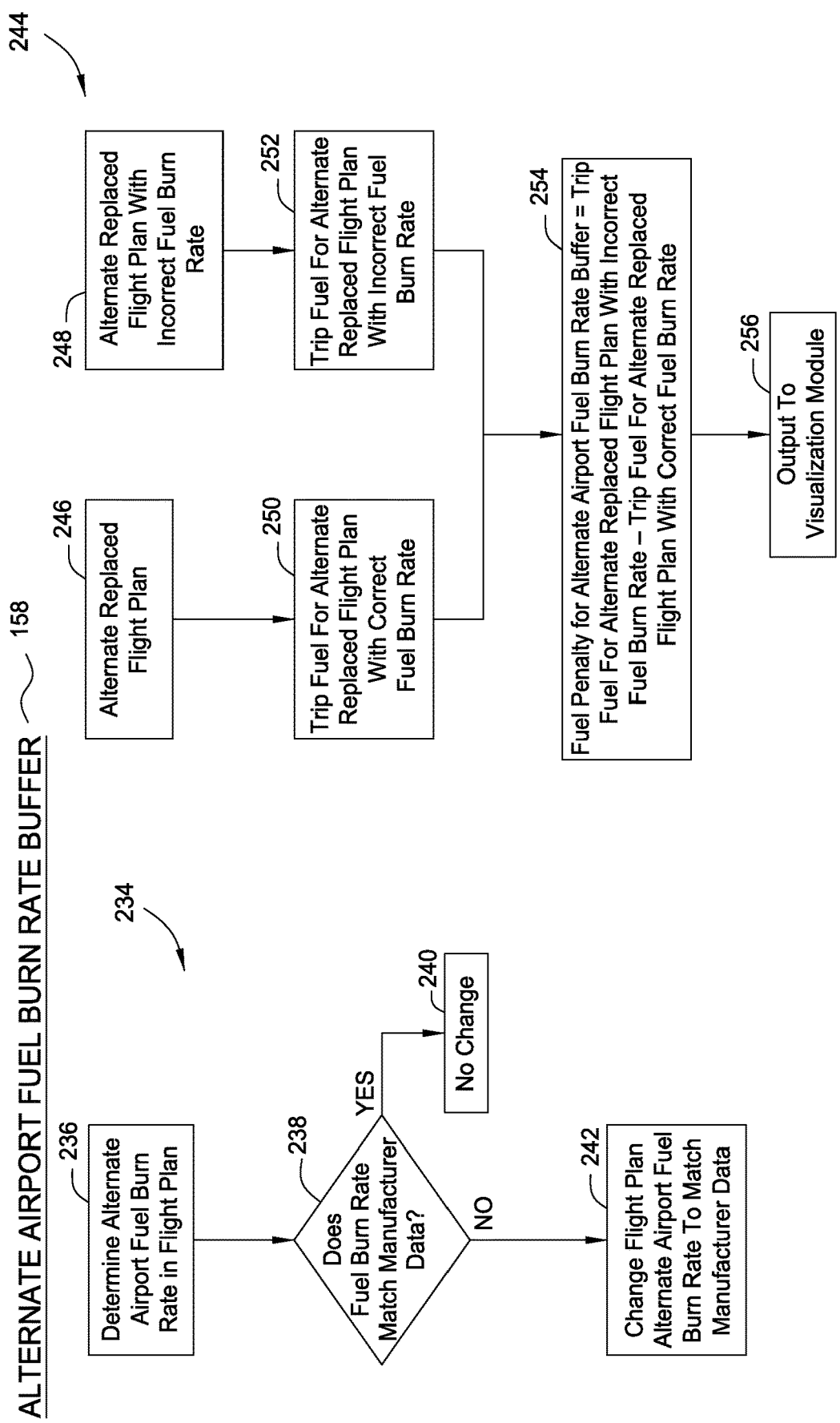
FIG. 18A illustrates an exemplary process that embodiments of an airline fuel profiler may use to determine whether a operator-provided flight plan includes an alternate airport fuel burn buffer.
FIG. 18B illustrates an exemplary process that embodiments of an airline fuel profiler may use to determine the cost, in terms of trip fuel, for an identified alternate airport fuel burn buffer in the operator-provided flight plan.

Referring now to FIG. 18A, the airline fuel profiler 1 can implement a process 234 to determine whether the route optimization flight plan 124 includes an alternate airport fuel burn rate buffer 158. If an aircraft is required to travel to its alternate airport, the fuel burn rate may be different then fuel burn rates at other phases of flight (e.g., cruise). On the one hand, the aircraft tends to be lighter when traveling from the intended destination airport to the alternate airport than during cruise because the aircraft has burned off most of the fuel from its trip. However, the aircraft may be traveling at a lower altitude during travel to the alternate than it would during cruise. For example, an aircraft may arrive at its destination airport and fly a holding pattern at 15,000 feet. If then diverted to its alternate airport, the aircraft may only climb to 20,000 feet for travel to the alternate airport (compared to 35,000 feet during cruise). In some instances, the aircraft manufacturer may provide a fuel burn rate for the aircraft during travel to the alternate airport. In block 236 of the process 234, the airline fuel profiler 1 can determine the alternate airport fuel burn rate in the flight plan. In block 238, the airline fuel profiler 1 can compare the alternate fuel burn rate in the flight plan to buffer criteria to determine whether the alternate fuel burn rate includes a buffer. For example, the buffer may be derived from manufacturer data regarding fuel burn rates at lower altitudes. As another example, the airline fuel profiler 1 may use a fuel burn rate associated with a conservatively-low altitude (e.g., 11,000 feet, which is lower than an airliner will be required to fly by any regulatory agency to reach an alternate airport) as the buffer criteria. If the alternate airport fuel burn rate in the flight plan matches the manufacturer data, then the airline fuel profiler 1 does not change the flight plan, as indicated in block 240. However, if the alternate airport fuel burn rate in the flight plan is different from the alternate airport fuel burn rate from manufacturer data, then the flight plan is updated to use the fuel burn rate from manufacturer data, as indicated in block 242. In this process 234, the buffer criteria can include the manufacturer-provided alternate airport fuel burn rate.

Referring again to FIG. 3B, the airline fuel profiler 1 can start with the route optimization flight plan 124, and can replace the alternate airport with an optimal airport as discussed with reference to FIG. 17A and replace the alternate airport fuel burn rate as discussed with reference to FIG. 18A. As a result, the airline fuel profiler 1 can create an alternate removed/replaced flight plan 126. In a final step, the airline fuel profiler 1 can create a hindsight optimal flight plan 128. After a flight has been performed by looking at the actual weather conditions during the particular flight to determine what would have been the most optimal flight plan.

Fuel Penalty (Cost) Analysis of Identified Hidden Buffers

After the various flight plans 118, 120, 122, 124, 126, 128, have been prepared, cost analyses of the various buffers can be provided by the airline fuel profiler 1. The cost of the buffers can be expressed as a fuel penalty (i.e., an amount of otherwise unnecessary fuel that is being carried to accommodate the buffer). In various embodiments, the airline fuel profiler 1 can provide a fuel penalty for the cumulative buffers considered in each flight plan. For example, the airline fuel profiler 1 can provide a fuel penalty calculation for the zero fuel weight buffer 172 and the operating empty weight buffer 174 by subtracting the calculated fuel load for the calibration flight plan 118 from the calculated fuel load for the baseline flight plan 120. The difference in calculated fuel amount is the fuel penalty (e.g. in pounds of fuel) for the weight buffers in the operator's original flight plan. As another example, the airline fuel profiler 1 can provide a fuel penalty calculation for the taxi out time buffer 160, the taxi in time buffer 162, the taxi in/out fuel burn rate buffer 164, the hold time buffer 166, the hold fuel burn rate buffer 168, the aircraft performance wear factor buffer 170, and the weather buffer 176 by subtracting the calculated fuel load for the baseline flight plan 120 from the calculated fuel load for the excess contingencies flight plan 122. The difference in calculated fuel amount is the fuel penalty for these buffers in the operator's original flight plan. As another example, the airline fuel profiler 1 can provide a fuel penalty calculation for the canned route buffer 178, the SIDs buffer 180, and/or the STARs buffer 182 by subtracting the calculated fuel load for the route optimization flight plan 124 from the calculated fuel load for the excess contingencies flight plan 122. The difference in calculated fuel amount is the fuel penalty for any route buffers, SIDs buffers, and/or STARs buffers in the operator's original flight plan. As yet another example, the airline fuel profiler 1 can provide a fuel penalty calculation for any alternate airport choice buffer 156 and/or alternate airport fuel burn rate buffer 158 by subtracting the calculated fuel load for the route optimization flight plan 124 from the calculated fuel load for the alternate removed/replaced flight plan 126. The difference in calculated fuel load is the fuel penalty for these buffers in the operator's original flight plan.

In various embodiments, the airline fuel profiler 1 can provide an estimated fuel penalty for each individual buffer. Referring now to FIG. 5B, the airline fuel profiler 1 can implement a process 412 to calculate a fuel penalty for any zero fuel weight buffer 172 in the operator's original flight plan (i.e., the calibration flight plan 118). In block 414, the airline fuel profiler 1 can start with the alternate removed/replaced flight plan 126. Then, in block 418, the airline fuel profiler 1 can calculate a trip fuel for the alternate removed/replaced flight plan 126. In block 416, the airline fuel profiler 1 can modify the alternate removed/replaced flight plan 126 by re-inserting the operator's original zero fuel weight buffer 172. Then, in block 420, the airline fuel profiler 1 can calculate the trip fuel for this modified alternate removed/replaced flight plan. In block 422, the airline fuel profiler 1 can subtract the trip fuel for the alternate removed/replaced flight plan 126 from the trip fuel for the modified alternate removed/replaced flight plan to calculate the fuel penalty for the zero fuel weight buffer 172. In block 424, the fuel penalty for the zero fuel weight buffer 172 can be output to the visualization module 18 (shown in FIG. 1).

Referring now to FIG. 6B, the airline fuel profiler 1 can implement a process 436 to calculate a fuel penalty for any operating empty weight buffer 174 in the operator's original flight plan (i.e., the calibration flight plan 118). In block 438, the airline fuel profiler 1 can start with the alternate removed/replaced flight plan 126. Then, in block 442, the airline fuel profiler 1 can calculate a trip fuel for the alternate removed/replaced flight plan 126. In block 440, the airline fuel profiler 1 can modify the alternate removed/replaced flight plan 126 by re-inserting the operator's original operating empty weight buffer 174. Then, in block 446, the airline fuel profiler 1 can calculate the trip fuel for the modified alternate removed/replaced flight plan. In block 448, the airline fuel profiler 1 can subtract the trip fuel for the alternate removed/replaced flight plan 126 from the trip fuel for the modified alternate removed/replaced flight plan to calculate the fuel penalty for the operating empty weight buffer 174 in the operator's original flight plan. In block 450, the fuel penalty for the operating empty weight buffer 174 in the operator's flight plan can be output to the visualization module 18.

Referring now to FIG. 7B, the airline fuel profiler 1 can implement a process 252 to calculate a fuel penalty for any taxi out time buffer 160 in the operator's original flight plan (i.e., the calibration flight plan 118). In block 254, the airline fuel profiler 1 can start with the alternate removed/replaced flight plan 126. Then, in block 258, the airline fuel profiler 1 can calculate a trip fuel for the alternate removed/replaced flight plan 126. In block 256, the airline fuel profiler 1 can modify the alternate removed/replaced flight plan 126 by re-inserting the operator's original taxi out time buffer 160. Then, in block 260, the airline fuel profiler 1 can calculate the trip fuel for this modified alternate removed/replaced flight plan. In block 262, the airline fuel profiler 1 can subtract the trip fuel for the alternate removed/replaced flight plan from the trip fuel for the modified alternate removed/replaced flight plan to calculate the fuel penalty for the taxi out time buffer 160 in the operator's original flight plan. In block 264, the fuel penalty for the taxi out time buffer 160 in the operator's flight plan can be output to the visualization module 18.

Referring now to FIG. 8B, the airline fuel profiler 1 can implement a process 284 to calculate a fuel penalty for any taxi in time buffer 162 in the operator's original flight plan (i.e., the calibration flight plan 118). In block 286, the airline fuel profiler 1 can start with the alternate removed/replaced flight plan 126. Then, in block 290, the airline fuel profiler 1 can calculate a trip fuel for the alternate removed/replaced flight plan 126. In block 288, the airline fuel profiler 1 can modify the alternate removed/replaced flight plan 126 by re-inserting the operator's original taxi in time buffer 162. Then, in block 292, the airline fuel profiler 1 can calculate the trip fuel for this modified alternate removed/replaced flight plan. In block 294, the airline fuel profiler 1 can subtract the trip fuel for the alternate removed/replaced flight plan 126 from the trip fuel for the modified alternate removed/replaced flight plan to calculate the fuel penalty for the taxi in time buffer 162 in the operator's original flight plan. In block 296, the fuel penalty for the taxi in time buffer 162 in the operator's original flight plan can be output to the visualization module 18.

Referring now to FIG. 9B, the airline fuel profiler 1 can implement a process 308 to calculate a fuel penalty for any taxi in/out fuel burn rate buffer 164 in the operator's original flight plan (i.e., the calibration flight plan 118). In block 310, the airline fuel profiler 1 can start with the alternate removed/replaced flight plan 126. Then, in block 314, the airline fuel profiler 1 can calculate a trip fuel for the alternate removed/replaced flight plan 126. In block 312, the airline fuel profiler 1 can modify the alternate removed/replaced flight plan 126 by re-inserting the operator's original taxi in/out fuel burn rate buffer 164. Then, in block 316, the airline fuel profiler 1 can calculate the trip fuel for this modified alternate removed/replaced flight plan. In block 318, the airline fuel profiler 1 can subtract the trip fuel for the alternate removed/replaced flight plan 126 from the trip fuel for the modified alternate removed/replaced flight plan to calculate the fuel penalty for the taxi in/out fuel burn rate buffer 164 in the operator's original flight plan. In block 320, the fuel penalty for the taxi in/out fuel burn rate buffer 164 in the operator's original flight plan can be output to the visualization module 18.

Referring now to FIG. 10B, the airline fuel profiler 1 can implement a process 340 to calculate a fuel penalty for any hold time buffer 166 in the operator's original flight plan (i.e., the calibration flight plan 118). In block 342, the airline fuel profiler 1 can start with the alternate removed/replaced flight plan 126. Then, in block 346, the airline fuel profiler 1 can calculate a trip fuel for the alternate removed/replaced flight plan 126. In block 344, the airline fuel profiler 1 can modify the alternate removed/replaced flight plan 126 by re-inserting the operator's original hold time buffer 166. Then, in block 348, the airline fuel profiler 1 can calculate the trip fuel for this modified alternate removed/replaced flight plan. In block 350, the airline fuel profiler 1 can subtract the trip fuel for the alternate removed/replaced flight plan 126 from the trip fuel for the modified alternate removed/replaced flight plan to calculate the fuel penalty for the hold time buffer 166 in the operator's original flight plan. In block 352, the fuel penalty for the hold time buffer 166 in the operator's original flight plan can be output to the visualization module 18.

Referring now to FIG. 11B, the airline fuel profiler 1 can implement a process 364 to calculate a fuel penalty for any hold fuel burn rate buffer 168 in the operator's original flight plan (i.e., the calibration flight plan 118). In block 366, the airline fuel profiler 1 can start with the alternate removed/replaced flight plan 126. Then, in block 370, the airline fuel profiler 1 can calculate a trip fuel for the alternate removed/replaced flight plan 126. In block 368, the airline fuel profiler 1 can modify the alternate removed/replaced flight plan 126 by re-inserting the operator's original hold fuel burn rate buffer 168. Then, in block 372, the airline fuel profiler 1 can calculate the trip fuel for this modified alternate removed/replaced flight plan. In block 374, the airline fuel profiler 1 can subtract the trip fuel for the alternate removed/replaced flight plan 126 from the trip fuel for the modified alternate removed/replaced flight plan to calculate the fuel penalty for the hold fuel burn rate buffer 168 in the operator's original flight plan. In block 376, the fuel penalty for the hold fuel burn rate buffer 168 in the operator's original flight plan can be output to the visualization module 18.

Referring now to FIG. 12B, the airline fuel profiler 1 can implement a process 288 to calculate a fuel penalty for any aircraft performance wear factor buffer 170 in the operator's original flight plan (i.e., the calibration flight plan 118). In block 390, the airline fuel profiler 1 can start with the alternate removed/replaced flight plan 126. Then, in block 394, the airline fuel profiler 1 can calculate a trip fuel for the alternate removed/replaced flight plan 126. In block 392, the airline fuel profiler 1 can modify the alternate removed/replaced flight plan 126 by re-inserting the operator's original aircraft performance wear factor buffer 170. Then, in block 396, the airline fuel profiler 1 can calculate the trip fuel for this modified alternate removed/replaced flight plan. In block 398, the airline fuel profiler 1 can subtract the trip fuel for the alternate removed/replaced flight plan 126 from the trip fuel for the modified alternate removed/replaced flight plan to calculate the fuel penalty for the aircraft performance wear factor buffer 170 in the operator's original flight plan. In block 376, the fuel penalty for the aircraft performance wear factor buffer 170 in the operator's original flight plan can be output to the visualization module 18.

Referring now to FIG. 13B, the airline fuel profiler 1 can implement a process 462 to calculate a fuel penalty for any weather buffer 176 in the operator's original flight plan (i.e., the calibration flight plan 118). In block 464, the airline fuel profiler 1 can start with the hindsight optimal flight plan 128. Then, in block 468, the airline fuel profiler 1 can calculate a trip fuel for the hindsight optimal flight plan 128. In block 466, the airline fuel profiler 1 can modify the hindsight optimal flight plan 128 by re-inserting the operator's original weather buffer 176. Then, in block 470, the airline fuel profiler 1 can calculate the trip fuel for this modified hindsight optimal flight plan. In block 472, the airline fuel profiler 1 can subtract the trip fuel for the hindsight optimal flight plan 128 from the trip fuel for the modified hindsight optimal flight plan to calculate the fuel penalty for the weather buffer 176 in the operator's original flight plan. In block 474, the fuel penalty for the weather buffer 176 in the operator's original flight plan can be output to the visualization module 18.

Referring now to FIG. 14B, the airline fuel profiler 1 can implement a process 486 to calculate a fuel penalty for any canned route buffer 178 in the operator's original flight plan (i.e., the calibration flight plan 118). In block 488, the airline fuel profiler 1 can start with the hindsight optimal flight plan 128. Then, in block 492, the airline fuel profiler 1 can calculate a trip fuel for the hindsight optimal flight plan 128. In block 490, the airline fuel profiler 1 can modify the hindsight optimal flight plan 128 by re-inserting the operator's original canned route buffer 178. Then, in block 494, the airline fuel profiler 1 can calculate the trip fuel for this modified hindsight optimal flight plan. In block 496, the airline fuel profiler 1 can subtract the trip fuel for the hindsight optimal flight plan 128 from the trip fuel for the modified hindsight optimal flight plan to calculate the fuel penalty for the canned route buffer 178 in the operator's original flight plan. In block 498, the fuel penalty for the canned route buffer 178 in the operator's original flight plan can be output to the visualization module 18.

Referring now to FIG. 15B, the airline fuel profiler 1 can implement a process 510 to calculate a fuel penalty for any SIDs buffer 180 in the operator's original flight plan (i.e., the calibration flight plan 118). In block 512, the airline fuel profiler 1 can start with the hindsight optimal flight plan 128. Then, in block 516, the airline fuel profiler 1 can calculate a trip fuel for the hindsight optimal flight plan 128. In block 514, the airline fuel profiler 1 can modify the hindsight optimal flight plan 128 by re-inserting the operator's original SIDs buffer 180. Then, in block 518, the airline fuel profiler 1 can calculate the trip fuel for this modified hindsight optimal flight plan. In block 520, the airline fuel profiler 1 can subtract the trip fuel for the hindsight optimal flight plan 128 from the trip fuel for the modified hindsight optimal flight plan to calculate the fuel penalty for the SIDs buffer 180 in the operator's original flight plan. In block 498, the fuel penalty for the SIDs buffer 180 in the operator's original flight plan can be output to the visualization module 18.

Referring now to FIG. 16B, the airline fuel profiler 1 can implement a process 534 to calculate a fuel penalty for any STARs buffer 182 in the operator's original flight plan (i.e., the calibration flight plan 118). In block 536, the airline fuel profiler 1 can start with the hindsight optimal flight plan 128. Then, in block 540, the airline fuel profiler 1 can calculate a trip fuel for the hindsight optimal flight plan 128. In block 538, the airline fuel profiler 1 can modify the hindsight optimal flight plan 128 by re-inserting the operator's original STARs buffer 182. Then, in block 542, the airline fuel profiler 1 can calculate the trip fuel for this modified hindsight optimal flight plan. In block 544, the airline fuel profiler 1 can subtract the trip fuel for the hindsight optimal flight plan 128 from the trip fuel for the modified hindsight optimal flight plan to calculate the fuel penalty for the STARs buffer 182 in the operator's original flight plan. In block 546, the fuel penalty for the STARs buffer 182 in the operator's original flight plan can be output to the visualization module 18.

Referring now to FIG. 17B, the airline fuel profiler 1 can implement a process 220 to calculate a fuel penalty for any alternate airport choice buffer 156 in the operator's original flight plan (i.e., the calibration flight plan 118). In block 222, the airline fuel profiler 1 can start with the alternate removed/replaced flight plan 126. Then, in block 226, the airline fuel profiler 1 can calculate a trip fuel for the alternate removed/replaced flight plan 126. In block 224, the airline fuel profiler 1 can modify the alternate removed/replaced flight plan 126 by re-inserting the operator's original alternate airport choice buffer 156. Then, in block 228, the airline fuel profiler 1 can calculate the trip fuel for this modified alternate removed/replaced flight plan. In block 230, the airline fuel profiler 1 can subtract the trip fuel for the alternate removed/replaced flight plan 126 from the trip fuel for the modified alternate removed/replaced flight plan to calculate the fuel penalty for the alternate airport choice buffer 156 in the operator's original flight plan. In block 232, the fuel penalty for the alternate airport choice buffer 156 in the operator's original flight plan can be output to the visualization module 18.

Referring now to FIG. 18B, the airline fuel profiler 1 can implement a process 244 to calculate a fuel penalty for any alternate airport fuel burn rate buffer 158 in the operator's original flight plan (i.e., the calibration flight plan 118). In block 246, the airline fuel profiler 1 can start with the alternate removed/replaced flight plan 126. Then, in block 250, the airline fuel profiler 1 can calculate a trip fuel for the alternate removed/replaced flight plan 126. In block 248, the airline fuel profiler 1 can modify the alternate removed/replaced flight plan 126 by re-inserting the operator's original alternate airport fuel burn rate buffer 158. Then, in block 252, the airline fuel profiler 1 can calculate the trip fuel for this modified alternate removed/replaced flight plan. In block 254, the airline fuel profiler 1 can subtract the trip fuel for the alternate removed/replaced flight plan 126 from the trip fuel for the modified alternate removed/replaced flight plan to calculate the fuel penalty for the alternate airport fuel burn rate buffer 158 in the operator's original flight plan. In block 376, the fuel penalty for the alternate airport fuel burn rate buffer 158 in the operator's original flight plan can be output to the visualization module 18.

Identification and Cost (Fuel Penalty) Analysis of Potential Flight Operational Variances Various embodiments of the airline fuel profiler 1 can provide feedback to pilots and airline operators about potential operational variances from optimal flight operations that affect fuel economy. The potential operational variances can include flight operations that vary from the flight plan and/or from determined most-efficient operations of an aircraft. The feedback can be provided in real time during flight to the pilots, providing an opportunity for the pilots to correct to the potential operational variances, and also after the flight has occurred, providing insight into how a flight could have been performed more efficiently.

Figure 19B:
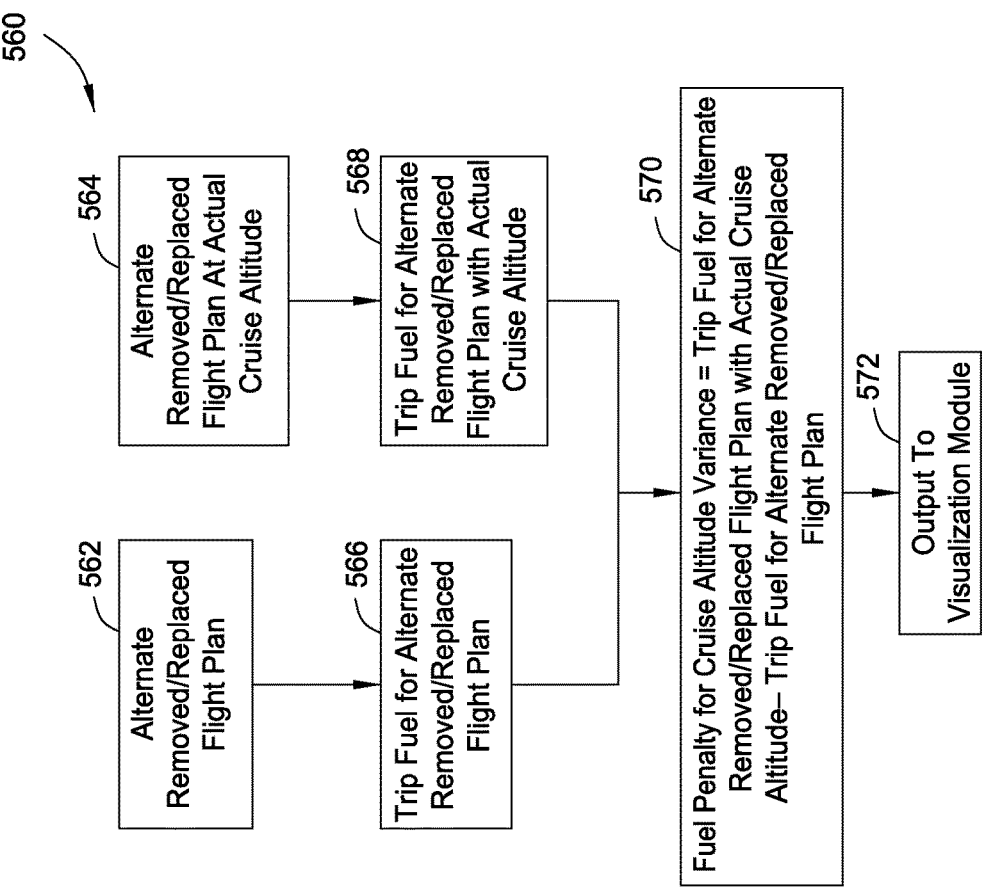
FIG. 19B illustrates an exemplary process that embodiments of an airline fuel profiler may use to determine a cost, in terms of trip fuel, for the cruise altitude potential operational variance.
Figure 19A:
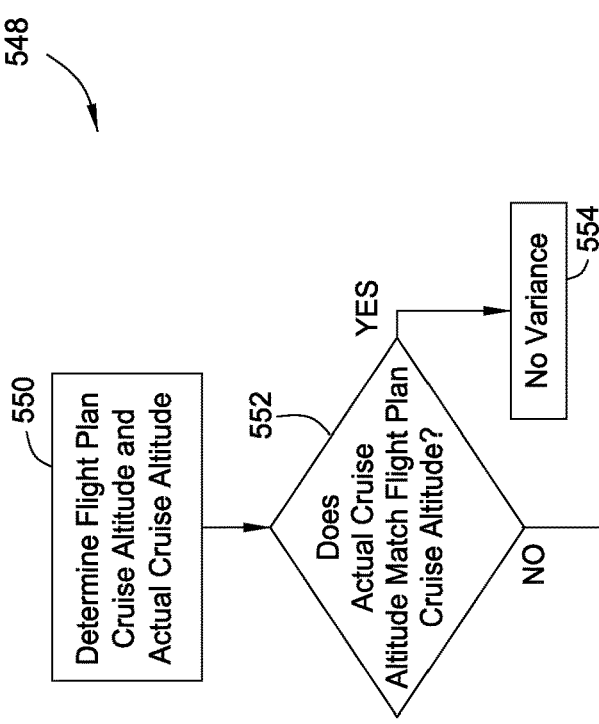
FIG. 19A illustrates an exemplary process that embodiments of an airline fuel profiler may use to determine whether operation of an aircraft includes a cruise altitude (or cruise level) that varies from a cruise altitude in a flight plan for the aircraft.

Referring to FIGS. 19A and 19B, an example of a potential operational variance from the flight plan can include a cruise level potential operational variance 184 (i.e., the aircraft cruises at a different altitude than calculated in the alternate removed/replaced flight plan 126). The airline fuel profiler 1 can implement a process 548 to determine whether there is a cruise level potential operational variance 184 and what the potential operational variance costs (in terms of a fuel penalty). In block 550, the airline fuel profiler 1 can determine the actual cruise altitude of the aircraft and the cruise altitude called for in the alternate removed/replaced flight plan 126. In block 552, if the actual cruise altitude matches the flight plan cruise altitude, then there is no potential operational variance, as indicated in block 554. However, if the actual cruise altitude does vary from the flight plan cruise altitude, then, in block 556, the airline fuel profiler 1 can calculate a fuel penalty for the potential operational variance. In block 558, the airline fuel profiler 1 can provide an indication of the fuel penalty for the potential operational variance to the pilots. Referring now to FIG. 19B, the airline fuel profiler 1 may calculate a fuel penalty for the potential operational variance (block 556 from FIG. 19A) by following a process 560. In block 562, the airline fuel profiler 1 can start with the alternate removed/replaced flight plan 126. In block 566, the airline fuel profiler 1 can calculate a trip fuel for the alternate removed/replaced flight plan 126. In block 564, the airline fuel profiler 1 can modify the alternate removed/replaced flight plan 126 by inserting the actual cruise altitude in place of the cruise altitude called for in the alternate removed/replaced flight plan 126. In block 568, the airline fuel profiler 1 can calculate a trip fuel for the modified alternate removed/replaced flight plan. In block 570, the airline fuel profiler 1 can calculate a fuel penalty for the cruise level potential operational variance 184 by subtracting the trip fuel for the alternate removed/replaced flight plan 126 from the trip fuel for the modified alternate removed/replaced flight plan. In some instances, the modified flight plan will use more fuel, then the unmodified flight plan. For example, the aircraft may be flying at a lower, less efficient altitude, thereby using more fuel. In other instances, however, the modified flight plan may use less fuel than the unmodified flight plan. For example, the aircraft may be flying at a different altitude to take advantage of more favorable tailwinds, thereby using less fuel, then the unmodified plan. Thus, the "fuel penalty" of the potential operational variance may be positive (using more fuel than the flight plan) or negative (using less fuel than the flight plan). In block 572, the airline fuel profiler 1 can output the calculated fuel penalty for the cruise level potential operational variance 184 to the visualization module 18, and/or to a computer screen in the cockpit of the aircraft. For example, pilots often carry and use tablet computers (e.g., an Apple® iPad® tablet computer) in the cockpit. An indication of the fuel penalty for the cruise level potential operational variance 184 can be displayed in real time to the pilots on such tablet computers.

Referring now to FIGS. 20A and 20B, another example of a potential operational variance from the flight plan can include a cruise speed potential operational variance 186 (i.e., the aircraft cruises at a different speed than calculated in the alternate removed/replaced flight plan 126). The airline fuel profiler 1 can implement a process 574 to determine whether there is a cruise speed potential operational variance 186, and what the potential operational variance costs. In block 576, the airline fuel profiler 1 can determine the actual cruise speed of the aircraft and the cruise speed, called for in the alternate removed/replaced flight plan 126. In block 578, if the actual cruise speed matches the flight plan cruise speed, then there is no potential operational variance, as indicated in block 580. However, if the actual cruise speed does vary from the flight plan cruise speed, then, in block 582, the airline fuel profiler 1 can calculate a fuel penalty for the potential operational variance. In block 584, the airline fuel profiler 1 can provide an indication of the fuel penalty for the potential operational variance to the pilots. Referring now to FIG. 20B, the airline fuel profiler 1 can calculate a fuel penalty for the potential operational variance (block 582 from FIG. 20A) by following a process 586. In block 588, the airline fuel profiler 1 can start with the alternate removed/replaced flight plan 126. In block 592, the airline fuel profiler 1 can calculate a trip fuel for the alternate removed/replaced flight plan 126. In block 590, the airline fuel profiler 1 can modify the alternate removed/replaced flight plan 126 by inserting the actual cruise speed in place of the cruise speed, called for in the alternate removed from/replaced flight plan 126. In block 594, the airline fuel profiler 1 can calculate a trip fuel for the modified alternate removed/replaced flight plan. In block 596, the airline fuel profiler 1 can calculate a fuel penalty for the cruise altitude, cruise speed potential operational variance 186 by subtracting the trip fuel for the alternate removed/replaced flight plan 126 from the trip fuel for the modified alternate removed/replaced flight plan. Again, depending on various circumstances, the cruise speed potential operational variance 186 can result in a positive fuel penalty (i.e. less fuel efficient) or a negative fuel penalty (i.e., more fuel efficient). In block 598, the airline fuel profiler 1 can output the calculated fuel penalty for the cruise level potential operational variance 184 to the visualization module 18, and/or a computer screen in the cockpit of the aircraft.

Figures 21A, 21B:
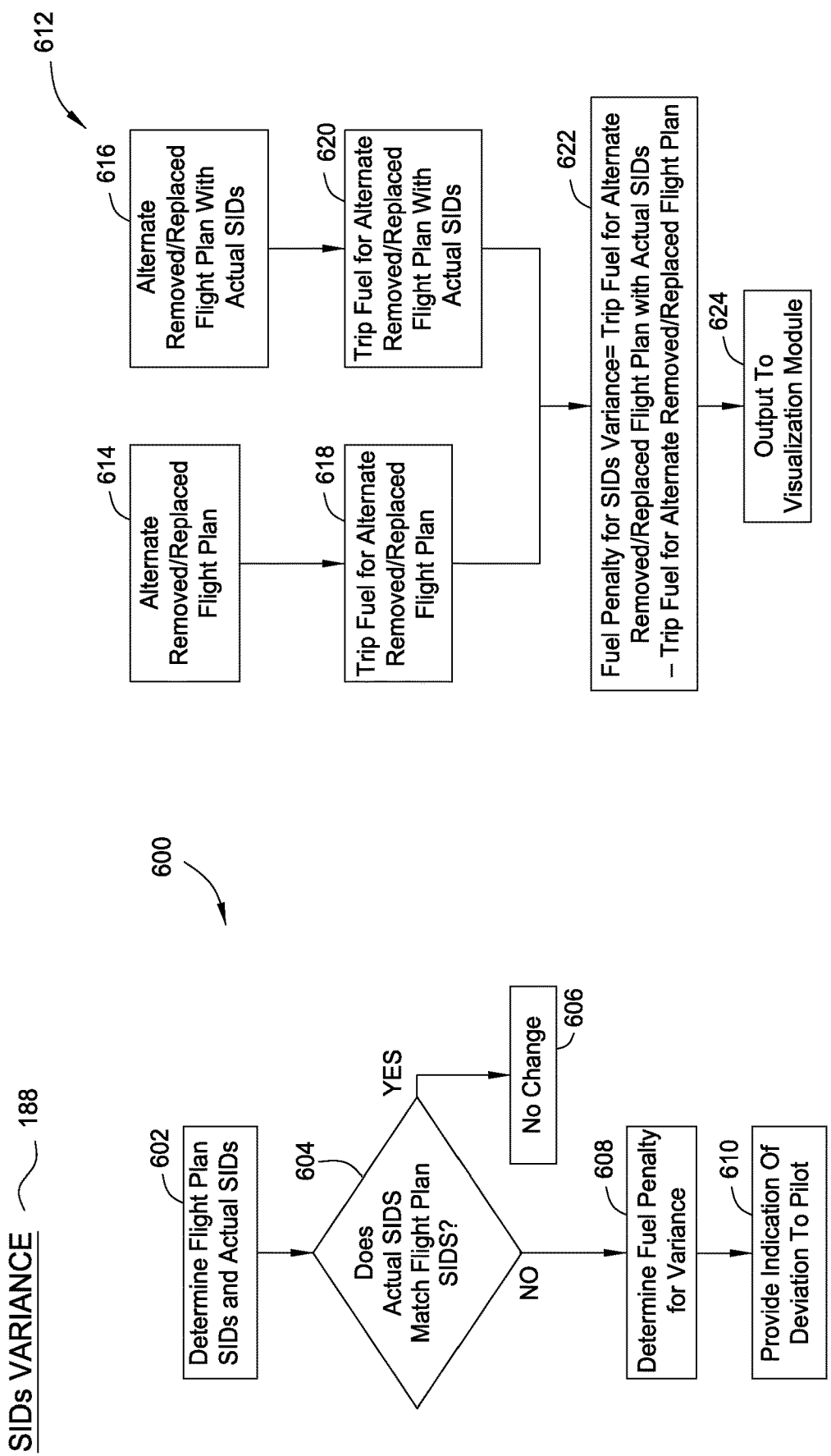
FIG. 21A illustrates an exemplary process that embodiments of an airline fuel profiler may use to determine whether operation of an aircraft includes a SIDs that varies from a SIDs in a flight plan for the aircraft.
FIG. 21B illustrates an exemplary process that embodiments of an airline fuel profiler may use to determine a cost, in terms of trip fuel, for the SIDs potential operational variance.

Referring to FIGS. 21A and 21B, another example of a potential operational variance from the flight plan can include a SIDs potential operational variance 188 (i.e., the aircraft follows a different SIDs upon departure, then the SIDs called for in the alternate removed/replaced flight plan 126). The airline fuel profiler 1 can implement a process 600 to determine whether there is a SIDs potential operational variance 188, and what the potential operational variance costs. In block 602, the airline fuel profiler 1 can determine the actual SIDs used by the aircraft (if any) and the SIDs called for in the alternate removed/replaced flight plan 126. In block 604, if the actual SIDs used by the aircraft matches the SIDs called for in the flight plan, then there is no potential operational variance, as indicated in block 606. However, if the actual SIDs used by the aircraft is different than the SIDs called for in the flight plan, then, in block 608, the airline fuel profiler 1 can calculate a fuel penalty for the potential operational variance. In block 610, the airline fuel profiler 1 can provide an indication of the fuel penalty for the potential operational variance to the pilots. Referring now to FIG. 21B, the airline fuel profiler 1 can calculate a fuel penalty for the potential operational variance (block 608 from FIG. 21A) by following a process 612. In block 614, the airline fuel profiler 1 can start with the alternate removed/replaced flight plan 126. In block 618, the airline fuel profiler 1 can calculate a trip fuel for the alternate removed/replaced flight plan 126. In block 616, the airline fuel profiler 1 can modify the alternate removed/replaced flight plan 126 by inserting the actual SIDs used in place of the SIDs called for in the alternate removed/replaced flight plan 126. In block 620, the airline fuel profiler 1 can calculate a trip fuel for the modified alternate removed/replaced flight plan. In block 622, the airline fuel profiler 1 can calculate a fuel penalty for the SIDs potential operational variance 188 by subtracting the trip fuel for the alternate removed/replaced flight plan 126 from the trip fuel for the modified alternate removed/replaced flight plan. Again, in various instances, the fuel penalty can be positive (i.e. less fuel efficient) or negative (i.e., more fuel efficient). In block 624, the airline fuel profiler 1 can output the calculated fuel penalty for the SIDs potential operational variance 188 to the visualization module 18, and/or to a computer screen in the cockpit of the aircraft.

Referring to FIGS. 22A and 22B, another example of a potential operational variance from the flight plan can include a STARs potential operational variance 190 (i.e., the aircraft follows a different STARs upon arrival, then the STARs called for in the alternate removed/replaced flight plan 126). The airline fuel profiler 1 can implement a process 626 to determine whether there is a STARs potential operational variance 190 and what the potential operational variance costs. In block 628, the airline fuel profiler 1 can determine the actual STARs used by the aircraft (if any) and the STARs called for in the alternate removed/replaced flight plan 126. In block 630, if the actual STARs used by the aircraft matches the STARs called for in the flight plan, then there is no potential operational variance, as indicated in block 632. However, if the actual STARs used by the aircraft is different than the STARs called for in the flight plan, then, in block 634, the airline fuel profiler 1 can calculate a fuel penalty for the potential operational variance. In block 636, the airline fuel profiler 1 can provide an indication of the fuel penalty for the STARs potential operational variance to the pilots. Referring now to FIG. 22B, the airline fuel profiler 1 can calculate a fuel penalty for the potential operational variance (block 634 from FIG. 22A) by following a process 638. In block 640, the airline fuel profiler 1 can start with the alternate removed/replaced flight plan 126. In block 644, the airline fuel profiler 1 can calculate a trip fuel for the alternate removed/replaced flight plan 126. In block 642, the airline fuel profiler 1 can modify the alternate removed/replaced flight plan 126 by inserting the actual STARs used in place of the STARs called for in the alternate removed/replaced flight plan 126. In block 646, the airline fuel profiler 1 can calculate a trip fuel for the modified alternate removed/replaced flight plan. In block 648, the airline fuel profiler 1 can calculate a fuel penalty for the STARs potential operational variance 190 by subtracting this trip fuel for the alternate removed/replaced flight plan 126 from the trip fuel for the modified alternate removed/replaced flight plan. Again, in various instances, the fuel penalty can be positive (i.e. less fuel efficient) or negative (i.e., more fuel efficient). In block 650, the airline fuel profiler 1 can output the calculated fuel penalty for the STARs potential operational variance 190 to the visualization module 18, and/or to a computer screen in the cockpit of the aircraft.

Referring to FIGS. 23A and 23B, another example of a potential operational variance from the flight plan can include a Top of Climb (TOC) potential operational variance 192 (i.e., the aircraft uses a different TOC than the TOC called for in the alternate removed/replaced flight plan 126). The airline fuel profiler 1 can implement a process 652 to determine whether there is a TOC potential operational variance 192 and what the potential operational variance costs. In block 654, the airline fuel profiler 1 can determine the actual TOC used by the aircraft and the TOC called for in the alternate removed/replaced flight plan 126. In block 656, if the actual TOC used by the aircraft matches the TOC called for in the flight plan, then there is no potential operational variance, as indicated in block 658. However, if the actual TOC used by the aircraft is different than the TOC called for in the flight plan, then, in block 660, the airline fuel profiler 1 can calculate a fuel penalty for the potential operational variance. In block 662, the airline fuel profiler 1 can provide an indication of the fuel penalty for the TOC potential operational variance to the pilots. Referring now to FIG. 22B, the airline fuel profiler 1 can calculate a fuel penalty for the potential operational variance (block 660 from FIG. 23A) by following a process 664. In block 666, the airline fuel profiler 1 can start with the alternate removed/replaced flight plan 126. In block 670, the airline fuel profiler 1 can calculate a trip fuel for the alternate removed/replaced flight plan 126. In block 668, the airline fuel profiler 1 can modify the alternate removed/replaced flight plan 126 by inserting the actual TOC used in place of the TOC called for in the alternate removed/replaced flight plan 126. In block 672, the airline fuel profiler 1 can calculate a trip fuel for the modified alternate removed/replaced flight plan. In block 674, the airline fuel profiler 1 can calculate a fuel penalty for the TOC potential operational variance 192 by subtracting this trip fuel for the alternate removed/replaced flight plan 126 from the trip fuel for the modified alternate removed/replaced flight plan. Again, in various instances, the fuel penalty can be positive (i.e. less fuel efficient) or negative (i.e., more fuel efficient). In block 676, the airline fuel profiler 1 can output the calculated fuel penalty for the TOC potential operational variance 192 to the visualization module 18, and/or to a computer screen in the cockpit of the aircraft.

Figures 24A, 24B:
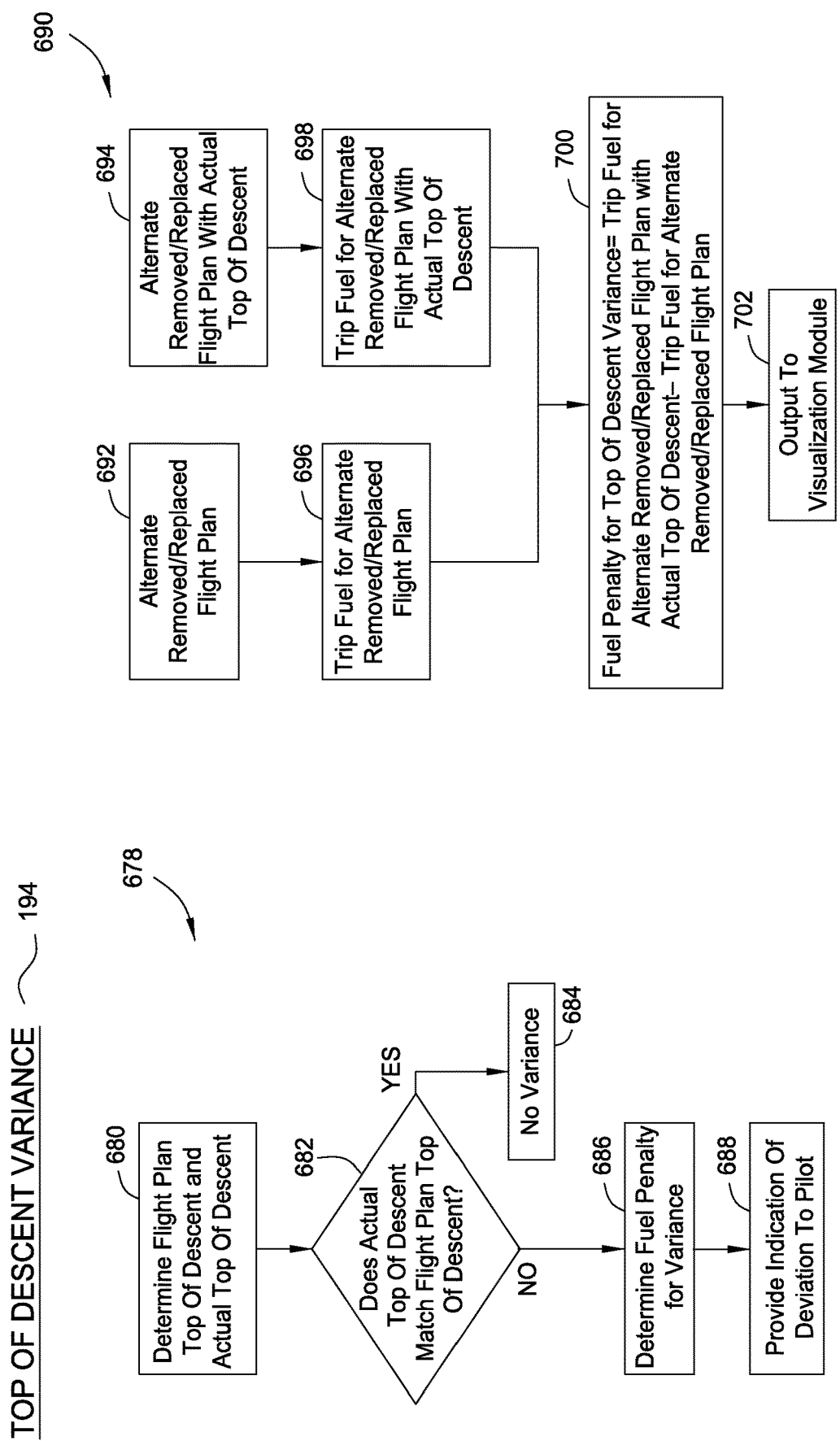
FIG. 24A illustrates an exemplary process that embodiments of an airline fuel profiler may use to determine whether operation of an aircraft includes a Top of Descent (TOD) that varies from a TOD in a flight plan for the aircraft.
FIG. 24B illustrates an exemplary process that embodiments of an airline fuel profiler may use to determine a cost, in terms of trip fuel, for the TOD potential operational variance.

Referring to FIGS. 24A and 24B, another example of a potential operational variance from the flight plan can include a Top of Descent (TOD) potential operational variance 194 (i.e., the aircraft uses a different TOD than the TOD called for in the alternate removed/replaced flight plan 126). The airline fuel profiler 1 can implement a process 678 to determine whether there is a TOD potential operational variance 194 and what the potential operational variance costs. In block 680, the airline fuel profiler 1 can determine the actual TOD used by the aircraft and the TOD called for in the alternate removed/replaced flight plan 126. In block 682, if the actual TOD used by the aircraft matches the TOD called for in the flight plan, then there is no potential operational variance, as indicated in block 684. However, if the actual TOD used by the aircraft is different than the TOD called for in the flight plan, then, in block 686, the airline fuel profiler 1 can calculate a fuel penalty of the potential operational variance. In block 688, the airline fuel profiler 1 can provide an indication of the fuel penalty of the TOD potential operational variance 194 to the pilots. Referring now to FIG. 24B, the airline fuel profiler 1 can calculate a fuel penalty of the TOD potential operational variance 194 (block 686 from FIG. 24A) by following a process 690. In block 692, the airline fuel profiler 1 can start with the alternate removed/replaced flight plan 126. In block 696, the airline fuel profiler 1 can calculate a trip fuel for the alternate removed/replaced flight plan 126. In block 694, the airline fuel profiler 1 can modify the alternate removed/replaced flight plan 126 by inserting the actual TOD used in place of the TOD called for in the alternate removed/replaced flight plan 126. In block 698, the airline fuel profiler 1 can calculate a trip fuel for this modified alternate removed/replaced flight plan. In block 700, the airline fuel profiler 1 can calculate a fuel penalty of the TOD potential operational variance 194 by subtracting this trip fuel for the alternate removed/replaced flight plan 126 from the trip fuel for the modified alternate removed/replaced flight plan. Again, in various instances, the fuel penalty can be positive (i.e. less fuel efficient) or negative (i.e., more fuel efficient). In block 702, the airline fuel profiler 1 can output the calculated fuel penalty of the TOD potential operational variance 194 to the visualization module 18, and/or to a computer screen in the cockpit of the aircraft.

In various embodiments, the airline fuel profiler 1 can also track potential operational variances from generally efficient operating practices of the aircraft. Referring now to FIGS. 25A and 25B, an example of a potential operational variance from efficient operating practices of the aircraft can include a landing gear deployment potential operational variance 196 (i.e., the landing gear are deployed earlier than necessary, thereby increasing airframe drag and engine thrust used to overcome the drag). The airline fuel profiler 1 can implement a process 704 to determine whether there is a landing gear deployment potential operational variance 196 and what the potential operational variance costs. In block 706, the airline fuel profiler 1 can determine the altitude and distance to the arrival airport. When the landing gear is deployed. In block 708, the airline fuel profiler 1 can determine whether the landing gear was deployed early. For example, efficient operating practices may call for the landing gear to be deployed no closer than 3 miles from the runway of the arrival airport. If the airline fuel profiler 1 determines that the landing gear was not deployed early, then there is no potential operational variance, as indicated in block 710. However, if the airline fuel profiler 1 determines that the landing gear was deployed early (e.g., the landing gear was deployed 4 miles from the runway of the arrival airport), then, in block 712, the airline fuel profiler 1 can calculate a fuel penalty of the landing gear deployment potential operational variance 196. In block 714, the airline fuel profiler 1 provides an indication of the potential operational variance to the pilots. Referring now to FIG. 25B, the airline fuel profiler 1 may calculate a fuel penalty of the potential operational variance (block 712 from the 25A) by following a process 716. In block 718, the airline fuel profiler 1 can determine a fuel burn rate for the aircraft with its landing gear step would. For example, the airline fuel profiler 1 may reference aircraft manufacturer data, such as a lookup table, to determine the fuel burn rate with the landing gear stowed. In block 720, the airline fuel profiler 1 can determine a fuel burn rates for the aircraft with its landing gear deployed. Again, the airline fuel profiler 1 may reference aircraft manufacturer data to determine the fuel burn rate with the landing gear deployed. In block 724, the airline fuel profiler 1 can calculate and elapsed time from when the landing gear was actually deployed to the time when the landing gear should have been deployed. Continuing the example above, if the landing gear was deployed 4 minutes from the arrival airport, but efficient operating practice calls for the landing gear due to be deployed 3 minutes from the arrival airport, then the elapsed time calculated in block 724 is one minute. In block 726, the airline fuel profiler 1 can calculate a fuel penalty of the landing gear deployment potential operational variance 196. The fuel penalty is equal to the elapsed time (calculated in block 724) multiplied by the difference between the fuel burn rate with the landing gear deployed (calculated in block 720) and the fuel burn rate with the landing gear stowed (calculated in block 718). In block 728, the airline fuel profiler 1 can output the calculated fuel penalty of the landing gear deployment potential operational variance 196 to the visualization module 18, and or to a computer screen in the cockpit of the aircraft.

As another example, referring now to FIGS. 26A and 26B, an example of a potential operational variance from efficient operating practices of the aircraft can include a flaps deployment potential operational variance 198 (i.e., the flaps are deployed earlier than necessary, thereby increasing airframe drag and engine thrust used to overcome the drag). The airline fuel profiler 1 can implement a process 730 to determine whether there is a flaps deployment potential operational variance 198 and what the potential operational variance costs. In block 732, the airline fuel profiler 1 can determine the altitude and distance to the arrival airport when the flaps are deployed. In block 734, the airline fuel profiler 1 can determine whether the flaps were deployed early. For example, efficient operating practices may call for the flaps to be deployed no closer than 3 miles from the runway of the arrival airport. If the airline fuel profiler 1 determines that the flaps were not deployed early, then there is no potential operational variance, as indicated in block 736. However, if the airline fuel profiler 1 determines that the flaps were deployed early (e.g., the flaps were deployed 4 miles from the runway of the arrival airport), then, in block 738, the airline fuel profiler 1 can calculate a fuel penalty of the flaps deployment potential operational variance 198. In block 740, the airline fuel profiler 1 provides an indication of the potential operational variance to the pilots. Referring now to FIG. 26B, the airline fuel profiler 1 can calculate a fuel penalty of the potential operational variance (block 738 from FIG. 26A) by following a process 742. In block 744, the airline fuel profiler 1 can determine a fuel burn rate for the aircraft with its flaps stowed. For example, the airline fuel profiler 1 may reference aircraft manufacturer data, such as a lookup table, to determine the fuel burn rate with the landing gear stowed. In block 746, the airline fuel profiler 1 can determine a fuel burn rates for the aircraft with its landing gear deployed. Again, the airline fuel profiler 1 may reference aircraft manufacturer data to determine the fuel burn rate with the landing gear deployed. Often, aircraft have multiple degrees of flaps deployment and each degree of flap deployment can result in a different fuel burn rate. For simplicity in this exemplary scenario, a single flaps deployment degree is being used. However, the processes 730 and 742 can be extended for use in multiple flaps deployment degrees circumstances. In block 748, the airline fuel profiler 1 can calculate an elapsed time from when the flaps were actually deployed to the time when the flaps should have been deployed. Continuing the example above, if the flaps were deployed four minutes from the arrival airport, but efficient operating practices call for the flaps be deployed three minutes from the arrival airport, then the elapsed time calculated in block 748 is one minute. In block 750, the airline fuel profiler 1 can calculate a fuel penalty of the flaps deployment potential operational variance 198. The fuel penalty is equal to the elapsed time (calculated in block 748) multiplied by the difference between the fuel burn rate with the flaps deployed (calculated in block 746) and the fuel burn rate with the flaps stowed (calculated in block 744). In block 752, the airline fuel profiler 1 can output the calculated fuel penalty of the flaps deployment potential operational variance 198 to the visualization module 18, and or to a computer screen in the cockpit of the aircraft.

Figures 27A, 27B:
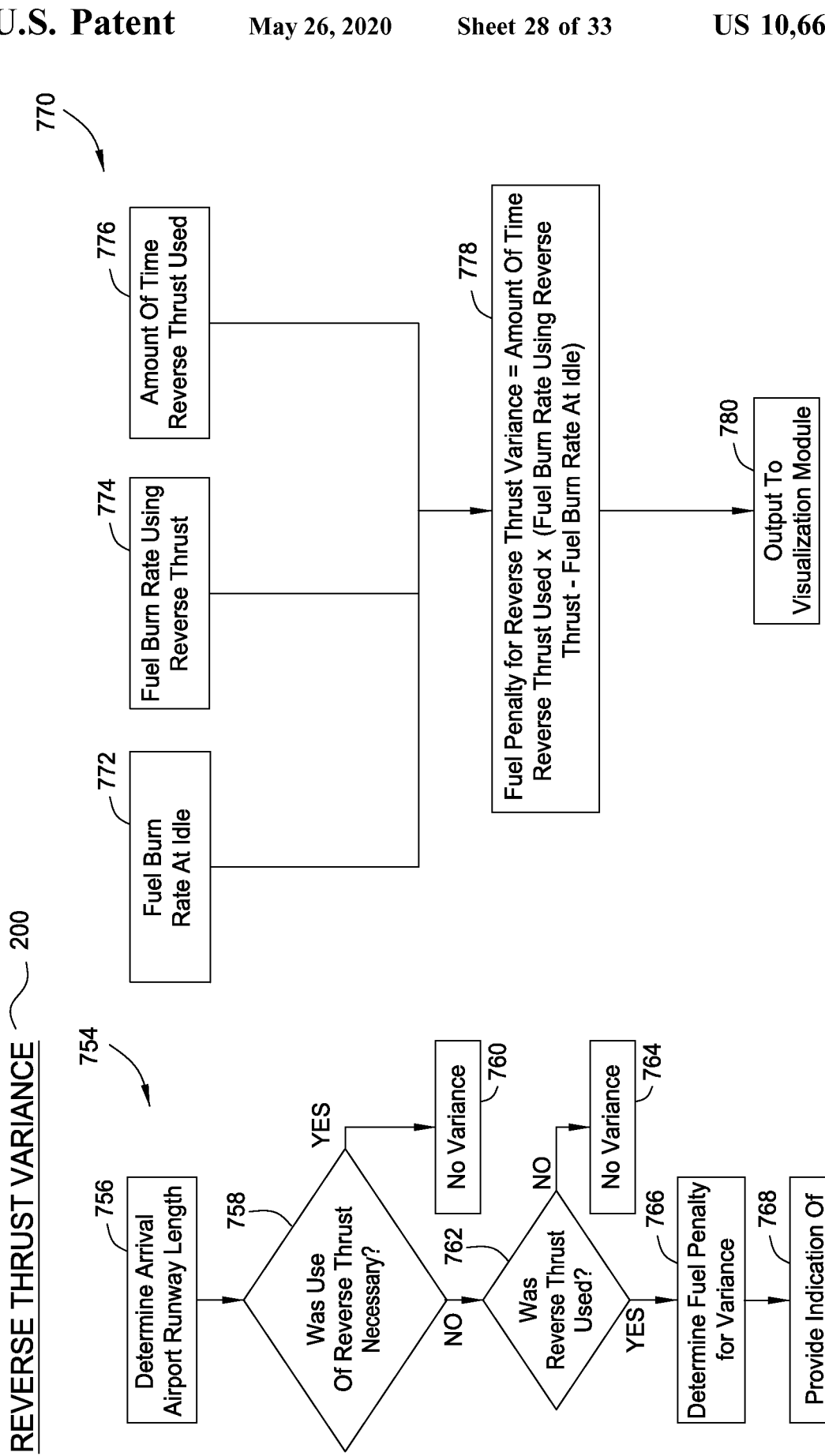
FIG. 27A illustrates an exemplary process that embodiments of an airline fuel profiler may use to determine whether operation of an aircraft includes a reverse thrust usage that varies from an optimal reverse thrust usage.
FIG. 27B illustrates an exemplary process that embodiments of an airline fuel profiler may use to determine a cost, in terms of trip fuel, for the reverse thrust usage potential operational variance.

As another example, referring now to FIGS. 27A and 27B, an example of a potential operational variance from efficient operating practices of the aircraft can include a thrust reverse usage potential operational variance 200 (i.e., the thrust reversers are used when they are not called for, such as when landing on a very long runway). The airline fuel profiler 1 can implement a process 754 to determine whether there is a thrust reverse usage potential operational variance 200 and what the potential operational variance costs. In block 756, the airline fuel profiler 1 can determine the length of the arrival airport runway. In block 758, the airline fuel profiler 1 can determine whether the reverse thrust was called for. For example, a small passenger aircraft may not use reverse thrust to slow down for a normal landing on runway with an 8,000 foot length. The same small aircraft may use reverse thrust to slow down on a runway with a 5,000 foot length. By contrast, a large passenger aircraft may use reverse thrust to slow down on almost any runway. If the airline fuel profiler 1 determines that the reverse thrust was called for, then there is no potential operational variance, as indicated in block 760. However, if the airline fuel profiler 1 determines that the reverse thrust was not necessary, then, in block 762, the airline fuel profiler 1 can determine whether reverse thrust was used. If reverse thrust was not used, then there was no potential operational variance, as indicated in block 764. However, if reverse thrust was used, then, in block 766, the airline fuel profiler 1 can calculate a fuel penalty of the thrust reverse usage potential operational variance 200. In block 740, the airline fuel profiler 1 can provide an indication of the potential operational variance to the pilots. Referring now to FIG. 27B, the airline fuel profiler 1 can calculate a fuel penalty of the thrust reverse usage potential operational variance 200 (block 766 from FIG. 27A) by following a process 770. In block 772, the airline fuel profiler 1 can determine a fuel burn rate for the engines at idle thrust. For example, the airline fuel profiler 1 may reference engine manufacturer data, such as a lookup table, to determine the fuel burn rate at idle. In block 774, the airline fuel profiler 1 can determine a fuel burn rate for the aircraft using reverse thrust. Again, the airline fuel profiler 1 may reference engine manufacturer data to determine the fuel burn rate using reverse thrust. Often, aircraft have multiple degrees of reverse thrust and each degree of reverse can result in a different fuel burn rate. For simplicity in this exemplary scenario, a single thrust reverse degree is being used. However, the processes 754 and 770 can be extended for use in multiple reverse thrust degrees circumstances. In block 778, the airline fuel profiler 1 can calculate an elapsed time during which reverse thrust is used. For example, reverse thrust may be used for twenty seconds. In block 778, the airline fuel profiler 1 can calculate a fuel penalty of the reverse thrust potential operational variance 200. The fuel penalty is equal to the elapsed time (calculated in block 776) multiplied by the difference between the fuel burn rate with using reverse thrust (calculated in block 774) and the fuel burn rate at idle (calculated in block 772). In block 780, the airline fuel profiler 1 can output the calculated fuel penalty of the reverse thrust potential operational variance 200 to the visualization module 18, and or to a computer screen in the cockpit of the aircraft.

Figures 28A, 28B:
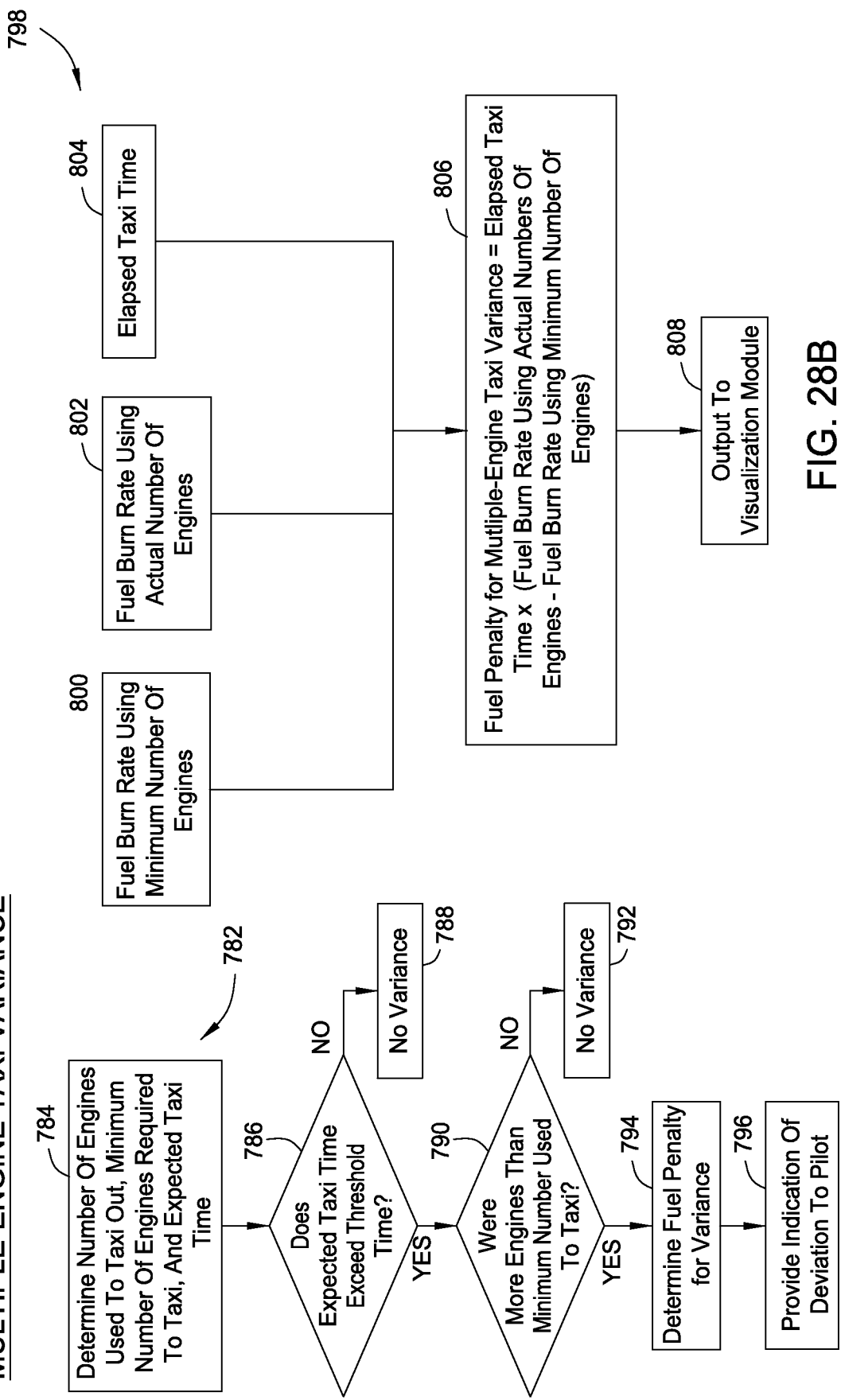
FIG. 28A illustrates an exemplary process that embodiments of an airline fuel profiler may use to determine whether operation of an aircraft includes a multi-engine taxi that varies from an optimal multi-engine taxi.
FIG. 28B illustrates an exemplary process that embodiments of an airline fuel profiler may use to determine a cost, in terms of trip fuel, for the multi-engine taxi potential operational variance.

As another example, referring now to FIGS. 28A and 28B, an example of a potential operational variance from efficient operating practices of the aircraft can include a multi-engine taxi potential operational variance 202 (i.e., using more than a minimum number of engines to taxi to and/or from the runway). The airline fuel profiler 1 can implement a process 782 to determine whether there is a multi-engine taxi potential operational variance 202 and what the potential operational variance costs. In block 784, the airline fuel profiler 1 can determine the minimum number of engines necessary to taxi, the number of engines used to taxi, and an expected taxi time. In block 786, the airline fuel profiler 1 can determine whether the taxi threshold time has been exceeded. Below the threshold time, best practice dictates that all engines be used to taxi to enable the engines to warm up to operating temperatures before applying take off thrust. If the expected taxi time does not exceed the threshold time (e.g., five minutes), then there is not multi-engine taxi potential operational variance 202, as indicated in block 788. However, if the airline fuel profiler 1 determines that the expected taxi time exceeds the taxi threshold time, then, in block 790, the airline fuel profiler 1 can determine whether more than the minimum number of engines were used to taxi. If the minimum number of engines necessary to taxi were used, then there was no multi-engine taxi potential operational variance 202, as indicated in block 792. However, if more than the minimum number of engines necessary to taxi were used, then in block 794, the airline fuel profiler 1 can calculate a fuel penalty of the multi-engine taxi potential operational variance 202. In block 796, the airline fuel profiler 1 can provide an indication of the potential operational variance to the pilots. Referring now to FIG. 28B, the airline fuel profiler 1 can calculate a fuel penalty of the multi-engine taxi potential operational variance 202 (block 794 from FIG. 28A) by following a process 798. In block 800, the airline fuel profiler 1 can determine a fuel burn rate using the minimum number of engines necessary for taxiing. The airline fuel profiler 1 may reference engine and/or aircraft manufacturer data to determine the fuel burn rate using reverse thrust. For example, a smaller twin engine aircraft may be able to taxi on a single engine. Thus, the single engine taxi fuel burn rate can be approximately half of that of a taxi fuel burn rate using both engines. As another example, some larger aircraft may have three or four engines. In various circumstances, the larger aircraft may be able to taxi on one engine, two engines, or three engines, resulting in taxi fuel burn rates of approximately one fourth, one half, and three-fourths, respectively, of taxiing using all four engines. In block 802, the airline fuel profiler 1 can determine a fuel burn rate for the aircraft taxiing using the actual number of engines used during taxi. Again, the airline fuel profiler 1 may reference engine and/or aircraft manufacturer data to determine the fuel burn rate using reverse thrust. In block 804, the airline fuel profiler 1 can calculate an elapsed taxi time. For example, taxi time from the gate to the runway may be fifteen minutes. In block 806, the airline fuel profiler 1 can calculate a fuel penalty of the multi-engine taxi potential operational variance 202. The fuel penalty is equal to the elapsed time (calculated in block 804) multiplied by the difference between the fuel burn rate taxiing using all engines (calculated in block 802) and the fuel burn rate taxiing using the minimum number of engines (calculated in block 800). In block 808, the airline fuel profiler 1 can output the calculated fuel penalty of the multi-engine taxi potential operational variance 202 to the visualization module 18, and or to a computer screen in the cockpit of the aircraft.

Figures 29A, 29B:
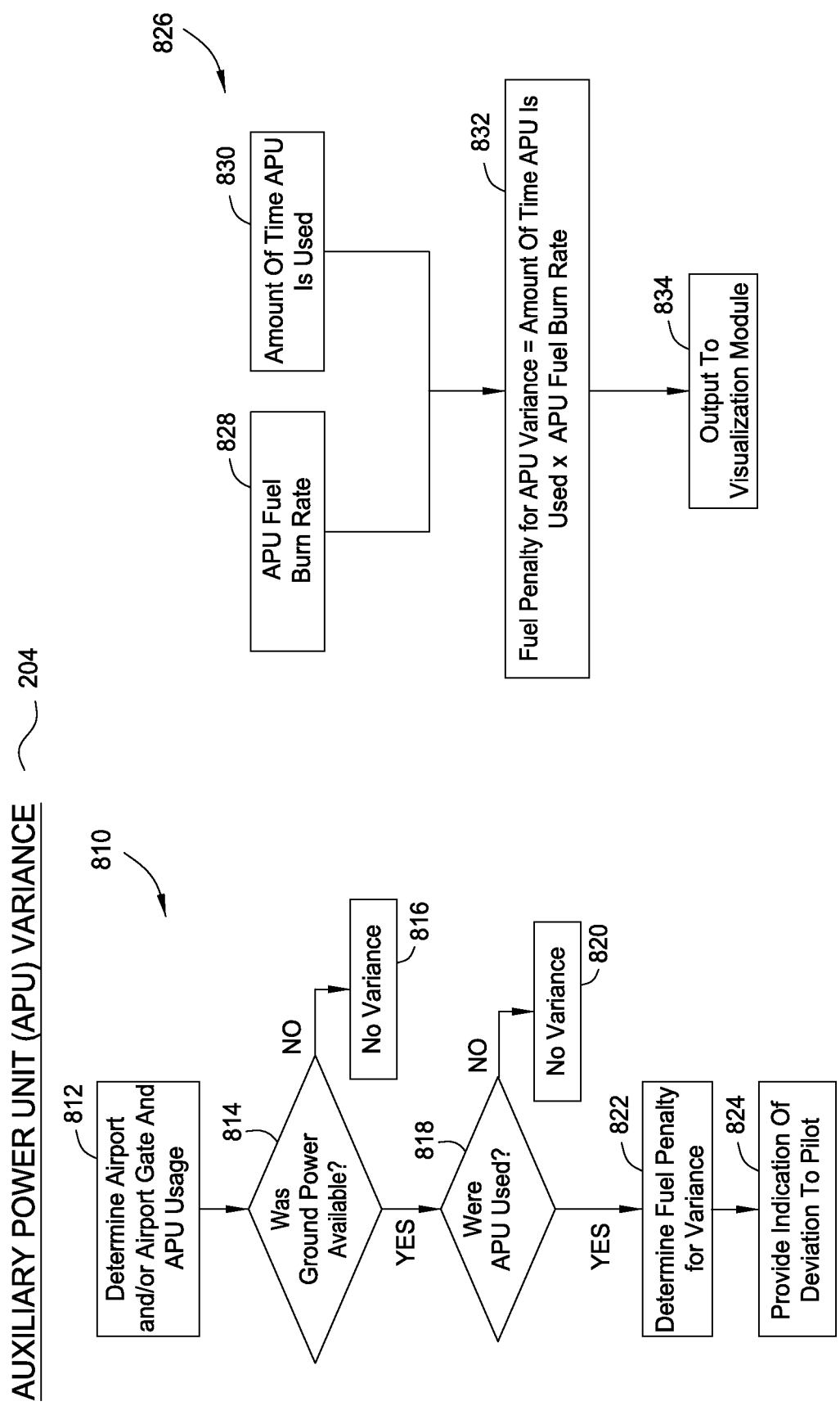
FIG. 29A illustrates an exemplary process that embodiments of an airline fuel profiler may use to determine whether operation of an aircraft includes an Auxiliary Power Unit (APU) usage that varies from an optimal APU usage.
FIG. 29B illustrates an exemplary process that embodiments of an airline fuel profiler may use to determine a cost, in terms of trip fuel, for the APU usage potential operational variance.

As another example, referring now to FIGS. 29A and 29B, an example of a potential operational variance from efficient operating practices of the aircraft can include an auxiliary power unit (APU) usage potential operational variance 204 (i.e., using the APU when ground power was available). The airline fuel profiler 1 can implement a process 810 to determine whether there is an APU usage potential operational variance 204 and what the potential operational variance costs. In block 812, the airline fuel profiler 1 can determine whether the APU was used and the airport location of the aircraft when the APU was used. In block 814, the airline fuel profiler 1 can determine whether ground power was available. For example, the airline fuel profiler 1 may use a lookup table that indicates ground power availability at different airports and/or at different gates at different airports. If ground power was not available, then there is no APU usage potential operational variance 204, as indicated in block 816. However, if ground power was available, then, in block 818, the airline fuel profiler 1 can determine whether the APU was used. If the APU was not used, there is no APU usage potential operational variance 204, as indicated in block 820. However, if the APU was used, then in block 822, the airline fuel profiler 1 can calculate a fuel penalty of the APU usage potential operational variance 204. In block 824, the airline fuel profiler 1 can provide an indication of the potential operational variance to the pilots. Referring now to FIG. 29B, the airline fuel profiler 1 can calculate a fuel penalty of the APU usage potential operational variance 204 (block 822 from FIG. 29A) by following a process 826. In block 828, the airline fuel profiler 1 can determine a fuel burn rate when the APU is being used. The airline fuel profiler 1 may reference APU and/or aircraft manufacturer data to determine the fuel burn rate using the APU. For the purposes of this example, it is assumed that the fuel burn rate of the APU is constant. However, the APU fuel burn rate can vary depending on the load on the APU. The process 826 can also be applied to APUs with varying fuel burn rates. In block 830, the airline fuel profiler 1 can calculate an elapsed time for APU usage. For example, the APU may be used for forty five minutes while an aircraft is at the gate. In block 832, the airline fuel profiler 1 can calculate a fuel penalty of APU usage potential operational variance 204. The fuel penalty is equal to the elapsed time (calculated in block 830) multiplied by the fuel burn rate when using the APU (calculated in block 828). In block 834, the airline fuel profiler 1 can output the calculated fuel penalty of the APU usage potential operational variance 204 to the visualization module 18, and or to a computer screen in the cockpit of the aircraft.

For the potential operational variances described above with reference to FIGS. 25-29, the airline fuel profiler 1 may attach to the achievable flight plan 10 indications of best operating practices. For example, at San Francisco International Airport, most aircraft land on Runway 28L, which is over 11,000 feet in length. If the weather forecast is CAVOK, an achievable flight plan 10 for a smaller twin engine aircraft flying to San Francisco International Airport may include a note and/or addendum to highlight to the pilots that reverse thrust may not be called for when landing. Similar notes and/or addenda can highlight to the pilots optimal operational practices for landing gear and flaps deployment, multi-engine taxi options, and/or APU usage at the gate(s).

Statistical Analysis for Updating Hidden Buffer Criteria

Figure 30:
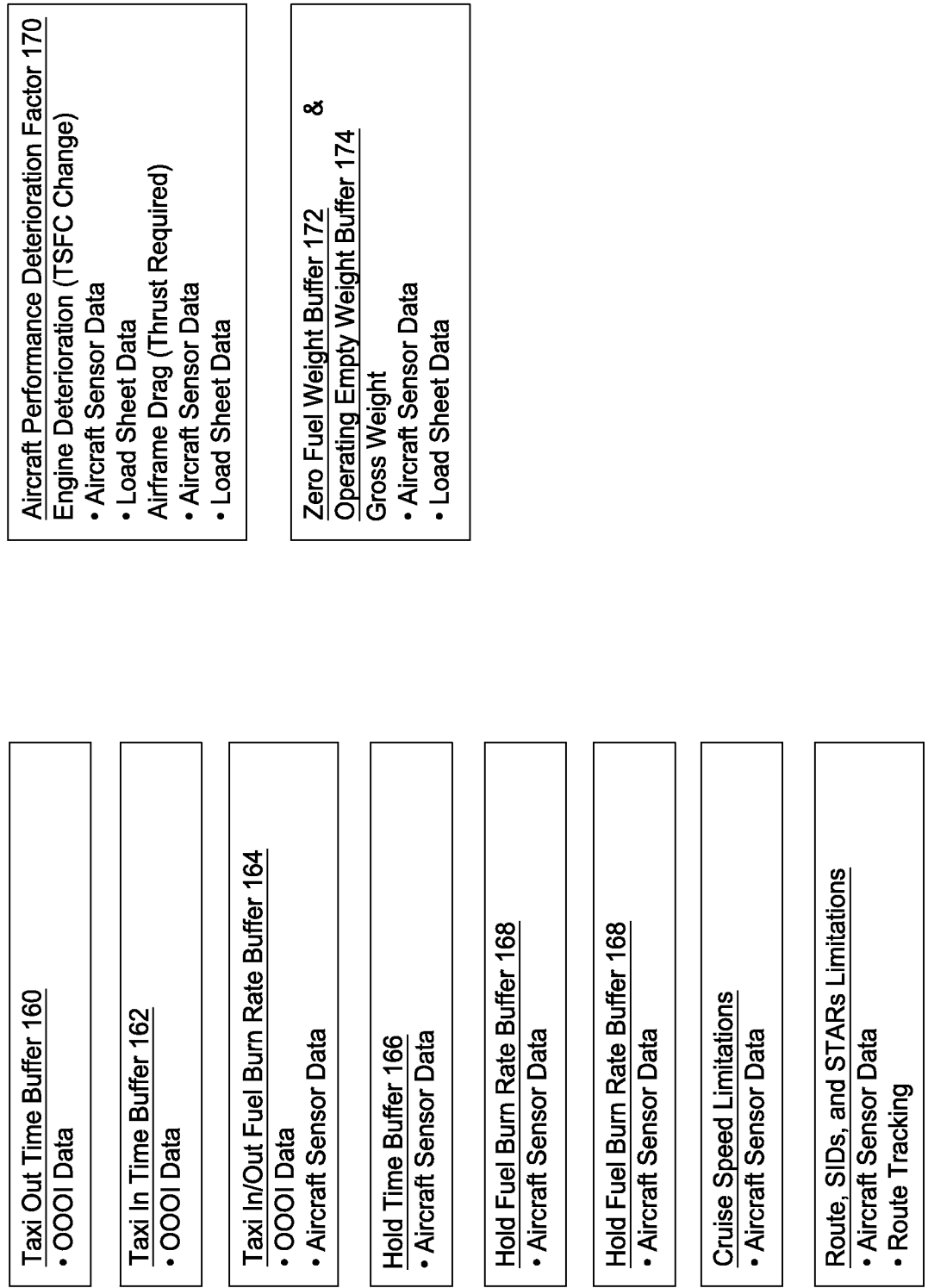
FIG. 30 illustrates exemplary data that can be used by embodiments of an airline fuel profiler to update criteria used to analyze buffers in flight plans and/or potential operational variances in operations.

Referring now to FIG. 30, as discussed above, data accumulated from multiple flights of an aircraft and/or multiple flights by aircraft from a particular departure airport to a particular destination airport can be analyzed to provide more accurate criteria for the buffers discussed in FIGS. 5 through 18. For example, the taxi out time buffer 160 and the taxi in time buffer 162 can be updated by analyzing OOOI data. For example, a taxi out time for O'Hare International Airport can be calculated by examining the elapsed time between the out of the gate event and the off the runway event from OOOI data for multiple flights. In this instance, the OOOI data for different aircraft can be combined. In various embodiments, the OOOI data can be analyzed in a more refined manner. For example, the OOOI data for flights departing from a particular gate at O'Hare International Airport and taxiing to a particular runway at O'Hare International Airport can be analyzed to determine a taxi out time for departing the particular gate. In such embodiments, the OOOI data may be segregated by aircraft type because certain gates may only be able to service certain types of aircraft. Similarly, the taxi in time buffer 162 for O'Hare International Airport can be calculated by examining the elapsed time between the on the ground event and the in the gate event from OOOI data for multiple flights. Again, the OOOI data for different aircraft can be combined. In various embodiments, the old OOOI data can be analyzed in a more refined manner. For example, the OOOI data for flights, landing on a particular runway at O'Hare international Airport and taxiing to a particular gate. At O'Hare international Airport can be analyzed to determine a taxi in time for arriving at the particular gate. In such embodiments, the OOOI data may be segregated by aircraft type because, again, certain gates may only be able to service certain types of aircraft. If the taxi out or taxi in times begin to change for some reason (e.g., a taxiway is closed, a new taxiway is opened, and/or traffic at an airport increases or decreases over time) analysis of the updated OOOI data can reveal such changes. As a result, the airline fuel profiler 1 can update the criteria for determining whether a flight plan includes a taxi out time buffer 160 or a taxi in time buffer 162.

The airline fuel profiler 1 can examine both the OOOI data as well as aircraft sensor data to analyze and update the criteria used to determine whether a flight plan includes a taxi in/out fuel burn rate buffer 164. Here, the airline fuel profiler 1 can use the OOOI data to determine when an aircraft begins to taxi and when the aircraft takes off. The airline fuel profiler 1 can look at the aircraft sensor data for the same period of time, and determine the total amount of fuel being used. Referring to FIG. 2B, fuel flow during taxi operations. 62 and 90 can vary as the pilots use engine thrust to control taxi speed. The airline fuel profiler 1 can calculate a fuel burn rate based on this data, such as an average fuel burn rate (e.g. dividing the total amount of fuel used during taxi operations by the amount of time spent for taxi operations). As a particular aircraft and the engines mounted to it wear, the calculated fuel burn rate based on the OOOI data and the aircraft sensor data will increase over time. The airline fuel profiler 1 can update the criteria for determining whether a flight plan includes a taxi in/out fuel burn rate buffer 164 based on these increases.

As another example, the airline fuel profiler 1 can examine the aircraft sensor data to analyze and update the criteria used to determine whether a flight plan includes a hold time buffer 166, and/or a hold fuel burn rate buffer 168. As discussed above, aircraft are typically put in a holding pattern at an altitude below cruising altitude and at an airspeed below cruising speed. In various embodiments, the airline fuel profiler 1 can analyze the aircraft sensor data to recognize periods of time in an actual aircraft flight where the aircraft remains at a relatively constant altitude and a constant airspeed that are below, the cruising altitude and cruising airspeed, respectively, of the flight. By measuring these times over multiple flights, the airline fuel profiler 1 can determine whether the criteria used for hold time buffer 166 can be updated. Similarly, by measuring fuel usage during the time period for holding, the airline fuel profiler 1 can calculate an average fuel burn rate for flying a holding pattern for a particular aircraft (e.g., total fuel used during holding divided by time elapsed for holding pattern). Again, the airline fuel profiler 1 can update the criteria for determining whether a flight plan includes a hold time buffer 166, and/or a hold fuel burn rate buffer 168 based on changes to the detective hold time and/or the calculated fuel burn rate.

Statistical Analysis to Identify any Real-World Limitations on Achieving an Optimal Flight Plan In various embodiments, the airline fuel profiler 1 can also examine aircraft sensor data and/or route tracking data to discover any real-world limitations on flight planning for a particular route. For example, as discussed above, aircraft may be directed to fly at altitudes other than optimal cruise altitudes by air traffic controllers. Similarly, aircraft may be directed to fly at airspeed's other than optimal cruise airspeed's by air traffic controllers (e.g. to maintain separation from other aircraft). By analyzing aircraft sensor data over multiple flights along a particular route, the airline fuel profiler 1 can identify trends that can indicate such real-world limitations. For example, an analysis of 100 flights from Atlanta, Ga. to New York City may reveal that 95 of the 100 flights did not exceed a cruise altitude of 24,000 feet. Similarly, the analysis may also reveal that 90 of the 100 flights did not exceed a cruise speed of Mach 0.72. The airline fuel profiler 1 may conclude that any flight plans from Atlanta to New York should plan for a cruise altitude of 24,000 feet and a cruise speed of Mach 0.72, even if different altitudes and airspeed's are more efficient. As a result, the airline fuel profiler 1 can provide an achievable flight plan 10 that incorporates these real-world limitations.

Another real-world limitation that can affect flight plans are routes, SIDs, and STARs that air traffic controllers tend to use. For example, air traffic controllers may prefer to use a first set of routes and STARs when aircraft are landing on a first runway and to use a second set of routes and STARs when aircraft are landing on a second runway. By analyzing the aircraft sensor data and route tracking data for multiple flights, the airline fuel profiler 1 may recognize these preferred routes, SIDs, and STARs. As a result, the airline fuel profiler 1 can prepare achievable flight plans 10 that use the preferred routes, even if other routes, SIDs, and/or STARs would be more fuel efficient.

As yet another example, predicted wind directions at the departure and arrival airports can have significant effects on routing (e.g., because airports typically use runways that are aligned into the wind). For example, suppose that an aircraft traveling generally eastward is landing at a destination airport where the winds are generally headed westward. In such a situation, the airport is likely to use a runway oriented to the east (into the wind) for takeoffs and landings. As a result, the aircraft may be directed almost straight in to land on the runway. By contrast, if the winds at the destination airport are generally headed eastward, then the airport is likely to use a runway oriented to the west (into the wind) for takeoffs and landings. As a result, the eastward traveling aircraft will have to fly around the destination airport before it can line up to land. In various circumstances, such routing around an airport can add significant travel distance (e.g., tens or hundreds of nautical miles) to the aircraft flight. Winds at a departure airport (and whether an aircraft can take off in the direction of its destination airport) can also significantly affect the travel distance for an aircraft flight. By analyzing the aircraft sensor data for multiple flights, route tracking data for multiple flights, and historical weather data for those flights, the airline fuel profiler 1 may recognize patterns in routings (and fuel loads for the routings) based on winds at departure and arrival airports. As a result, the airline fuel profiler 1 can prepare achievable flight plans 10 that accounts for a likely routing from the departure airport to the arrival airport based on the forecast winds at the respective airports.

Statistical Analysis to Identify Variances in Aircraft Weight, Aircraft Drag, and Engine Performance In various embodiments, the airline fuel profiler 1 can also analyze aircraft sensor data, and load sheet data to calculate aircraft wear factors 170 and weight factors 172 and 174 that can affect the flight plan and/or the fuel load for a particular aircraft. Referring to FIG. 31, the airline fuel profiler 1 can perform statistical analysis on steady-state cruise flight data to calculate a modeled estimate of true gross weight of the aircraft, a modeled estimate of Thrust Specific Fuel Consumption (TSFC) of the aircraft, and a modeled estimate of thrust used (i.e., total drag). The statistical analysis can also calculate an estimated dynamic center of gravity (CG) for the aircraft. Steady-state cruise as used herein means that the aircraft is flying at a nearly constant altitude and airspeed with no steering control inputs for at least 30 seconds. The statistical analysis performed can use one of or a combination of statistical modeling techniques (e.g., linear regression modeling, non-linear regression modeling, neural networks, support vector machines, and relevance vector analysis) to statistically calculate the gross weight, TSFC, and thrust of the aircraft from a collection of data points captured at steady-state cruise. For each of these three output variables (gross weight, TSFC, and thrust used), the airline fuel profiler 1 can form an equation or model based on data from the data points. For example, the aircraft sensor data for each data point can include various atmospheric parameters, such as altitude, Mach number, static, air temperature, static ambient pressure, density altitude, and density altitude normalization factor. The aircraft sensor data for each data point can also include various aircraft speed parameters, such as ground speed, calibrated airspeed, equivalent airspeed, true airspeed, total air temperature, and total ambient pressure. The aircraft sensor data for each data point can also include various engine operation parameters. For example, for a twin-engine aircraft, each data point can include parameters such as fuel flow for engine number 1, fuel flow for engine number 2, power setting, engine number 1, power setting for engine number 2, exhaust gas temperature (EGT) for engine number 1, and EGT for engine number 2. The aircraft sensor data for each data point can also include various aircraft attitude parameters, such as indicated angle of attack (AOA) and lift coefficient. Finally, data from the load sheets can also be incorporated into the data used in statistical analysis. For example, a nominal center of gravity, a nominal zero fuel weight, and a nominal gross weight from the load sheet can be incorporated into the data points used for statistical analysis. The perceived gross weight is a combination of the zero fuel weight from the load sheet plus the weight of fuel in the fuel tanks (from the load sheet). In various embodiments, the parameters can also include a perceived gross weight corrected for gravity gradient. Additionally, a fuel mileage calculation can be performed on the data from each data point and added to the parameters available for calculating the gross weight, TSFC, and thrust used. For example, a fuel mileage can be calculated for each data point by dividing the true airspeed of the aircraft (in nautical miles per hour) by the sum of the fuel flow for engine number 1 and the fuel flow for engine number 2. Through statistical analysis, these parameters can be used to calculate a gross weight for the aircraft, a thrust specific fuel consumption for the aircraft engines, a thrust used, and a center of gravity (CG).

With respect to gross weight, the airline fuel profiler 1 can monitor the statistically calculated gross weight over time. Ignoring fuel, two factors can cause variances in the gross weight calculation for the aircraft: actual increases in the weight of the aircraft and the average weight of a passenger with carry-on bags. As described above, aircraft tend to gain weight over time. For example, insulation in the aircraft can absorb moisture from condensation, which can add significant weight to an aircraft. Also, as described above, airlines do not weigh passengers and/or carry-on bags brought with passengers aboard an aircraft. Airlines therefore calculate an estimated weight for the passengers and/or their carry-on bags by assuming an average weight per passenger and multiplying the average by the number of passengers on the flight.

Each of these two factors, increasing aircraft weight and changing average passenger weight, can have a different impact on variances from the weights on the load sheet. For example, in the instance of the actual weight of the aircraft increasing, one would expect the variance to increase from zero for a brand-new aircraft as the insulation absorbs condensation and reach a maximum variance when the insulation becomes saturated with condensation. By contrast, in the instance of average passenger weight, the variance may be geographic-based, time-based, and/or seasonal-based. For example, during the Christmas holiday period, the average weight per passenger may increase as passengers attempted to carry Christmas presents and bulky clothing on board the flights. As another example, on flights to vacation spots such as the Caribbean, passengers may be wearing lighter clothing and checking more of their baggage, resulting in a lower average weight per passenger. Similarly, people may wear heavy coats on flights departing from and/or arriving at airports where the weather is cold, for example.

Figure 32:
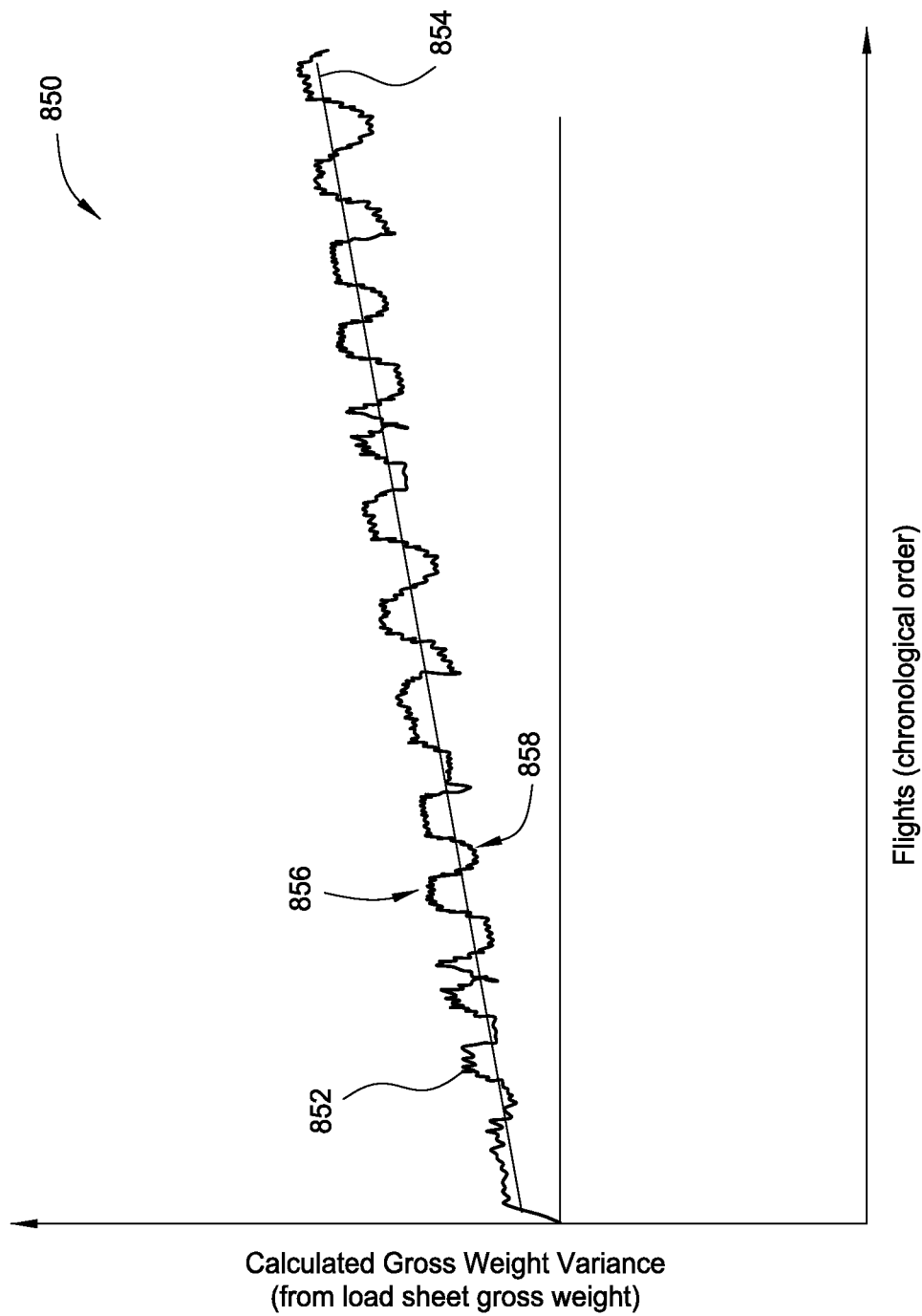
FIG. 32 illustrates an exemplary graph of calculated gross weight variance for a particular aircraft over a multiple number of flights.

FIG. 32 illustrates a graph 850 of gross weight variance data 852 from load sheet gross weight calculations for multiple flights of an aircraft. A trend line 854 can be fit to the variance data, illustrating a generally increasing trend in the weight variances. In various embodiments, the airline fuel profiler 1 can attribute the value of the trend line 854 at a particular time as an increase in the aircraft gross weight due to an increase in aircraft weight. The trend line is shown as being linear, but a non-linear trend line may fit in certain circumstances. The graph 850 also shows that the gross weight variance data 852 can have include a random component that fluctuates up and down. For example, reference number 856 points to a high fluctuation in the gross weight variance data 852 and reference number 858 points to a low fluctuation in the gross weight variance data 852. The fluctuations from the trend line 854 can be attributed to errors in the average passenger weight used to calculate total passenger weight on the load sheet. Through further analysis of the data, the airline fuel profiler 1 may be able to develop correlations between the fluctuations and predictable events.

For example, the high fluctuation 856 may correspond to winter months, when passengers generally wear heavier clothing, carry coats with them, and may be traveling with presents. As another example, the low fluctuation 858 may correspond to summer months, when passengers may be traveling in lighter clothing and check more baggage. For subsequent flights, the airline fuel profiler 1 can use identified correlations between events and average passenger weight fluctuations to calculate the total passenger weight for a load sheet. For example, for a flight on December 23, the airline fuel profiler 1 can use an average passenger weight consistent with the average passenger weight calculated for the high fluctuation 856. Similarly, for a flight on July 15, the airline fuel profiler 1 can use an average passenger weight consistent with the average passenger weight calculated for the low fluctuation 858. Fluctuations and variances may also reflect specific city pair and/or route influences. If these influences can be identified, then flight planning loads can be adjusted and optimized accordingly.

In various embodiments, the equation or model used to calculate in real time a true gross weight of an aircraft in flight. In various embodiments, the equation or model can be provided to a computer onboard the aircraft. The computer onboard the aircraft can include a personal tablet computer (e.g., an iPad®), a personal laptop computer, an electronic flight bag, and/or a Flight Management System (FMS). In various embodiments, the equation or model can be provided to a computer on the ground. During a flight (e.g., shortly after establishing a straight and level cruise), an aircraft sensor data point can be input into the equation or model to calculate the calculated true gross weight of the aircraft. In embodiments in which the computer is onboard the aircraft, the aircraft sensor data can be transmitted to the computer over an onboard data system (e.g., WiFi or an ARINC data connection). In embodiments in which the computer is ground based, the aircraft sensor data can be transmitted to the computer over an air-to-ground data link (e.g., ACARS). The ground computer can return the calculated true gross weight to the aircraft. If this calculated true gross weight differs from the true gross weight from the load sheet, then the flight plan in the FMS can be updated to reflect the calculated true gross weight. For example, if the equation or model is operating on a personal tablet computer, then the calculated true gross weight can be output to a display screen of the tablet computer. The pilot can then update the gross weight in the FMS manually. As another example, if the equation or model is operating on the FMS or on another computer that is linked to the FMS, then the calculated true gross weight from the model or equation can be automatically updated in the FMS. The FMS can modify aspects of the flight plan based on the received calculated true gross weight. For example, the cruise altitude, cruise speed, top of climb, and top of descent points in the flight plan may change if the gross weight changes.

Statistical Analysis to Determine when to Remove and/or Repair an Aircraft and/or Engine With respect to the aircraft performance wear factors, TSFC and aircraft drag, the airline fuel profiler 1 can statistically calculate a fuel penalty of any performance wear in terms of fuel mileage (nautical miles per hour divided by fuel flow per hour). Furthermore, by attributing a portion of wear to each TSFC and aircraft drag, the airline fuel profiler 1 can provide a metric that can be used to decide whether to remove an aircraft and/or engine(s) from service for repair. For example, engine overhaul costs for a given operator are generally well-known. The airline fuel profiler 1 can monitor engine degradation for an aircraft, and when the net present value of extra fuel usage on flights due to engine wear exceeds a predetermined value (e.g., the generally well-known cost for an engine overhaul), the airline fuel profiler 1 can flag the engine(s) for overhaul. Similarly, trimming and re-rigging of airframe control surfaces may cost $1 Million. The airline fuel profiler 1 can monitor aircraft degradation (drag) for an aircraft, and when the net present value of extra fuel usage on flights due to aircraft drag exceeds $1 Million. The fuel profiler 1 can flag the aircraft for trim and rigging maintenance.

By performing the above described statistical analysis, the airline fuel profiler 1 can provide more accurate criteria for flight planning. As a result, flight crews and dispatchers can have a higher degree of confidence in the fuel loads calculated by such flight plans.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., cumulative aircraft sensor data and/or the airline fuel profiler 1 application or related data available in the cloud. For example, the airline fuel profiler 1 could execute on a computing system in the cloud and analyze operator's aircraft sensor data for statistical analysis and prepare optimized, achievable operator's flight plans. In such a case, the airline fuel profiler 1 could receive aircraft sensor data and operator flight plans and store analyzed aircraft sensor data and optimized, achievable flight plans at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to increase accuracy of estimating fuel for an aircraft, the computer-implemented method comprising:

performing a statistical analysis on data for multiple past instances of flights between a departure airport and an arrival airport for multiple aircraft in order to determine one or more predicted real-world limitations more stringent than what is imposed by a set of regulations and that are likely to be imposed, by one or more specified air traffic controllers, on an operator flight plan between the departure airport and the arrival airport;

generating a calibration flight plan based on the operator flight plan and the one or more predicted real-world limitations, wherein the calibration flight plan includes an airborne operating parameter that conforms to the set of regulations and further conforms to the one or more predicted real-world limitations, wherein the generated calibration flight plan is output; and calculating, based on the calibration flight plan and by operation of one or more computer processors, a first fuel load for the aircraft travelling from the departure airport to the arrival airport, wherein the calibration flight plan being generated based on the one or more predicted real-world limitations causes the first fuel load to be calculated with an increased measure of accuracy relative to the calibration flight plan being generated in an absence of the one or more predicted real-world limitations;

wherein the aircraft is filled with a specified amount of fuel based at least in part on the first fuel load calculated based on the calibration flight plan.

2. The computer-implemented method of claim 1, further comprising:

comparing aspects of the operator flight plan to predicted realistic flight plan criteria, wherein the predicted realistic flight plan criteria relate to aspects of the operator flight plan, and wherein the predicted realistic flight plan criteria comprises at least one of:

a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold time criterion, wherein the hold time criterion comprises at least one hold time threshold, and wherein the flight plan deviates from the hold time criterion when a hold time in the flight plan exceeds the at least one hold time threshold;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate;

an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear;

a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and upon determining that the operator flight plan deviates from at least one of the predicted realistic flight plan criteria, amending aspects of the operator flight plan to minimize the deviations.

3. The computer-implemented method of claim 2, wherein the optimal route comprises an optimal cruise altitude, and wherein, upon determining from the statistical analysis that flights from the departure airport to the destination airport cruise at a different altitude than the optimal cruise altitude, replacing the optimal cruise altitude in the optimal route with the different altitude.

4. The computer-implemented method of claim 2, wherein, upon determining from the statistical analysis that flights from the departure airport to the destination airport use a different SIDs than the optimal SIDs, replacing the optimal SIDs in the SIDs criterion with the different SIDs.

5. The computer-implemented method of claim 2, wherein, upon determining from the statistical analysis from the statistical analysis that flights from the departure airport to the destination airport use a different STARs than the optimal STARs, replacing the optimal STARs in the STARs criterion with the different STARs.

6. The computer-implemented method of claim 2, further comprising:
calculating a fuel penalty for the deviations; and
outputting an indication of the fuel penalty for the deviations.

7. The computer-implemented method of claim 1, further comprising:
providing the calibration flight plan to the aircraft; and
during flight:
determining at least one operational variance of the aircraft from the calibration flight plan; and
communicating the operational variance of the aircraft.

8. The computer-implemented method of claim 7, wherein, during flight, further communicating a fuel penalty caused by the operational variance.

9. A system to increase accuracy of estimating fuel for an aircraft, the system comprising:
one or more computer processors; and
a memory configured to store:
data for multiple past instances of flights between a departure airport and an arrival airport;
an operator flight plan; and
computer program code that, when executed by operation of the one or more computer processors, performs an operation comprising:
performing a statistical analysis on the data for multiple past instances of flights between the departure airport and the arrival airport for multiple aircraft in order to determine one or more predicted real-world limitations more stringent than what is imposed by a set of regulations and that are likely to be imposed, by one or more specified air traffic controllers, on an operator flight plan between the departure airport and the arrival airport;
generating a calibration flight plan based on the operator flight plan and the one or more predicted real-world limitations, wherein the calibration flight plan includes an airborne operating parameter that conforms to the set of regulations and that further conforms to the one or more predicted real-world limitations, wherein the generated calibration flight plan is output; and
calculating, based on the calibration flight plan, a first fuel load for the aircraft travelling from the departure airport to the arrival airport, wherein the calibration flight plan being generated based on the one or more predicted real-world limitations causes the first fuel load to be calculated with an increased measure of accuracy relative to the calibration flight plan being generated in an absence of the one or more predicted real-world limitations;

wherein the aircraft is filled with a specified amount of fuel based at least in part on the first fuel load calculated based on the calibration flight plan.

10. The system of claim 9, wherein the operation further comprises:

comparing aspects of the operator flight plan to predicted realistic flight plan criteria, wherein the predicted realistic flight plan criteria relate to aspects of the operator flight plan, and wherein the predicted realistic flight plan criteria comprises at least one of:

a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold time criterion, wherein the hold time criterion comprises at least one hold time threshold, and wherein the flight plan deviates from the hold time criterion when a hold time in the flight plan exceeds the at least one hold time threshold;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate;

an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear;

a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and upon determining that the operator flight plan deviates from at least one of the predicted realistic flight plan criteria, amending aspects of the operator flight plan to minimize the deviations.

11. The system of claim 10, wherein the operation further comprises:

calculating a fuel penalty for the deviations; and outputting an indication of the fuel penalty for the deviations.

12. A computer program product to increase accuracy of estimating fuel for an aircraft, the computer program product comprising:

a non-transitory computer-readable medium having computer-readable program code embodied therewith, the computer-readable program code comprising:

computer-readable program code configured to perform a statistical analysis on data for multiple past instances of flights between a departure airport and an arrival airport for multiple aircraft in order to determine one or more predicted real-world limitations more stringent than what is imposed by a set of regulations and that are likely to be imposed, by one or more specified air traffic controllers, on an operator flight plan between the departure airport and the arrival airport;

computer-readable program code configured to generate a calibration flight plan based on the operator flight plan and the one or more predicted real-world limitations, wherein the calibration flight plan includes an airborne operating parameter that conforms to the set of regulations and further conforms to the one or more predicted real-world limitations, wherein the generated calibration flight plan is output; and computer-readable program code configured to calculate, based on the calibration flight plan and by operation of one or more computer processors when executing the computer-readable program code, a first fuel load for the aircraft travelling from the departure airport to the arrival airport, wherein the calibration flight plan being generated based on the one or more predicted real-world limitations causes the first fuel load to be calculated with an increased measure of accuracy relative to the calibration flight plan being generated in an absence of the one or more predicted real-world limitations;

wherein the aircraft is filled with a specified amount of fuel based at least in part on the first fuel load calculated based on the calibration flight plan.

13. The computer program product of claim 12, the computer-readable program code further comprising:
computer-readable program code configured to compare aspects of the operator flight plan to predicted realistic flight plan criteria, wherein the predicted realistic flight plan criteria relate to aspects of the operator flight plan, and wherein the predicted realistic flight plan criteria comprises at least one of:
a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;
an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;
a taxi out time criterion, wherein the taxi out time criterion comprises at least one taxi out threshold time, and wherein the flight plan deviates from the taxi out time criterion when a taxi out time in the flight plan exceeds the taxi out threshold time;
a taxi in time criterion, wherein the taxi in time criterion comprises at least one taxi in threshold time, and wherein the flight plan deviates from the taxi in time criterion when a taxi in time in the flight plan exceeds the taxi in threshold time;
a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;
a hold time criterion, wherein the hold time criterion comprises at least one hold time threshold, and wherein the flight plan deviates from the hold time criterion when a hold time in the flight plan exceeds the at least one hold time threshold;
a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate;
an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear; and
a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created;
a route criterion, wherein the route criterion comprises an optimal route for the flight plan, and wherein the flight plan deviates from the route criterion when a route in the flight plan does not match the optimal route;
a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs;
a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and
computer-readable program code configured to, upon determining that the operator flight plan deviates from at least one of the predicted realistic flight plan criteria, amend aspects of the operator flight plan to minimize the deviations.

14. The computer program product of claim 13, wherein the computer-readable program code further comprises:
computer-readable program code configured to perform statistical analysis of at least one of airline sensor data and Out Off On In (OOOI) data for at least one of multiple flights for a particular aircraft and multiple flights between the departure airport and the arrival airport; and
computer-readable program code configured to update at least one of the criteria based on results from the statistical analysis.

15. The computer program product of claim 13, wherein the computer-readable program code further comprises:
computer-readable program code configured to calculate a fuel penalty for the deviations; and
computer-readable program code configured to output an indication of the fuel penalty for the deviations.

16. The computer program product of claim 13, further comprising a second computer-readable storage medium having second computer-readable code embodied therewith, the second computer-readable code comprising:
computer-readable program code configured to determine at least one operational variance of the aircraft from the amended flight plan; and
computer-readable program code configured to communicate the determined operational variance of the aircraft.

17. The computer program product of claim 16, wherein the second computer-readable code further comprises:
computer-readable program code configured to calculate a fuel penalty for the operational variance; and
computer-readable program code configured to communicate the calculated fuel penalty of the aircraft.

18. The computer-implemented method of claim 1, further comprising:
outputting the calculated fuel load.

19. The computer-implemented method of claim 18, wherein the aircraft is filled with an amount of fuel equal to the calculated fuel load.

20. The computer-implemented method of claim 1, further comprising:
comparing aspects of the operator flight plan to predicted realistic flight plan criteria, wherein the predicted realistic flight plan criteria relate to aspects of the operator flight plan, and wherein the predicted realistic flight plan criteria comprises:
a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold time criterion, wherein the hold time criterion comprises at least one hold time threshold, and wherein the flight plan deviates from the hold time criterion when a hold time in the flight plan exceeds the at least one hold time threshold;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate;

an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear;

a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and upon determining that the operator flight plan deviates from at least one of the predicted realistic flight plan criteria, amending aspects of the operator flight plan to minimize the deviations.

21. The computer-implemented method of claim 1, further comprising:

comparing aspects of the operator flight plan to predicted realistic flight plan criteria, wherein the predicted realistic flight plan criteria relate to aspects of the operator flight plan, and wherein the predicted realistic flight plan criteria comprises:

a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate; and an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear; and upon determining that the operator flight plan deviates from at least one of the predicted realistic flight plan criteria, amending aspects of the operator flight plan to minimize the deviations.

22. The computer-implemented method of claim 1, further comprising:

comparing aspects of the operator flight plan to predicted realistic flight plan criteria, wherein the predicted realistic flight plan criteria relate to aspects of the operator flight plan, and wherein the predicted realistic flight plan criteria comprises:

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a hold time criterion, wherein the hold time criterion comprises at least one hold time threshold, and wherein the flight plan deviates from the hold time criterion when a hold time in the flight plan exceeds the at least one hold time threshold;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and upon determining that the operator flight plan deviates from at least one of the predicted realistic flight plan criteria, amending aspects of the operator flight plan to minimize the deviations.

23. The system of claim 9, wherein the operation further comprises calculating a fuel load for the calibration flight plan; and outputting the calculated fuel load.

24. The system of claim 9, the operation further comprising:

comparing aspects of the operator flight plan to predicted realistic flight plan criteria, wherein the predicted realistic flight plan criteria relate to aspects of the operator flight plan, and wherein the predicted realistic flight plan criteria comprises:

a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold time criterion, wherein the hold time criterion comprises at least one hold time threshold, and wherein the flight plan deviates from the hold time criterion when a hold time in the flight plan exceeds the at least one hold time threshold;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate;

an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear;

a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and upon determining that the operator flight plan deviates from at least one of the predicted realistic flight plan criteria, amending aspects of the operator flight plan to minimize the deviations.

25. The system of claim 9, the operation further comprising:

comparing aspects of the operator flight plan to predicted realistic flight plan criteria, wherein the predicted realistic flight plan criteria relate to aspects of the operator flight plan, and wherein the predicted realistic flight plan criteria comprises:

a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate; and an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear; and upon determining that the operator flight plan deviates from at least one of the predicted realistic flight plan criteria, amending aspects of the operator flight plan to minimize the deviations.

26. The system of claim 9, the operation further comprising:

comparing aspects of the operator flight plan to predicted realistic flight plan criteria, wherein the predicted realistic flight plan criteria relate to aspects of the operator flight plan, and wherein the predicted realistic flight plan criteria comprises:

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a hold time criterion, wherein the hold time criterion comprises at least one hold time threshold, and wherein the flight plan deviates from the hold time criterion when a hold time in the flight plan exceeds the at least one hold time threshold;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and upon determining that the operator flight plan deviates from at least one of the predicted realistic flight plan criteria, amending aspects of the operator flight plan to minimize the deviations.

27. The computer program product of claim 12, wherein the computer program code further comprises computer-readable program code configured to:

calculate a fuel load for the calibration flight plan; and outputting the calculated fuel load.

28. The computer program product of claim 12, wherein the computer-readable program code further comprises:

computer-readable program code configured to compare aspects of the operator flight plan to predicted realistic flight plan criteria, wherein the predicted realistic flight plan criteria relate to aspects of the operator flight plan, and wherein the predicted realistic flight plan criteria comprises at least one of:

a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;

an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;

a taxi out time criterion, wherein the taxi out time criterion comprises at least one taxi out threshold time, and wherein the flight plan deviates from the taxi out time criterion when a taxi out time in the flight plan exceeds the taxi out threshold time;

a taxi in time criterion, wherein the taxi in time criterion comprises at least one taxi in threshold time, and wherein the flight plan deviates from the taxi in time criterion when a taxi in time in the flight plan exceeds the taxi in threshold time;

a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;

a hold time criterion, wherein the hold time criterion comprises at least one hold time threshold, and wherein the flight plan deviates from the hold time criterion when a hold time in the flight plan exceeds the at least one hold time threshold;

a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate;

an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear;

a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created;

a route criterion, wherein the route criterion comprises an optimal route for the flight plan, and wherein the flight plan deviates from the route criterion when a route in the flight plan does not match the optimal route;

a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and computer-readable program code configured to, upon determining that the operator flight plan deviates from at least one of the predicted realistic flight plan criteria, amend aspects of the operator flight plan to minimize the deviations.

29. The computer program product of claim 12, the computer-readable program code further comprising:

computer-readable program code configured to compare aspects of the operator flight plan to predicted realistic flight plan criteria, wherein the predicted realistic flight plan criteria relate to aspects of the operator flight plan, and wherein the predicted realistic flight plan criteria comprises at least one of:
- a zero fuel weight criterion, wherein the zero fuel weight criterion comprises a zero fuel weight from a load sheet for the flight, and wherein the flight plan deviates from zero fuel weight criterion when a zero fuel weight in the flight plan is different from the zero fuel weight from the load sheet;
- an operating empty weight criterion, wherein the operating empty weight criterion comprises an operating empty weight from the load sheet, and wherein the flight plan deviates from the operating empty weight criterion when an operating empty weight in the flight plan is different from the operating empty weight from the load sheet;
- a taxi in/out fuel burn rate criterion, wherein the taxi in/out fuel burn rate criterion comprises at least one taxi fuel burn rate, and wherein the flight plan deviates from the taxi in/out criterion when a taxi in/out fuel burn rate in the flight plan exceeds the at least one taxi fuel burn rate;
- a hold fuel burn rate criterion, wherein the hold fuel burn rate criterion comprises at least one hold fuel burn rate, and wherein the flight plan deviates from the hold fuel burn rate criterion when a hold fuel burn rate in the flight plan exceeds the at least one hold fuel burn rate; and
- an aircraft performance wear criterion, wherein the performance wear criterion comprises an aircraft performance wear, and wherein the flight plan deviates from the aircraft performance wear criterion when an aircraft performance wear in the flight plan does not match the aircraft performance wear; and computer-readable program code configured to, upon determining that the operator flight plan deviates from at least one of the predicted realistic flight plan criteria, amend aspects of the operator flight plan to minimize the deviations.

30. The computer program product of claim 12, the computer-readable program code further comprising:

computer-readable program code configured to compare aspects of the operator flight plan to predicted realistic flight plan criteria, wherein the predicted realistic flight plan criteria relate to aspects of the operator flight plan, and wherein the predicted realistic flight plan criteria comprises at least one of:
- a taxi out time criterion, wherein the taxi out time criterion comprises at least one taxi out threshold time, and wherein the flight plan deviates from the taxi out time criterion when a taxi out time in the flight plan exceeds the taxi out threshold time;
- a taxi in time criterion, wherein the taxi in time criterion comprises at least one taxi in threshold time, and wherein the flight plan deviates from the taxi in time criterion when a taxi in time in the flight plan exceeds the taxi in threshold time;
- a hold time criterion, wherein the hold time criterion comprises at least one hold time threshold, and wherein the flight plan deviates from the hold time criterion when a hold time in the flight plan exceeds the at least one hold time threshold;
- a route criterion, wherein the route criterion comprises an optimal route for the flight plan, and wherein the flight plan deviates from the route criterion when a route in the flight plan does not match the optimal route;
- a Standard Instrument Departure (SIDs) criterion, wherein the SIDs criterion comprises an optimal SIDs for the flight plan, and wherein the flight plan deviates from the SIDs criterion when the SIDs in the flight plan does not match the optimal SIDs; and
- a Standard Terminal Arrival Route (STARs) criterion, wherein the STARs criterion comprises an optimal STARs for the flight plan, and wherein the flight plan deviates from the STARs criterion when the STARs in the flight plan does not match the optimal STARs; and computer-readable program code configured to, upon determining that the operator flight plan deviates from at least one of the predicted realistic flight plan criteria, amend aspects of the operator flight plan to minimize the deviations.

31. The computer-implemented method of claim 1, wherein the calibration flight plan is generated based further on altitudes of the departure and arrival airports, wherein the calibration flight plan being generated based further on the altitudes of the departure and arrival airports causes the first fuel load to be calculated with an increased measure of accuracy relative to the calibration flight plan being generated in an absence of the altitudes of the departure and arrival airports;

wherein after being filled with the specified amount of fuel, the aircraft travels from the departure airport to the arrival airport based on the airborne operating parameter and using at least part of the specified amount of fuel.

32. The computer-implemented method of claim 31, wherein the calculated first fuel load is output, wherein the specified amount of fuel is equal to the calculated first fuel load, wherein the computer-implemented method further comprises comparing aspects of the operator flight plan to predicted realistic flight plan criteria, wherein the predicted realistic flight plan criteria relate to aspects of the operator flight plan, wherein the predicted realistic flight plan criteria comprise:

a zero fuel weight criterion, wherein the zero fuel weight criterion comprises a zero fuel weight from a load sheet for the flight, wherein the flight plan deviates from zero fuel weight criterion when a zero fuel weight in the flight plan is different from the zero fuel weight from the load sheet; and an operating empty weight criterion, wherein the operating empty weight criterion comprises an operating empty weight from the load sheet, wherein the flight plan deviates from the operating empty weight criterion when an operating empty weight in the flight plan is different from the operating empty weight from the load sheet.

33. The computer-implemented method of claim 32, wherein the predicted realistic flight plan criteria further comprise:
   a taxi out time criterion, wherein the taxi out time criterion comprises at least one taxi out threshold time, wherein the flight plan deviates from the taxi out time criterion when a taxi out time in the flight plan exceeds the taxi out threshold time;
   a taxi in time criterion, wherein the taxi in time criterion comprises at least one taxi in threshold time, wherein the flight plan deviates from the taxi in time criterion when a taxi in time in the flight plan exceeds the taxi in threshold time; and
   a taxi in/out fuel burn rate criterion, wherein the taxi in/out fuel burn rate criterion comprises at least one taxi fuel burn rate, wherein the flight plan deviates from the taxi in/out criterion when a taxi in/out fuel burn rate in the flight plan exceeds the at least one taxi fuel burn rate.

34. The computer-implemented method of claim 33, wherein the predicted realistic flight plan criteria further comprise:
   a hold time criterion, wherein the hold time criterion comprises at least one hold time threshold, wherein the flight plan deviates from the hold time criterion when a hold time in the flight plan exceeds the at least one hold time threshold;
   a hold fuel burn rate criterion, wherein the hold fuel burn rate criterion comprises at least one hold fuel burn rate, wherein the flight plan deviates from the hold fuel burn rate criterion when a hold fuel burn rate in the flight plan exceeds the at least one hold fuel burn rate;
   an aircraft performance wear criterion, wherein the performance wear criterion comprises an aircraft performance wear, wherein the flight plan deviates from the aircraft performance wear criterion when an aircraft performance wear in the flight plan does not match the aircraft performance wear; and
   a weather criterion, wherein the weather criterion comprises weather forecast at a time that a load sheet for the flight plan is created, wherein the flight plan deviates from the weather criterion when weather information in the flight plan does not match the weather forecast at the time that the load sheet is created.

35. The computer-implemented method of claim 34, wherein the predicted realistic flight plan criteria further comprise:
   a route criterion, wherein the route criterion comprises an optimal route for the flight plan, wherein the flight plan deviates from the route criterion when a route in the flight plan does not match the optimal route;
   a Standard Instrument Departure (SIDs) criterion, wherein the SIDs criterion comprises an optimal SIDs for the flight plan, wherein the flight plan deviates from the SIDs criterion when the SIDs in the flight plan does not match the optimal SIDs; and
   a Standard Terminal Arrival Route (STARs) criterion, wherein the STARs criterion comprises an optimal STARs for the flight plan, wherein the flight plan deviates from the STARs criterion when the STARs in the flight plan does not match the optimal STARs;
   wherein the computer-implemented method further comprises, upon determining that the operator flight plan deviates from at least one of the predicted realistic flight plan criteria, amending aspects of the operator flight plan to minimize the deviations.

36. The computer-implemented method of claim 35, wherein the optimal route comprises an optimal cruise altitude, wherein the airborne operating parameter comprises the optimal cruise altitude, wherein the computer-implemented method further comprises:
   upon determining from the statistical analysis that flights from the departure airport to the arrival airport cruise at a different altitude than the optimal cruise altitude, replacing the optimal cruise altitude in the optimal route with the different altitude;
   upon determining from the statistical analysis that flights from the departure airport to the arrival airport use a different SIDs than the optimal SIDs, replacing the optimal SIDs in the SIDs criterion with the different SIDs;
   upon determining from the statistical analysis from the statistical analysis that flights from the departure airport to the arrival airport use a different STARs than the optimal STARs, replacing the optimal STARs in the STARs criterion with the different STARs;
   calculating a fuel penalty for the deviations;
   providing the calibration flight plan to the aircraft; and
   during flight: (i) determining at least one operational variance of the aircraft from the calibration flight plan; (ii) communicating the operational variance of the aircraft; and (iii) communicating the fuel penalty calculated for the deviations.

37. The computer-implemented method of claim 36, wherein the multiple past instances of flights comprises a first plurality of flights, wherein the computer-implemented method further comprises performing a first predefined operation to calculate a weight for the aircraft, the first predefined operation comprising:
   receiving historical flight data for a second plurality of flights for the aircraft;
   performing statistical analysis on a set of the historical flight data in order to determine a statistical model for determining gross weight of the aircraft;
   operating the statistical model using flight data for each of the plurality of flights of the aircraft in order to determine a respective gross weight of the aircraft for the respective one of the plurality of flights;
   determining variances between the determined gross weights of the aircraft and gross weights of the aircraft from load sheets for the respective flights, wherein the determined variances are output;
   updating a load sheet for a future flight of the aircraft to account for the determined variances, wherein the updated load sheet is output; and
   analyzing the determined variances to attribute the determined variances to at least one of unaccounted variances in aircraft weight and unaccounted variances in average passenger weight.

38. The computer-implemented method of claim 37, wherein the first predefined operation further comprises:
   performing a second statistical analysis on unaccounted variances in average passenger weight to determine one or more correlations between unaccounted variances in average passenger weight and real-world factors, wherein the real-world factors comprise: (i) a pairing of departure airport and arrival airport for the flight; (ii) a time of year for the flight; (iii) a time of day for the flight; (iv) weather conditions for the flight;
   determining one or more real-world factors for a particular flight; and updating a load sheet a flight for the aircraft, based on a variance correlated to the determined one or more real-world factors.

39. The computer-implemented method of claim 38, wherein the statistical model comprises, in respective instances, a linear regression model, a non-linear regression model, a neural networks model, a support vector machines model, and a relevance vector analysis model;
wherein the statistical model comprises a set of input variables, wherein the input variables comprise aircraft altitude, mach number, static air temperature, total air temperature, static ambient pressure, total ambient temperature, ground speed, fuel flow for engines of the aircraft, power setting for engines of the aircraft, exhaust gas temperature for engines of the aircraft, indicated angle of attack, total temperature ratio, density altitude, density altitude normalization factor, calculated true airspeed, equivalent airspeed, lift coefficient, fuel mileage, nominal center of gravity, nominal zero fuel weight, and nominal gross weight.

40. The computer-implemented method of claim 39, wherein the first predefined operation further comprises:
during a current flight, operating the statistical model using flight data from the current flight to determine a gross weight of the aircraft for the current flight; and
upon determining that the determined gross weight for the current flight differs from a gross weight from a load sheet for the current flight, updating the flight plan for the current flight based on the determined gross weight, wherein updating the flight plan comprises: (i) updating a cruise altitude of the flight plan; (ii) updating a cruise speed of the flight plan; (iii) updating a top of climb of the flight plan; and (iv) updating a top of descent of the flight plan.

41. The computer-implemented method of claim 40, wherein the statistical model comprises a first statistical model, wherein the computer-implemented method further comprises performing a second predefined operation to calculate a performance wear factor for the aircraft, the second predefined operation comprising:
receiving historical flight data for a third plurality of flights for the aircraft;
performing statistical analysis on a set of the historical flight data for the third plurality of flights in order to determine a second statistical model for determining aircraft performance and engine performance;
operating the second statistical model using flight data for the third plurality of flights of the aircraft in order to determine at least one of current aircraft performance and current engine performance; and
determining variances between the determined aircraft performance and the determined engine performance to aircraft manufacturer-provided aircraft performance and engine manufacturer-provided engine performance, wherein the determined variances are output.

42. The computer-implemented method of claim 41, wherein the second predefined operation further comprises:
calculating, based on the aircraft performance variance and the engine performance variance, a total aircraft performance variance;
updating a flight plan for the aircraft to account for the calculated total aircraft performance variance, wherein the updated flight plan is output;
calculating costs in fuel usage for the determined engine performance variance and the determined aircraft performance variance, respectively;
comparing the costs in fuel usage for the determined engine performance variance and determined aircraft performance variance with respective costs of engine repair and aircraft repair; and
upon determining that the costs in fuel usage exceed the costs of repair, flagging at least one of the aircraft and aircraft engines of the aircraft for repair.

43. The computer-implemented method of claim 42, wherein the one or more predicted real-world limitations comprise a plurality of predicted real-world limitations including an altitude limitation, a speed limitation, a route limitation, a climb profile limitation, and a descent profile limitation; wherein a flight plan for a future flight is amended based on the plurality of predicted real-world limitations, wherein the computer-implemented method further comprises:
correlating the plurality of predicted real-world limitations to a time of day, a time of year, and forecast weather for the historical flights, wherein the flight plan for the future flight is amended based on the plurality of predicted real-world limitations correlated to a time of day, a time of year, and forecast weather of the future flight;
wherein the second statistical model comprises, in respective instances, a linear regression model, a non-linear regression model, a neural networks model, a support vector machines model, and a relevance vector analysis model;
wherein the second statistical model comprises a set of input variables including aircraft altitude, mach number, static air temperature, total air temperature, static ambient pressure, total ambient temperature, ground speed, fuel flow for engines of the aircraft, power setting for engines of the aircraft, exhaust gas temperature for engines of the aircraft, indicated angle of attack, total temperature ratio, density altitude, density altitude normalization factor, calculated true airspeed, equivalent airspeed, lift coefficient, fuel mileage, nominal center of gravity, nominal zero fuel weight, and nominal gross weight.

\* \* \* \* \*

UNITED STATES PATENT AND TRADEMARK OFFICE
CERTIFICATE OF CORRECTION

PATENT NO. : 10,665,114 B2
APPLICATION NO. : 14/229527
DATED : May 26, 2020
INVENTOR(S) : Michael E. Irrgang et al.

Page 1 of 1

It is certified that error appears in the above-identified patent and that said Letters Patent is hereby corrected as shown below:

In the Claims

In Column 65, Line 1, in Claim 38, after "sheet" insert -- for --, therefor.

Signed and Sealed this
Sixth Day of October, 2020

Andrei Iancu
*Director of the United States Patent and Trademark Office*